(12) United States Patent
Voigt et al.

(10) Patent No.: US 7,644,308 B2
(45) Date of Patent: Jan. 5, 2010

(54) HIERARCHICAL TIMESTAMPS

(75) Inventors: Douglas L. Voigt, Boise, ID (US); James P. Jackson, Colorado Springs, CO (US); Alistair Veitch, Mountain View, CA (US); James M. Reuter, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

(21) Appl. No.: 11/369,681

(22) Filed: Mar. 6, 2006

(65) Prior Publication Data

US 2007/0208839 A1    Sep. 6, 2007

(51) Int. Cl.
*G06F 11/00* (2006.01)

(52) U.S. Cl. .............. 714/20; 714/47; 714/49; 707/202; 709/207

(58) Field of Classification Search ........ 707/202; 709/207; 713/178; 714/4, 15, 20, 21, 47, 714/49

See application file for complete search history.

(56) References Cited

U.S. PATENT DOCUMENTS

| | | | | |
|---|---|---|---|---|
| 4,714,992 A * | 12/1987 | Gladney et al. | ............ | 707/206 |
| 5,175,856 A * | 12/1992 | Van Dyke et al. | ........... | 717/151 |
| 5,471,614 A * | 11/1995 | Kakimoto | .............. | 718/102 |
| 5,471,631 A * | 11/1995 | Beardsley et al. | .......... | 713/502 |
| 5,579,513 A * | 11/1996 | Strohmer | .............. | 713/600 |
| 5,684,807 A * | 11/1997 | Bianchini et al. | .......... | 714/712 |
| 5,701,480 A * | 12/1997 | Raz | ................ | 718/101 |
| 5,832,487 A * | 11/1998 | Olds et al. | .............. | 707/10 |
| 5,924,094 A * | 7/1999 | Sutter | .................. | 707/10 |
| 6,065,018 A * | 5/2000 | Beier et al. | ............. | 707/202 |
| 6,078,930 A * | 6/2000 | Lee et al. | ............... | 707/202 |
| 6,301,643 B1 * | 10/2001 | Crockett et al. | ........... | 711/162 |
| 6,393,419 B1 * | 5/2002 | Novak et al. | ............. | 707/8 |
| 6,574,749 B1 * | 6/2003 | Parsons | ................ | 714/15 |
| 6,721,856 B1 * | 4/2004 | Arimilli et al. | ............ | 711/146 |
| 6,748,555 B1 * | 6/2004 | Teegan et al. | ............. | 714/38 |
| 6,754,657 B2 * | 6/2004 | Lomet | ................ | 707/8 |
| 6,842,825 B2 * | 1/2005 | Geiner et al. | ............. | 711/133 |
| 6,883,170 B1 * | 4/2005 | Garcia | ................. | 718/1 |
| 6,915,451 B2 * | 7/2005 | Fitzgerald et al. | .......... | 714/20 |
| 6,983,321 B2 * | 1/2006 | Trinon et al. | ............. | 709/224 |
| 7,088,229 B2 * | 8/2006 | Johnson | ............... | 340/505 |
| 7,206,805 B1 * | 4/2007 | McLaughlin, Jr. | .......... | 709/203 |
| 7,222,141 B2 * | 5/2007 | Zondervan et al. | ......... | 707/204 |
| 7,251,748 B2 * | 7/2007 | Liberty et al. | ............. | 714/20 |
| 7,260,740 B2 * | 8/2007 | Kaiser | ................. | 714/12 |
| 7,272,720 B2 * | 9/2007 | Hasebe et al. | ............. | 713/178 |
| 7,281,023 B2 * | 10/2007 | Lou | .................. | 707/200 |

(Continued)

OTHER PUBLICATIONS

T. Johnson and K. Jeong. Hierarchical matrix timestamps for scalable update propagation. submitted to the 10th Workshop on Distributed Algorithms, Jun. 1996.*

(Continued)

*Primary Examiner*—Robert Beausoliel
*Assistant Examiner*—Joshua P Lottich

(57) ABSTRACT

Embodiments of the present invention are directed to digitally encoded hierarchical timestamps that are stored in computer readable mediums. The hierarchical timestamps of the present invention include a first field that stores a timestamp value and a second field that stores a processing-level indication that indicates the scope of the timestamp within a hierarchical processing system.

16 Claims, 56 Drawing Sheets

U.S. PATENT DOCUMENTS

| | | | |
|---|---|---|---|
| 7,293,028 B2* | 11/2007 | Cha et al. | 707/100 |
| 7,339,935 B2* | 3/2008 | Yasukawa et al. | 370/395.41 |
| 7,366,725 B2* | 4/2008 | Jordan et al. | 707/100 |
| 7,372,857 B1* | 5/2008 | Kappler et al. | 370/395.4 |
| 2002/0038231 A1* | 3/2002 | Hasebe et al. | 705/8 |
| 2002/0049810 A1* | 4/2002 | Fitzgerald et al. | 709/203 |
| 2002/0138571 A1* | 9/2002 | Trinon et al. | 709/204 |
| 2005/0018694 A1* | 1/2005 | Mitani et al. | 370/396 |
| 2005/0027760 A1 | 2/2005 | Knobe et al. | |
| 2005/0053096 A1* | 3/2005 | Yasukawa et al. | 370/475 |
| 2005/0100054 A1* | 5/2005 | Scott et al. | 370/503 |
| 2005/0149927 A1* | 7/2005 | Abe | 718/100 |
| 2005/0198649 A1* | 9/2005 | Zakonov | 719/318 |
| 2005/0275531 A1* | 12/2005 | Johnson | 340/539.22 |
| 2005/0283445 A1* | 12/2005 | Trinon et al. | 705/75 |
| 2005/0289532 A1* | 12/2005 | Zakon et al. | 717/165 |
| 2006/0149792 A1* | 7/2006 | Yamagami | 707/202 |
| 2006/0167960 A1* | 7/2006 | Lomet | 707/206 |

OTHER PUBLICATIONS

Frolund, Svend et al., "FAB: enterprise storage systems on a shoestring", Hewlett-Packard Laboratories, Palo Alto, CA.

* cited by examiner

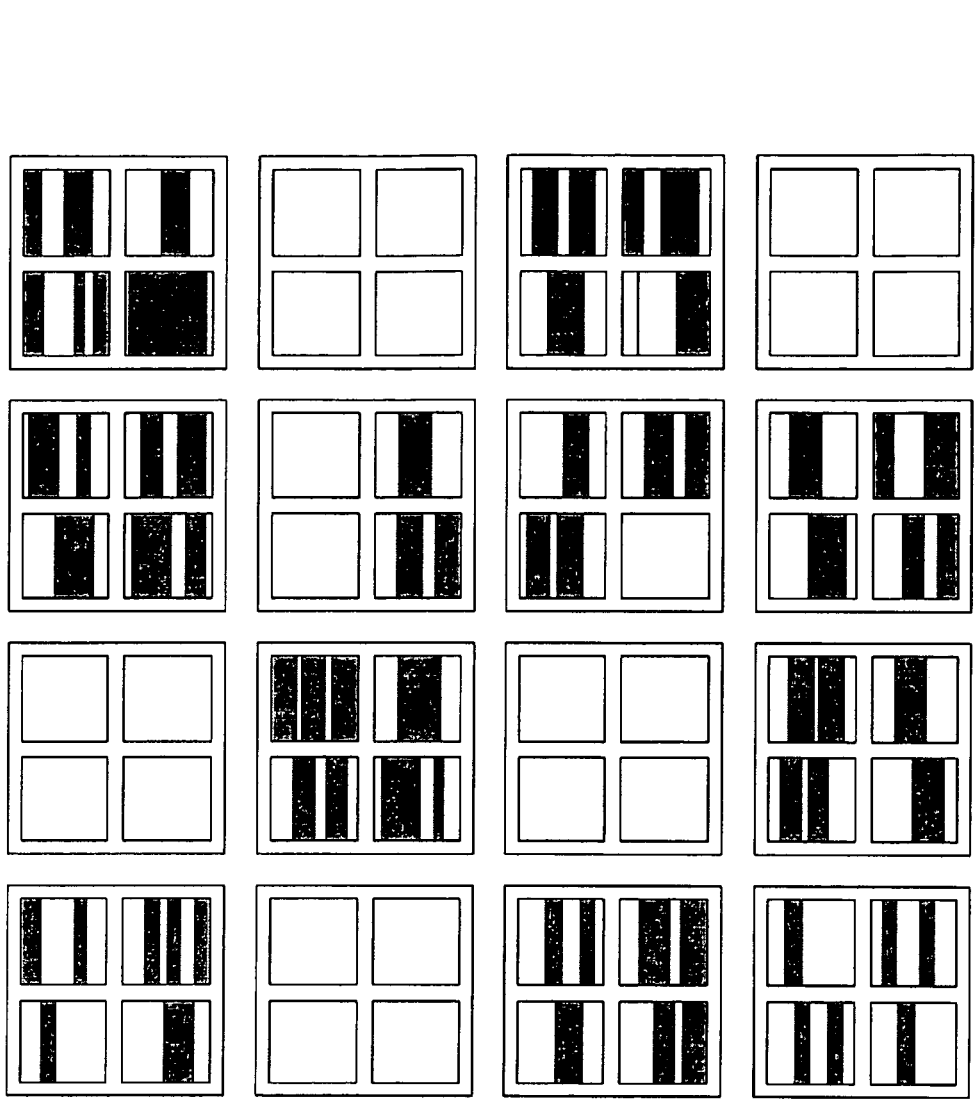
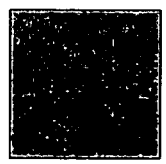
*Figure 8B*

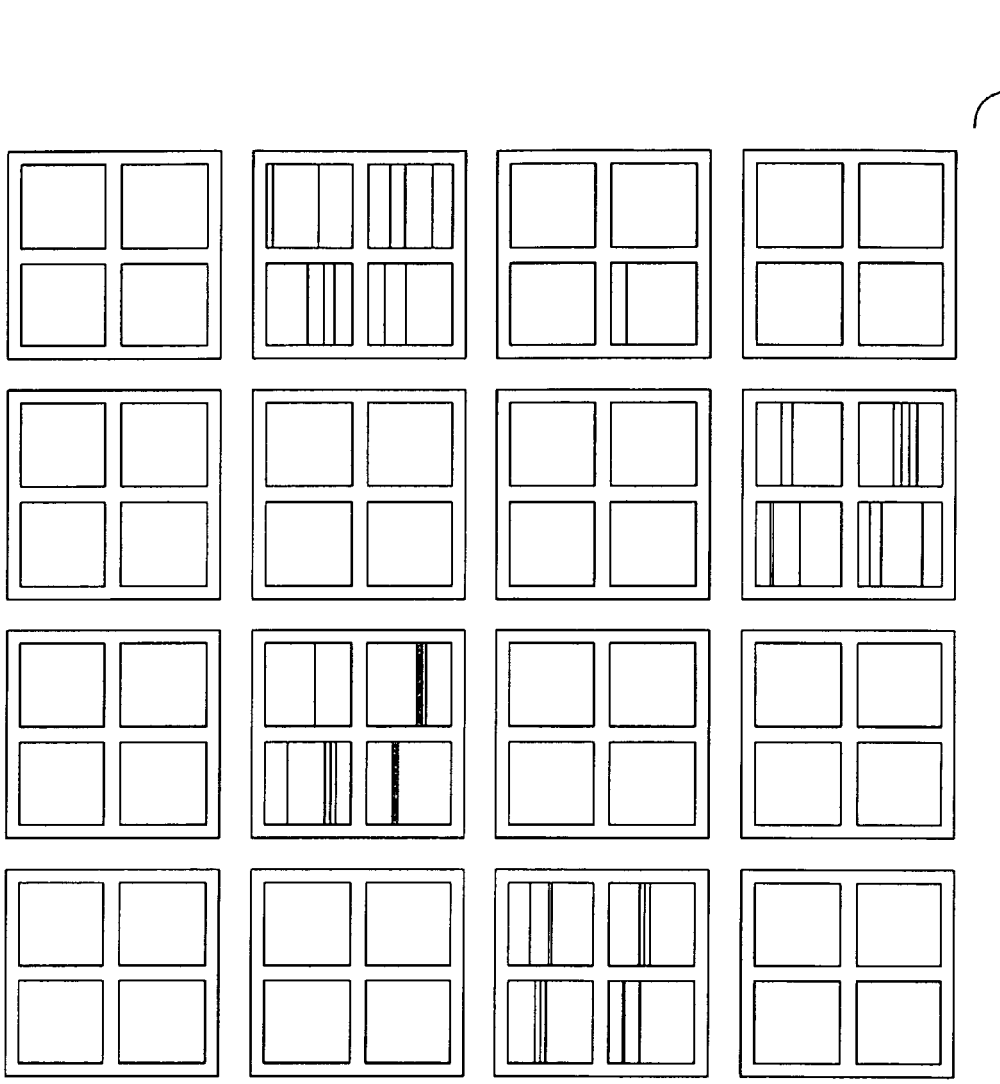
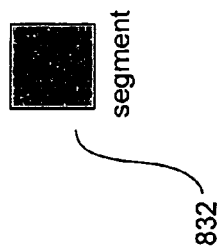
Figure 8D

```
1:    procedure read()                                              2104
2:       replies ← majority([Read, val-ts])
3:       if the status in all replies is true then return val
4:       else return recover()

1:    procedure write(val)                                          2108
2:       ts ← new TS()
3:       replies ← majority([Order, ts])
4:       if any status in a reply is false then return NOK
5:       replies ← majority([Write, val, ts])
6:       if the status in all replies is true then return OK
7:       else return NOK 1:    procedure recover()                                           2106
2:       ts ← new TS()
3:       replies ← majority([Order&Read, ts])
4:       if any status in a reply is false then return NIL
5:       val ← the value with highest val-ts from replies
6:       replies ← majority([Write, val, ts])
7:       if the status in all replies is true then return val
8:       else return NIL 1:    procedure majority(msg)                                       2102
2:       Send msg to all, retransmitting periodically
3:       await receive(rep) from $\lceil \frac{n+1}{2} \rceil$ processes
4:          such that rep matches msg
5:       return set of received replies
``` read Handler()                                                      2110
```
1:    when receive [Read, ts] from coordinator
2:       status ← (ts = val-ts and ts ≥ ord-ts)
3:       reply [Read-R, status] to coordinator
``` write Handler ()                                                    2112
```
1:    when receive [Write, new-val, ts] from coordinator
2:       status ← (ts > val-ts and ts ≥ ord-ts)
3:       if status then
4:          val ← new-val; store(val)
5:          val-ts ← ts; store(val-ts)
6:       reply [Write-R, status] to coordinator
``` order & read Handler ()                                             2114
```
1:    when receive [Order&Read, ts] from coordinator
2:       status ← (ts > max(val-ts, ord-ts))
3:       if status then ord-ts ← ts; store(ord-ts)
4:       reply [Order&Read-R, val-ts, val, status]
``` order Handler()                                                     2116
```
1:    when receive [Order, ts] from coordinator
2:       status ← (ts > max(val-ts, ord-ts))
3:       if status then ord-ts ← ts; store(ord-ts)
4:       reply [Order-R, status] to coordinator
```

*Figure 21*

```
// I/O coordinator code. "idx" is the block number within the scrip.
proc write(val,idx)
    ts ← NewTimestamp()
    send [Order, {idx}, ts] to bricks in the seggroup
    if an m-quorum reply "yes" and idx'th brick replies with oldval
        delta ← Delta(oldval, val, idx)
        send [Write-EC, val; ts] to the idx'th brick.
        send [Write-EC, NULL, ts] to other data bricks.
        send [Write-EC, delta, ts] to parity bricks
        If an m-quorum reply "yes"
            send [Commit, ts] to bricks in the seggroup
            return OK
    return ABORTED
proc read(idx)
    send [Read] to bricks in the seggroup
    If an m-quorum and idx reply "yes" and all timestamps are equal
        return the val returned by idx'th brick.
    ts ← NewTimestamp() // Slow recovery path begins
    send [Order&ReadLog, ts] to bricks in the seggroup
    ts' ← Pick the largest timestamp that appears in at least m replies
    strip ← Reconstruct the original strip for ts'
    send [Write, strip[i], ts] to i'th brick, for each i in the seggroup
    if an m-quorum returns "yes"
        send [Commit, ts] to bricks in the seggroup
        return strip[idx]
    return ABORTED // Storage handler code
    when Receive [Write-EC, newval, ts]
        status ← (ts > valTs and ts ≥ ordTs)
        if status
            if this brick is for parity, add [xor(newval, val), ts]to the log.
            elseif newval ≠ NULL, add [newval, ts] to the log.
            else add [val, ts] to the log
        reply status
    when Receive [Order&ReadLog. ts]
        status ← (ts > max(valTs, ordTs))
        reply [status, all the log entries]
    when Receive [Commit, ts]
        Wait for a while to reject requests with stale timestamps.
        If there is a log entry for ts
            val ← the associated log value.
            Remove log entries with timestamps ts or smaller.
```

*Figure 22*

Register methods

1: $val\text{-}ts \leftarrow ord\text{-}ts \leftarrow$ initialTS
2: $val \leftarrow v_\perp$ 3: procedure read( )
4:     $replies \leftarrow$ Q-form([Read, $val\text{-}ts$])
5:     if the status in all replies is true then return $val$
6:     else return recover( )

7: procedure write (val)
8:     $ts \leftarrow$ newTS( )
9:     $replies \leftarrow$ Q-form([Order, $ts$])
10:    if the status in any reply is false then return NOK
11:    $replies \leftarrow$ Q-form([Write, $val, ts$])
12:    if the status in all replies is true then return OK
13:    else return NOK 14: procedure recover( )
15:    $ts \leftarrow$ newTS( )
16:    $replies \leftarrow$ Q-form([Order&Read, $ts$])
17:    if the status in any reply is false then return NIL
18:    $val \leftarrow$ the value with highest $val\text{-}ts$ from replies
19:    $replies \leftarrow$ Q-form([Write, $val, ts$])
20:    if the status in all replies is true then return $val$
21:    else return NIL Register message handlers 1: when Q-receive([Read, $ts$], coordinator)
2:     $status \leftarrow (ts = val\text{-}ts$ and $ts \geq ord\text{-}ts)$
3:     Q-reply([$status$], coordinator)

4: when Q-receive([Order, $ts$], coordinator)
5:     $status \leftarrow (ts > \max(val\text{-}ts, ord\text{-}ts))$
6:     if $status$ then $ord\text{-}ts \leftarrow ts$; store($ord\text{-}ts$)
7:     Q-reply([$status$], coordinator)

8: when Q-receive([Write, $new\text{-}val, ts$], coordinator)
9:     $status \leftarrow (ts > val\text{-}ts$ and $ts \geq ord\text{-}ts)$
10:    if $status$ then
11:       $val \leftarrow new\text{-}val$; store($val$)
12:       $val\text{-}ts \leftarrow ts$; store($val\text{-}ts$)
13:    Q-reply([$status$], coordinator)

14: when Q-receive([Order&Read, $ts$], coordinator)
15:    $status \leftarrow (ts > \max(val\text{-}ts, ord\text{-}ts))$
16:    if $status$ then $ord\text{-}ts \leftarrow ts$; store($ord\text{-}ts$)
17:    Q-reply([$val\text{-}ts, val, status$], coordinator)

*Figure 25*

Quorum-based communication

1: $activeConfs \leftarrow tempConfs \leftarrow \{c_{init}\}$
2: $msgSet \leftarrow tempMsgs \leftarrow \emptyset$
3: $gcConf \leftarrow c_\bot$ 4: procedure Q-form(req)
5:     $msg \leftarrow$ [Request, req, activeConfs, gcConf]
6:     $msgSet \leftarrow msgSet \cup \{msg\}$
7:     await a subset *reps* of *replySet* such that the elements of *reps* match *req* and constitute a quorum for all configurations in *activeConfs*
8:     $msgSet \leftarrow msgSet \setminus \{msg\}$
9:     $replySet \leftarrow replySet \setminus reps$
10:     return *reps*

11: procedure Q-reply(rep, target)
12:     send [Reply, rep, activeConfs, gcConf] to *target*, retransmitting periodically 13: when $activeConfs \setminus tempConfs \ne \emptyset$ or $msgSet \setminus tempMsgs \ne \emptyset$
14:     send the messages in *msgSet* to all processes in *activeConfs*, retransmitting periodically
15:     $tempConfs \leftarrow activeConfs$
16:     $tempMsgs \leftarrow msgSet$ 17: when receive [Request, req, ac, gc] from p
18:     update-confs(ac, gc)
19:     trigger Q-receive(req, p)

20: when receive [Reply, rep, ac, gc]
21:     $replySet \leftarrow replySet \cup \{rep\}$
22:     update-confs(ac, gc)

23: when conf-deliver(c)
24:     if $c > gcConf$ then
25:         $activeConfs \leftarrow activeConfs \cup \{c\}$
26:         store(gcConf, activeConfs)

27: procedure update-confs(ac, gc)
28:     if $gc > gcConf$ then
29:         $gcConf \leftarrow gc$
30:         $activeConfs \leftarrow activeConfs \cup \{ac\}$
31:         remove all *c* in *activeConfs* with $c \le gcConf$
32:         store(gcConf, activeConfs)

Simple garbage-collection scheme

1: when $|activeConfs| > 1$
2:     $cand \leftarrow \min(activeConfs)$
3:     $stat \leftarrow$ recover( )
4:     if $stat \ne$ NIL and $cand = \min(activeConfs)$ then
5:         $activeConfs \leftarrow activeConfs \setminus \{cand\}$
6:         $gcConf \leftarrow cand$
7:         store(gcConf, activeConfs)

Optimistic state synchronization

1: when $|activeConfs| > 1$
2:     $cand \leftarrow \min(activeConfs)$
3:     $replies \leftarrow$ Q-form([Read, val-ts])
4:     if the status in all replies is true then
5:         $stat \leftarrow$ true
6:     else
7:         $stat \leftarrow$ (recover( ) $\ne$ NIL)
8:     if *stat* and $(cand = \min(activeConfs))$ then
9:         $activeConfs \leftarrow activeConfs \setminus \{cand\}$
10:         $gcConf \leftarrow cand$
11:         store(gcConf, activeConfs)

*Figure 26*

Sc_read( )
    Replies ← totality([Read, val-ts, activeConfs, gcConf])
    If the status in all replies is true then return val
    Else return sc_recover( )

Sc_write(v)
    Ts ← newts( )
    Replies ← totality([Order, ts activeConfs, gcConf])
    If the status in any reply is false then return NOK
    Replies ← totality([Write, ts, v, activeConfs, gcConf])
    If the status in any reply is false then return NOK
    Return OK Sc_recover( )
    Ts ← newts( )
    Replies ← totality([Order&Read, ts, activeConfs, gcConf])
    If the status in any reply is false then return NIL
    Val ← the value with the highest val-ts from replies
    Replies ← totality([Write, val, ts, activeConfs, gcConf])
    If the status in any reply is false then return NIL
    Return val Totality(req)
    For every vdi in req.activeConfs
        Reply ← vdi.req-func(req)
        Update_confs(req.activeConfs, req.gcConf)
        Replies ← replies U reply
        Return replies

*Figure 27*

```
1.   timestampCollection (timestamps)
2.   {
3.       LVL level;
4.       int i;
5.       timestamp ts;

6.       do
7.       {
8.           for (level = = Top; level > = config; level - - )
9.           {
10.              for ( i = o; i < timestamps.getNum (level); i++)
11.              {
12.                  ts = timestamps.getStamp (level, i);
13.                  if (ts.getWrite( ).complete(level))
14.                  {
15.                      if (level = = (config) ts.markForDeallocation( );
16.                      else ts.setLevel (level – 1);
17.                  }
18.              }
19.          }
20.          timestamps.garbageCollect( );
21.      } while (true);
22.  }
```

*Figure 32*

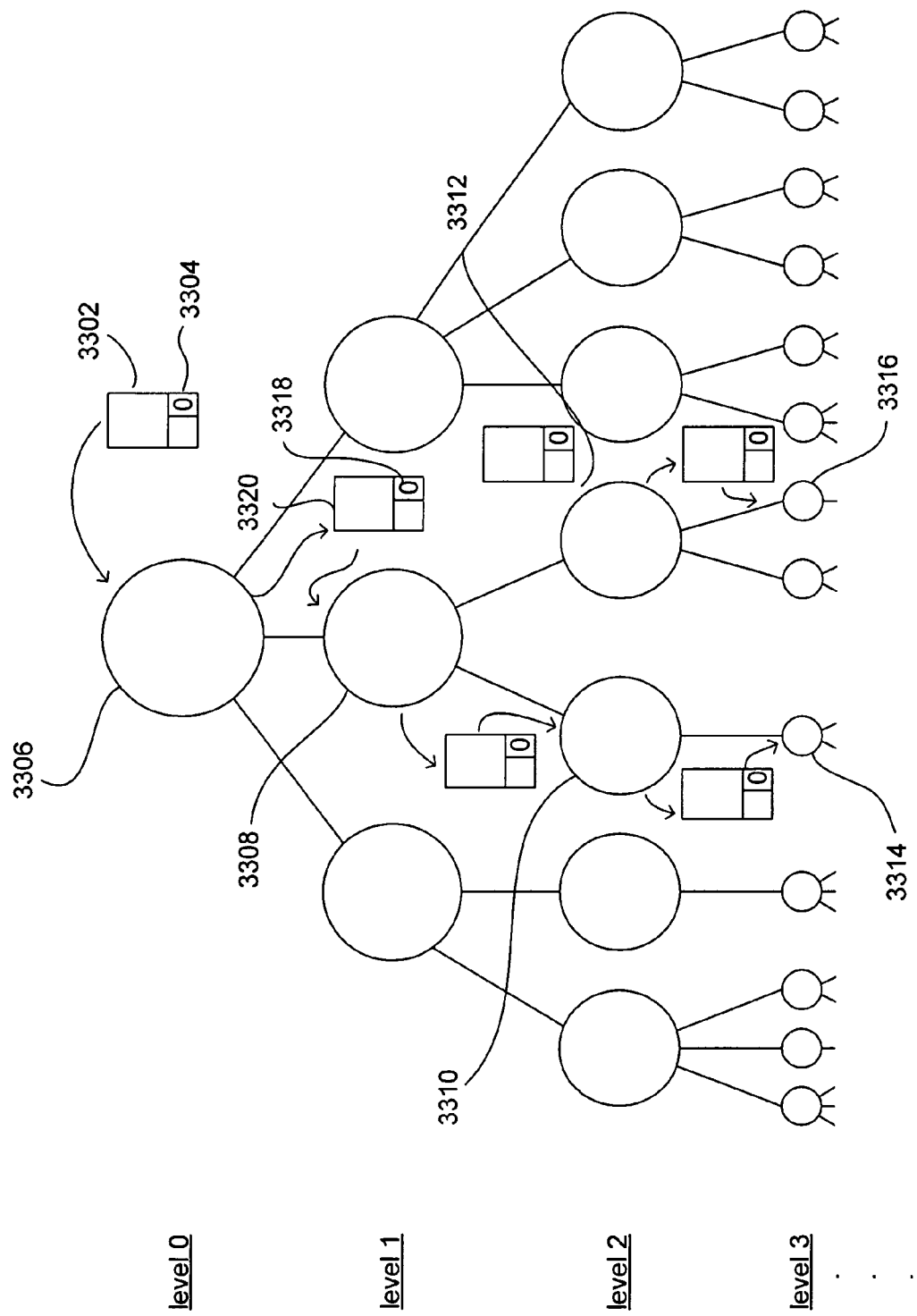

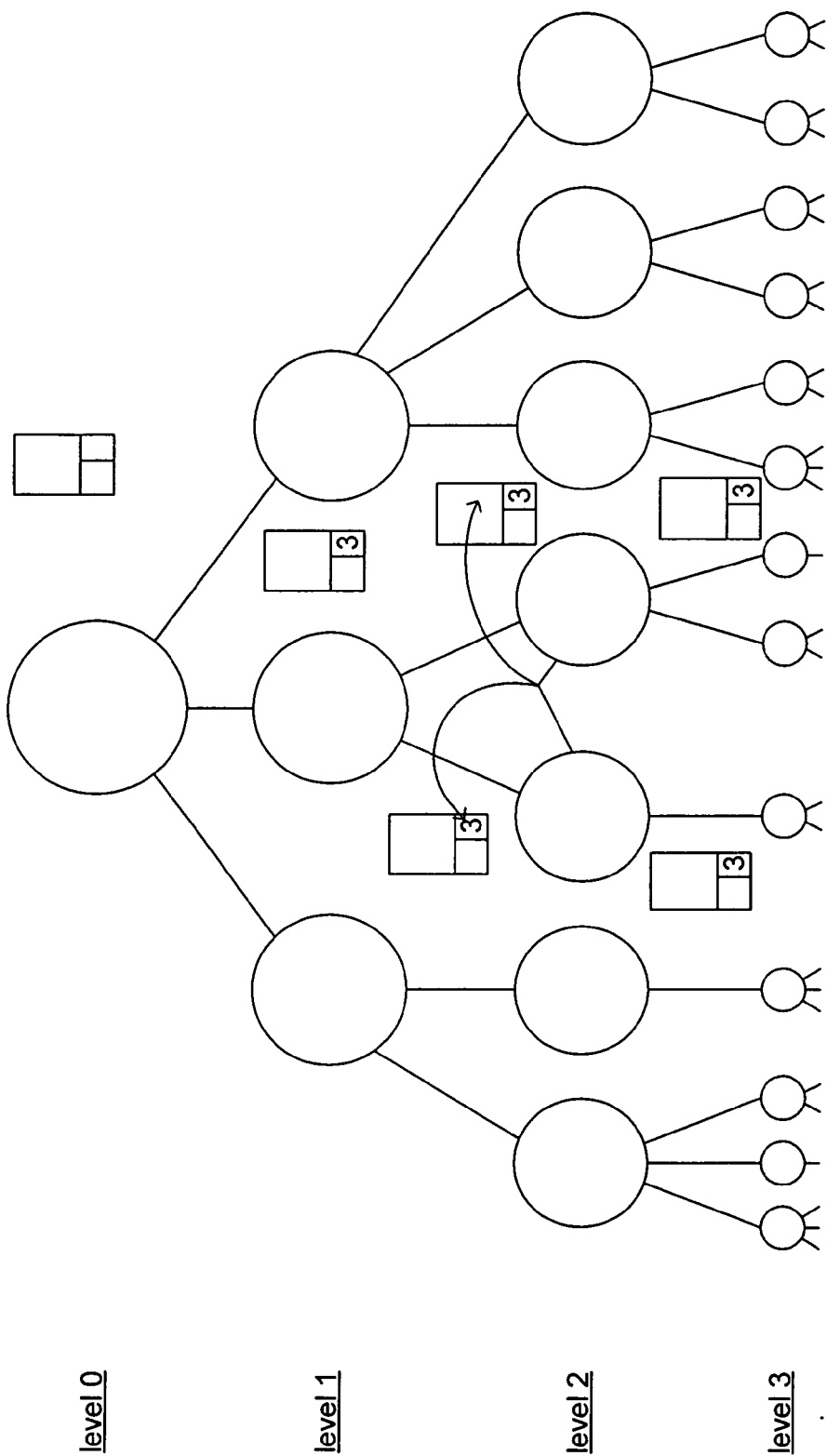

HIERARCHICAL TIMESTAMPS

BACKGROUND OF THE INVENTION

As computer networking and interconnection systems have steadily advanced in capabilities, reliability, and throughput, and as distributed computing systems based on networking and interconnection systems have correspondingly increased in size and capabilities, enormous progress has been made in developing theoretical understanding of distributed computing problems, in turn allowing for development and widespread dissemination of powerful and useful tools and approaches for distributing computing tasks within distributed systems. Early in the development of distributed systems, large mainframe computers and minicomputers, each with a multitude of peripheral devices, including mass-storage devices, were interconnected directly or through networks in order to distribute processing of large, computational tasks. As networking systems became more robust, capable, and economical, independent mass-storage devices, such as independent disk arrays, interconnected through one or more networks with remote host computers, were developed for storing large amounts of data shared by numerous computer systems, from mainframes to personal computers. Recently, as described below in greater detail, development efforts have begun to be directed towards distributing mass-storage systems across numerous mass-storage devices interconnected by one or more networks.

As mass-storage devices have evolved from peripheral devices separately attached to, and controlled by, a single computer system to independent devices shared by remote host computers, and finally to distributed systems composed of numerous, discrete, mass-storage units networked together, problems associated with sharing data and maintaining shared data in consistent and robust states have dramatically increased. Designers, developers, manufacturers, vendors, and, ultimately, users of distributed systems continue to recognize the need for extending already developed distributed-computing methods and routines, and for new methods and routines, that provide desired levels of data robustness and consistency in larger, more complex, and more highly distributed systems.

SUMMARY OF THE INVENTION

Embodiments of the present invention are directed to digitally encoded hierarchical timestamps that are stored in computer readable mediums. The hierarchical timestamps of the present invention include a first field that stores a timestamp value and a second field that stores a processing-level that indicates the scope of the timestamp within a hierarchical processing system.

BRIEF DESCRIPTION OF THE DRAWINGS

FIGS. 8A-D illustrate a hypothetical mapping of logical data units to physical disks of a FAB system that represents one embodiment of the present invention.

FIG. 21 shows pseudocode implementations for the routine handlers and operational routines shown diagrammatically in FIG. 19.

FIG. 22 shows modified pseudocode, similar to the pseudocode provided in FIG. 17, which includes extensions to the storage-register model that handle distribution of segments across bricks according to erasure coding redundancy schemes within a FAB system that represent one embodiment of the present invention.

FIGS. 25-26 provide pseudocode for a further extended storage-register model that includes the concept of quorum-based writes to multiple, active configurations that may be present due to reconfiguration of a distributed segment within a FAB system that represent one embodiment of the present invention.

FIG. 27 shows high-level pseudocode for extension of the storage-register model to the migration level within a FAB system that represent one embodiment of the present invention.

FIG. 32 shows pseudocode for an asynchronous timestamp-collection process that represents one embodiment of the present invention.

FIGS. 33A-F summarize a general method, representing an embodiment of the present invention, for staged constraint of the scope of timestamps within a hierarchically organized processing system.

DETAILED DESCRIPTION OF THE INVENTION

Various embodiments of the present invention employ hierarchical timestamps to facilitate processing and managing data within distributed systems and to facilitate garbage collection of no-longer-needed timestamps. One embodiment of the present invention is described, below, within the context of a distributed mass-storage device currently under development. The context is somewhat complex. In following subsections, the distributed mass-storage system and various methods employed by processing components of the distributed mass-storage system are first discussed, in order to provide the context in which hierarchical timestamps that represent embodiments of the present invention are subsequently described. However, as noted below, hierarchical timestamps may find wide applicability in many other distributed processing systems.

Introduction to FAB

Figure 1:
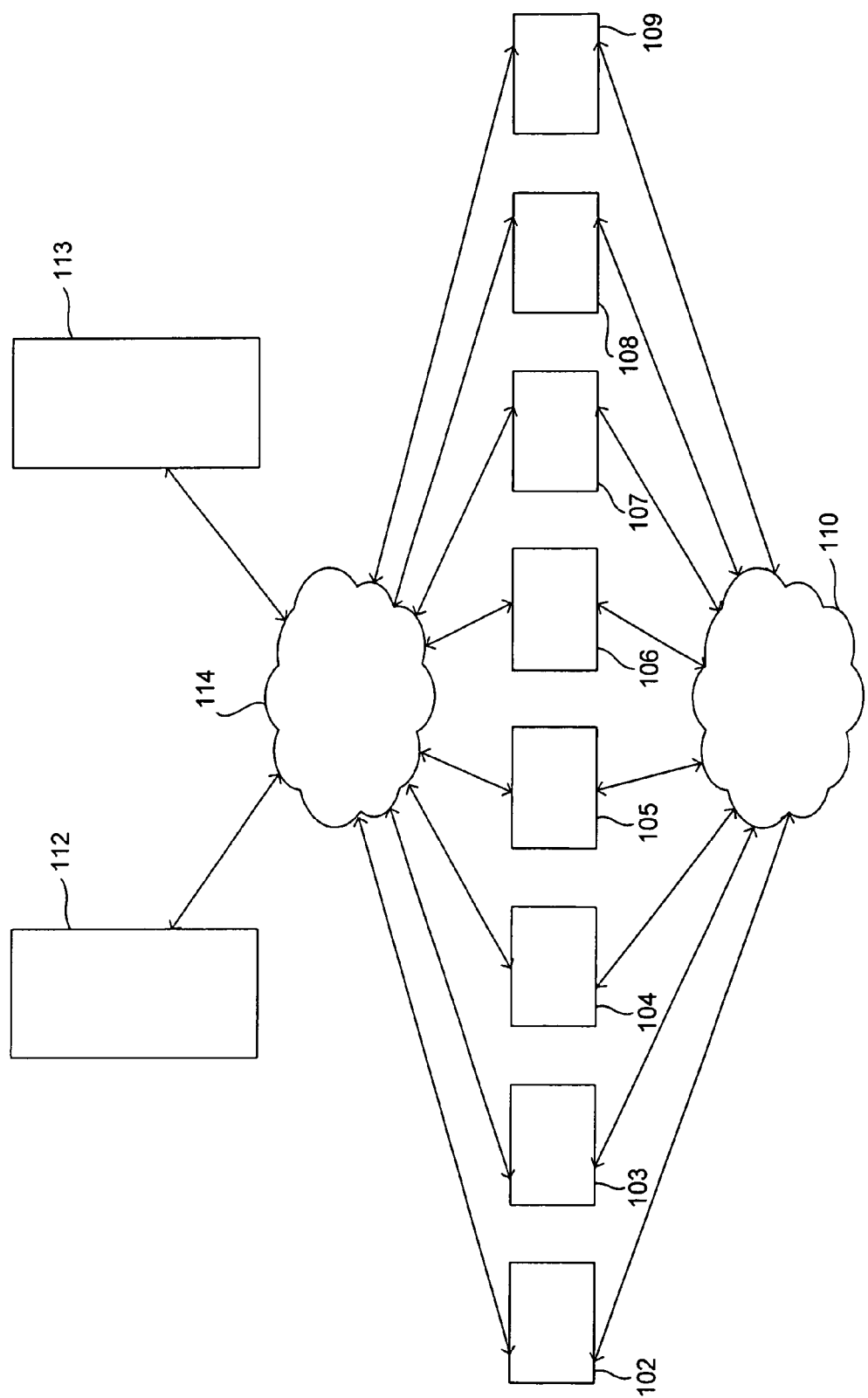
FIG. 1 shows a high level diagram of a FAB mass-storage system according to one embodiment of the present invention.

The federated array of bricks ("FAB") architecture represents a new, highly-distributed approach to mass storage. FIG. 1 shows a high level diagram of a FAB mass-storage system according to one embodiment of the present invention. A FAB mass-storage system, subsequently referred to as a "FAB system," comprises a number of small, discrete component data-storage systems, or mass-storage devices, 102-109 that intercommunicate with one another through a first communications medium 110 and that can receive requests from, and transmit replies to, a number of remote host computers 112-113 through a second communications medium 114. Each discrete, component-data-storage system 102-109 may be referred to as a "brick." A brick may include an interface through which requests can be received from remote host computers, and responses to the received requests transmitted back to the remote host computers. Any brick of a FAB system may receive requests, and respond to requests, from host computers. One brick of a FAB system assumes a coordinator role with respect to any particular request, and coordinates operations of all bricks involved in responding to the particular request, and any brick in the FAB system may assume a coordinator role with respect to a given request. A FAB system is therefore a type of largely software-implemented, symmetrical, distributed computing system. In certain alternative embodiments, a single network may be employed both for interconnecting bricks and interconnecting the FAB system to remote host computers. In other alternative embodiments, more than two networks may be employed.

Figure 2:
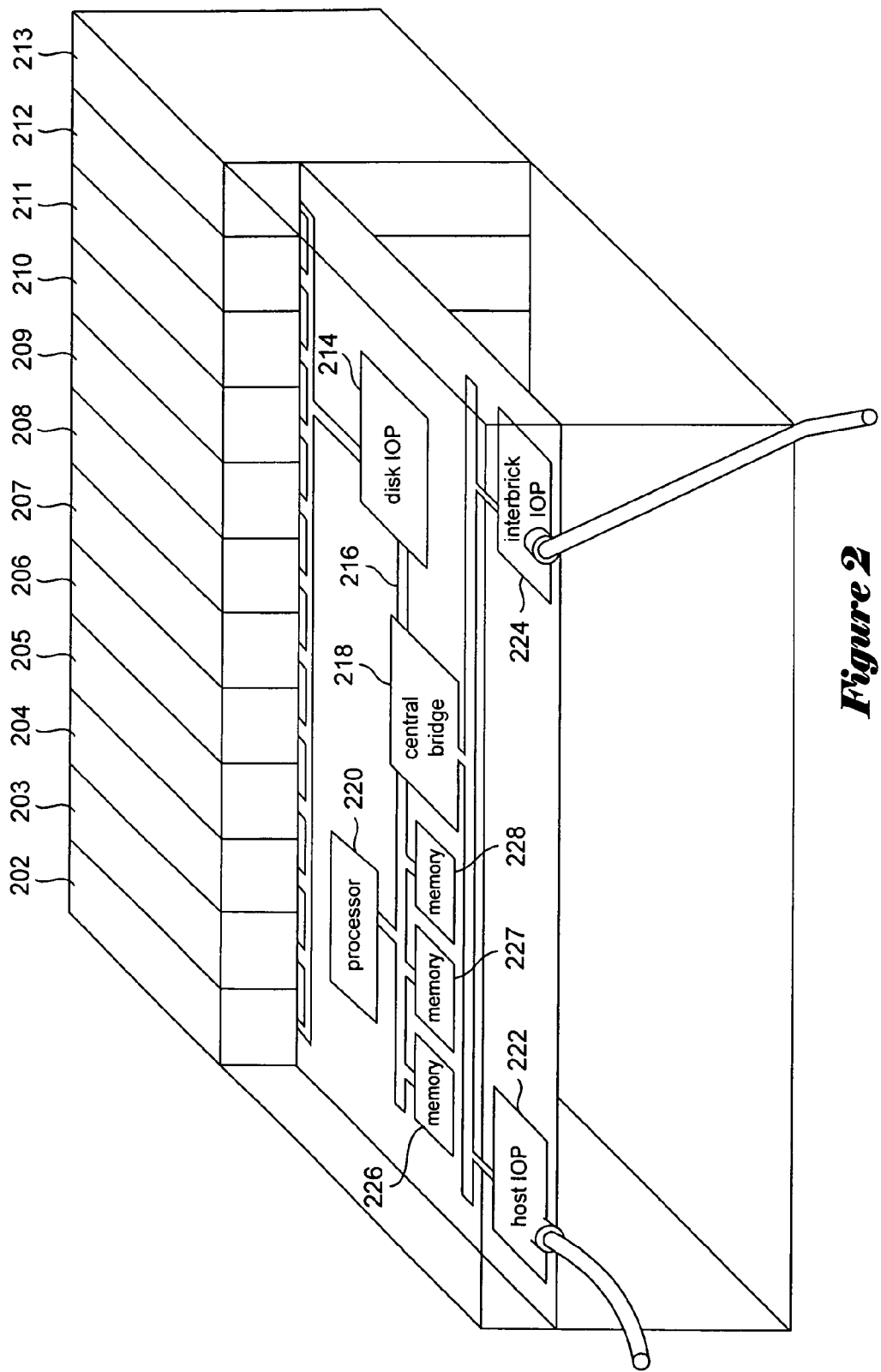
FIG. 2 shows a high-level diagram of an exemplary FAB brick according to one embodiment of the present invention.

FIG. 2 shows a high-level diagram of an exemplary FAB brick according to one embodiment of the present invention. The FAB brick illustrated in FIG. 2 includes 12 SATA disk drives 202-213 that interface to a disk I/O processor 214. The disk I/O processor 214 is interconnected through one or more high-speed busses 216 to a central bridge device 218. The central bridge 218 is, in turn, interconnected to one or more general processors 220, a host I/O processor 222, an interbrick I/O processor 22, and one or more memories 226-228. The host I/O processor 222 provides a communications interface to the second communications medium (114 in FIG. 1) through which the brick communicates with remote host computers. The interbrick I/O processor 224 provides a communications interface to the first communications medium (110 in FIG. 1) through which the brick communicates with other bricks of the FAB. The one or more general processors 220 execute a control program for, among many tasks and responsibilities, processing requests from remote host computers and remote bricks, managing state information stored in the one or more memories 226-228 and on storage devices 202-213, and managing data storage and data consistency within the brick. The one or more memories serve as a cache for data as well as a storage location for various entities, including timestamps and data structures, used by control processes that control access to data stored within the FAB system and that maintain data within the FAB system in a consistent state. The memories typically include both volatile and non-volatile memories. In the following discussion, the one or more general processors, the one or more memories, and other components, one or more of which are initially noted to be included, may be referred to in the singular to avoid repeating the phrase "one or more."

In certain embodiments of the present invention, all the bricks in a FAB are essentially identical, running the same control programs, maintaining essentially the same data structures and control information within their memories 226 and mass-storage devices 202-213, and providing standard interfaces through the I/O processors to host computers, to other bricks within the FAB, and to the internal disk drives. In these embodiments of the present invention, bricks within the FAB may slightly differ from one another with respect to versions of the control programs, specific models and capabilities of internal disk drives, versions of the various hardware components, and other such variations. Interfaces and control programs are designed for both backwards and forwards compatibility to allow for such variations to be tolerated within the FAB.

Each brick may also contain numerous other components not shown in FIG. 2, including one or more power supplies, cooling systems, control panels or other external control interfaces, standard random-access memory, and other such components. Bricks are relatively straightforward devices, generally constructed from commodity components, including commodity I/O processors and disk drives. A brick employing 12 100-GB SATA disk drives provides 1.2 terabytes of storage capacity, only a fraction of which is needed for internal use. A FAB may comprise hundreds or thousands of bricks, with large FAB systems, currently envisioned to contain between 5,000 and 10,000 bricks, providing petabyte ("PB") storage capacities. Thus, FAB mass-storage systems provide a huge increase in storage capacity and cost efficiency over current disk arrays and network attached storage devices.

Redundancy

Large mass-storage systems, such as FAB systems, not only provide massive storage capacities, but also provide and manage redundant storage, so that if portions of stored data are lost, due to brick failure, disk-drive failure, failure of particular cylinders, tracks, sectors, or blocks on disk drives, failures of electronic components, or other failures, the lost data can be seamlessly and automatically recovered from redundant data stored and managed by the large scale mass-storage systems, without intervention by host computers or manual intervention by users. For important data storage applications, including database systems and enterprise-critical data, two or more large scale mass-storage systems are often used to store and maintain multiple, geographically dispersed instances of the data, providing a higher-level redundancy so that even catastrophic events do not lead to unrecoverable data loss.

Figure 3:
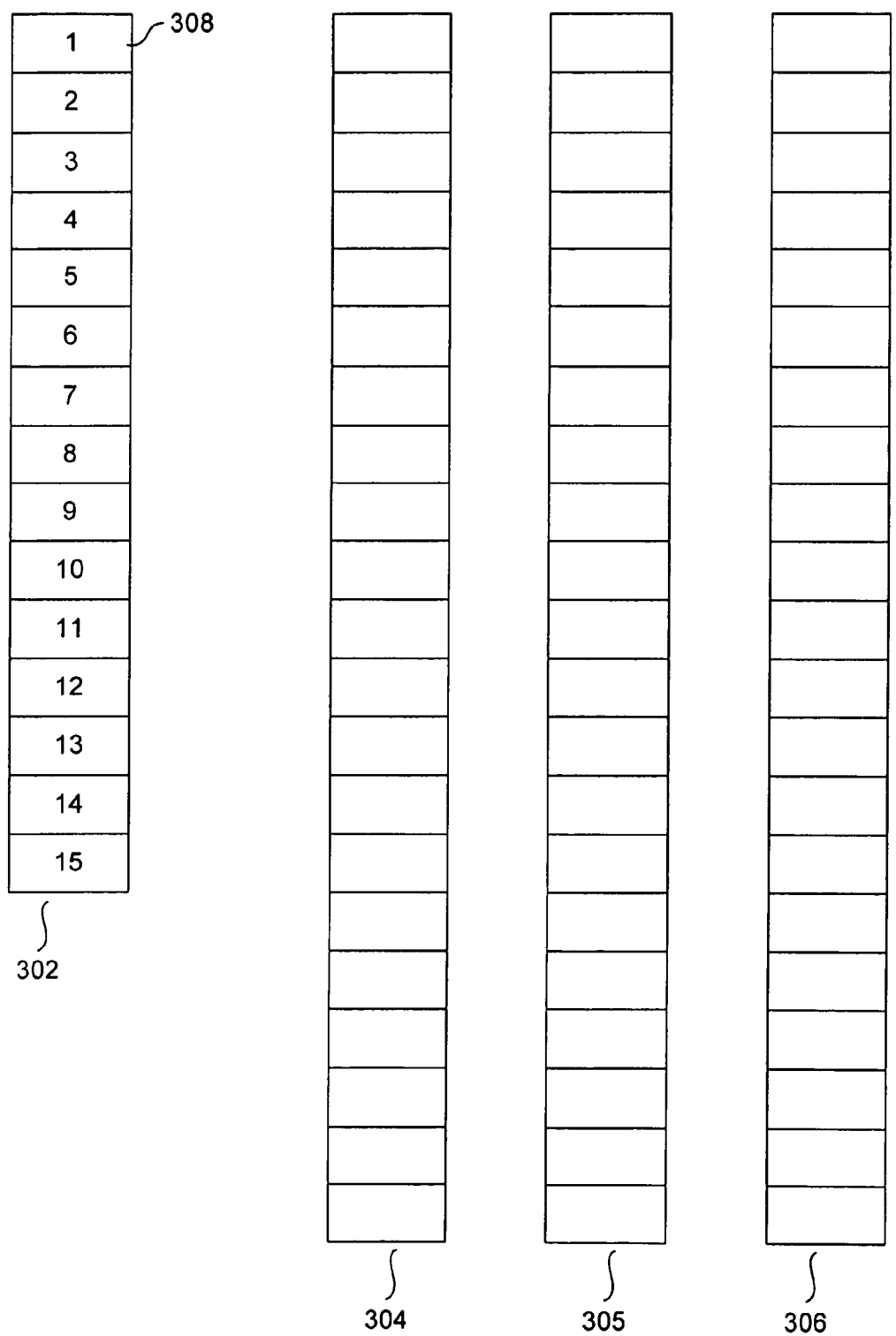
FIGS. 3-4 illustrate the concept of data mirroring.
Figure 4:
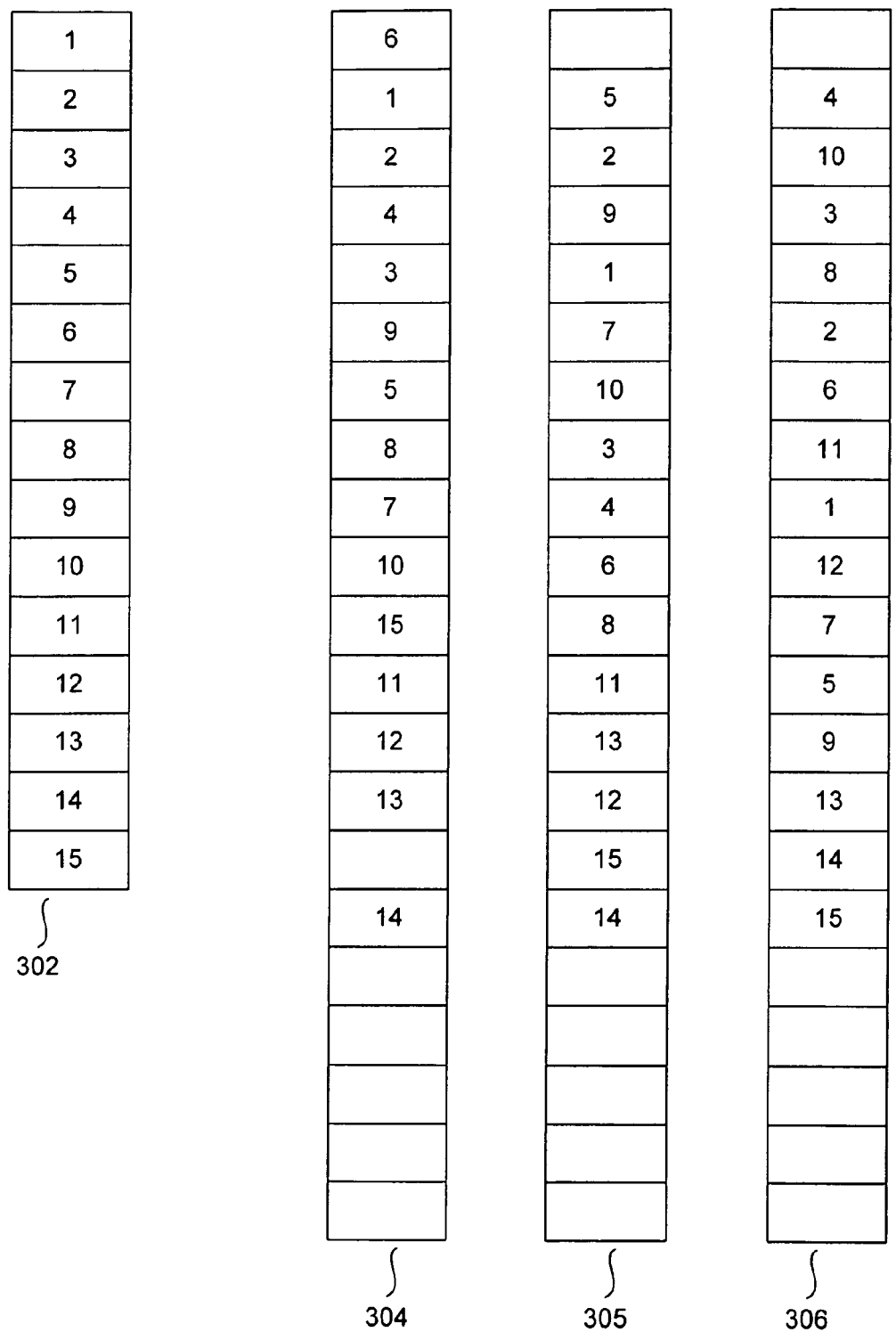

In certain embodiments of the present invention, FAB systems automatically support at least two different classes of lower-level redundancy. The first class of redundancy involves brick-level mirroring, or, in other words, storing multiple, discrete copies of data objects on two or more bricks, so that failure of one brick does not lead to unrecoverable data loss. FIGS. 3-4 illustrate the concept of data mirroring. FIG. 3 shows a data object 302 and logical representation of the contents of three bricks 304-306 according to an embodiment of the present invention. The data object 302 comprises 15 sequential data units, such as data unit 308, numbered "1" through "15" in FIG. 3. A data object may be a volume, a file, a data base, or another type of data object, and data units may be blocks, pages, or other such groups of consecutively addressed storage locations. FIG. 4 shows triple-mirroring redundant storage of the data object 302 on the three bricks 304-306 according to an embodiment of the present invention. Each of the three bricks contains copies of all 15 of the data units within the data object 302. In many illustrations of mirroring, the layout of the data units is shown to be identical in all mirror copies of the data object. However, in reality, a brick may choose to store data units anywhere on its internal disk drives. In FIG. 4, the copies of the data units within the data object 302 are shown in different orders and positions within the three different bricks. Because each of the three bricks 304-306 stores a complete copy of the data object, the data object is recoverable even when two of the three bricks fail. The probability of failure of a single brick is generally relatively slight, and the combined probability of failure of all three bricks of a three-brick mirror is generally extremely small. In general, a FAB system may store millions, billions, trillions, or more different data objects, and each different data object may be separately mirrored over a different number of bricks within the FAB system. For example, one data object may be mirrored over bricks 1, 7, 8, and 10, while another data object may be mirrored over bricks 4, 8, 13, 17, and 20.

A second redundancy class is referred to as "erasure coding" redundancy. Erasure coding redundancy is somewhat more complicated than mirror redundancy. Erasure coding redundancy often employs Reed-Solomon encoding techniques used for error control coding of communications messages and other digital data transferred through noisy channels. These error-control-coding techniques are specific examples of binary linear codes.

Figure 5:
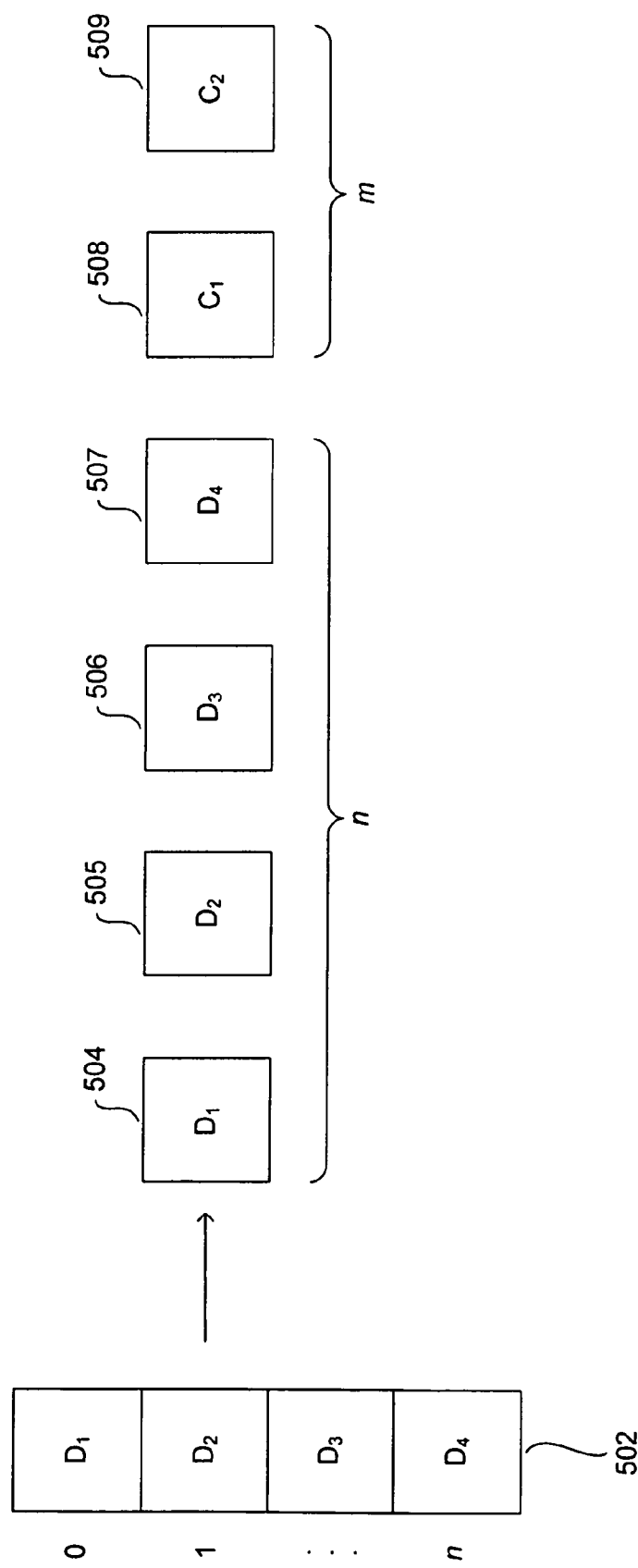
FIG. 5 shows a high-level diagram depicting erasure coding redundancy.

FIG. 5 shows a high-level diagram depicting erasure coding redundancy. In FIG. 5, a data object 502 comprising n=4 data units is distributed across a number of bricks 504-509 greater than n. The first n bricks 504-506 each stores one of the n data units. The final m=2 bricks 508-509 store checksum, or parity, data computed from the data object. The erasure coding redundancy scheme shown in FIG. 5 is an example of an m+n erasure coding redundancy scheme. Because n=4 and m=2, the specific m+n erasure coding redundancy scheme illustrated in FIG. 5 is referred to as a "4+2" redundancy scheme. Many other erasure coding redundancy schemes are possible, including 8+2, 3+3, and other schemes. In general, m is less than or equal to n. As long as m or less of the m+n bricks fail, regardless of whether the failed bricks contain data or parity values, the entire data object can be restored. For example, in the erasure coding scheme shown in FIG. 5, the data object 502 can be entirely recovered despite failures of any pair of bricks, such as bricks 505 and 508.

Figure 6:
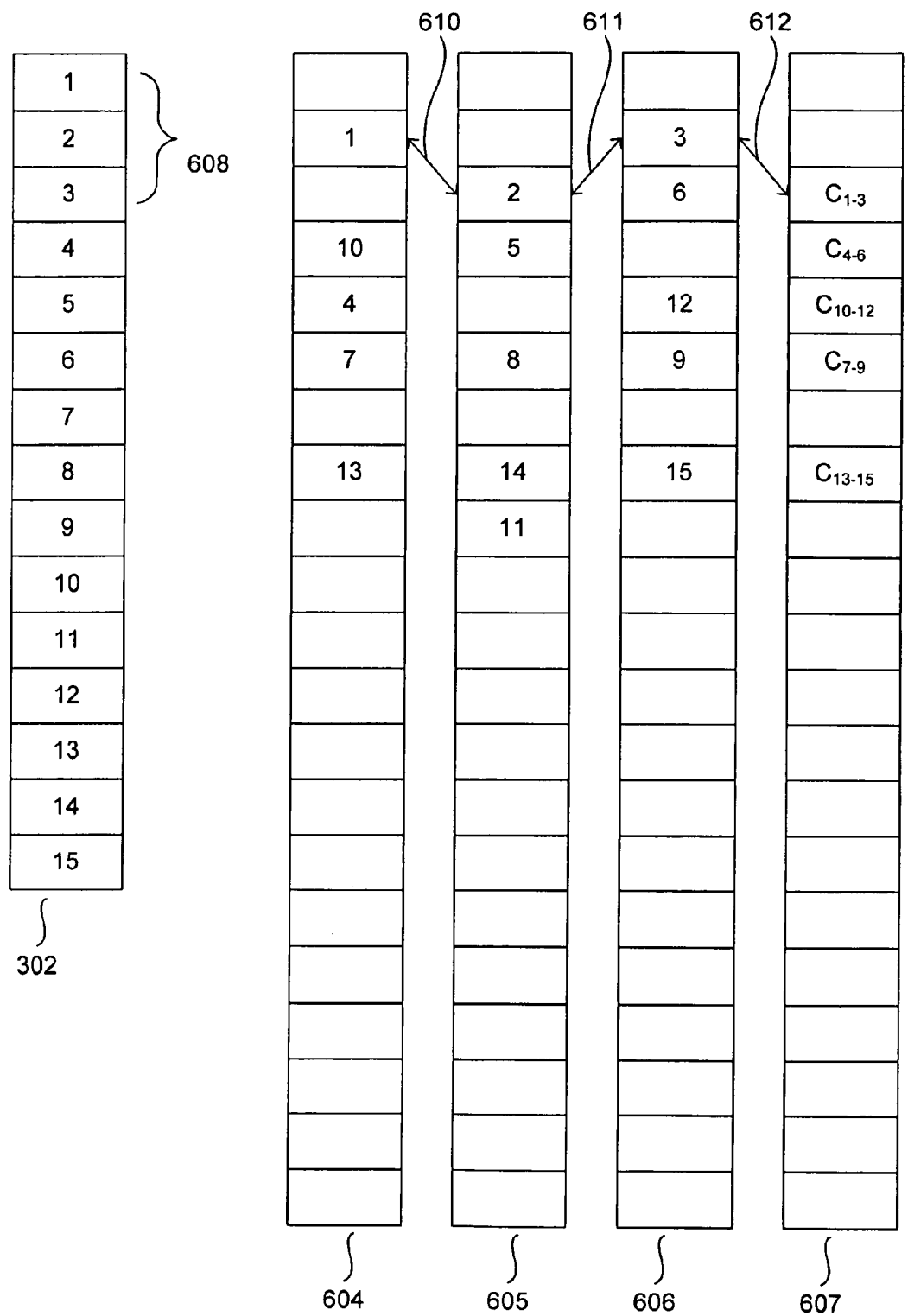
FIG. 6 shows a 3+1 erasure coding redundancy scheme using the same illustration conventions as used in FIGS. 3 and 4.

FIG. 6 shows an exemplary 3+1 erasure coding redundancy scheme using the same illustration conventions as used in FIGS. 3 and 4. In FIG. 6, the 15-data-unit data object 302 is distributed across four bricks 604-607. The data units are striped across the four disks, with each three-data-unit of the data object sequentially distributed across bricks 604-606, and a check sum, or parity data unit for the stripe placed on brick 607. The first stripe, consisting of the three data units 608, is indicated in FIG. 6 by arrows 610-612. Although, in FIG. 6, checksum data units are all located on a single brick 607, the stripes may be differently aligned with respect to the bricks, with each brick containing some portion of the checksum or parity data units.

Erasure coding redundancy is generally carried out by mathematically computing checksum or parity bits for each byte, word, or long word of a data unit. Thus, m parity bits are computed from n data bits, where n=8, 16, or 32, or a higher power of two. For example, in an 8+2 erasure coding redundancy scheme, two parity check bits are generated for each byte of data. Thus, in an 8+2 erasure coding redundancy scheme, eight data units of data generate two data units of checksum, or parity bits, all of which can be included in a ten-data-unit stripe. In the following discussion, the term "word" refers to a data-unit granularity at which encoding occurs, and may vary from bits to longwords or data units of greater length. In data-storage applications, the data-unit granularity may typically be 512 bytes or greater.

The $i^{th}$ checksum word $c_i$ may be computed as a function of all n data words by a function $F_i(d_1, d_2, \ldots, d_n)$ which is a linear combination of each of the data words $d_j$ multiplied by a coefficient $f_{i,j}$, as follows:

$$c_i = F_i(d_1, d_2, \ldots, d_n) = \sum_{j=1}^{n} d_j f_{i,j}$$

In matrix notation, the equation becomes:

$$\begin{bmatrix} c_1 \\ c_2 \\ \vdots \\ c_m \end{bmatrix} = \begin{bmatrix} f_{1,1} & f_{1,2} & \cdots & f_{1,n} \\ f_{2,1} & f_{2,2} & \cdots & f_{2,n} \\ \vdots & \vdots & & \vdots \\ f_{m,1} & f_{m,2} & \cdots & f_{m,m} \end{bmatrix} \begin{bmatrix} d_1 \\ d_2 \\ \vdots \\ d_n \end{bmatrix}$$

or:

$$C = FD$$

In the Reed-Solomon technique, the function F is chose to be an m×n Vandermonde matrix with elements $f_{i,j}$ equal to $j^{i-1}$, or:

$$F = \begin{bmatrix} 1 & 1 & \cdots & 1 \\ 1 & 2 & \cdots & n \\ \vdots & \vdots & & \vdots \\ 1 & 2^{m-1} & \cdots & n^{m-1} \end{bmatrix}$$

If a particular word $d_j$ is modified to have a new value $d'_j$, then a new $i^{th}$ check sum word $c'_i$ can be computed as:

$$c'_i = c_i + f_{i,j}(d'_j - d_j)$$

or:

$$c' = C + FD' - FD = C + F(D' - D)$$

Thus, new checksum words are easily computed from the previous checksum words and a single column of the matrix F.

Lost words from a stripe are recovered by matrix inversion. A matrix A and a column vector E are constructed, as follows:

$$A = \left[\frac{I}{F}\right] = \begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{n-1} \end{bmatrix}$$

$$E = \left[\frac{D}{C}\right] = \begin{bmatrix} d_1 \\ d_2 \\ \vdots \\ d_n \\ c_1 \\ c_2 \\ \vdots \\ c_m \end{bmatrix}$$

It is readily seen that:

$$AD = E$$

or:

$$\begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & n \\ 1 & 2 & 3 & \cdots & n \\ \vdots & \vdots & \vdots & & \vdots \\ 1 & 2^{m-1} & 3^{m-1} & \cdots & n^{m-1} \end{bmatrix} \begin{bmatrix} d_1 \\ d_2 \\ \vdots \\ d_n \end{bmatrix} = \begin{bmatrix} d_1 \\ d_2 \\ d_3 \\ \vdots \\ d_n \\ c_1 \\ c_2 \\ \vdots \\ c_m \end{bmatrix}$$

One can remove any m rows of the matrix A and corresponding rows of the vector E in order to produce modified matrices A' and E', where A' is a square matrix. Then, the vector D representing the original data words can be recovered by matrix inversion as follows:

$$A'D = E'$$

$$D = A'^{-1}E'$$

Thus, when m or fewer data or checksum words are erased, or lost, m data or checksum words including the m or fewer lost data or checksum words can be removed from the vector E, and corresponding rows removed from the matrix A, and the original data or checksum words can be recovered by matrix inversion, as shown above.

While matrix inversion is readily carried out for real numbers using familiar real-number arithmetic operations of addition, subtraction, multiplication, and division, discrete-valued matrix and column elements used for digital error control encoding are suitable for matrix multiplication only when the discrete values form an arithmetic field that is closed under the corresponding discrete arithmetic operations. In general, checksum bits are computed for words of length w:

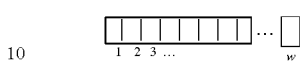

A w-bit word can have any of $2^w$ different values. A mathematical field known as a Galois field can be constructed to have $2^w$ elements. The arithmetic operations for elements of the Galois field are, conveniently:

$$a \pm b = a \oplus b$$

$$a*b = \text{anti log }[\log(a) + \log(b)]$$

$$a \div b = \text{anti log }[\log(a) - \log(b)]$$

where tables of logs and antilogs for the Galois field elements can be computed using a propagation method involving a primitive polynomial of degree w.

Mirror-redundancy schemes are conceptually more simple, and easily lend themselves to various reconfiguration operations. For example, if one brick of a 3-brick, triple-mirror-redundancy scheme fails, the remaining two bricks can be reconfigured as a 2-brick mirror pair under a double-mirroring-redundancy scheme. Alternatively, a new brick can be selected for replacing the failed brick, and data copied from one of the surviving bricks to the new brick to restore the 3-brick, triple-mirror-redundancy scheme. By contrast, reconfiguration of erasure coding redundancy schemes is not as straightforward. For example, each checksum word within a stripe depends on all data words of the stripe. If it is desired to transform a 4+2 erasure-coding-redundancy scheme to an 8+2 erasure-coding-redundancy scheme, then all of the checksum bits may be recomputed, and the data may be redistributed over the 10 bricks used for the new, 8+2 scheme, rather than copying the relevant contents of the 6 bricks of the 4+2 scheme to new locations. Moreover, even a change of stripe size for the same erasure coding scheme may involve recomputing all of the checksum data units and redistributing the data across new brick locations. In most cases, change to an erasure-coding scheme involves a complete construction of a new configuration based on data retrieved from the old configuration rather than, in the case of mirroring-redundancy schemes, deleting one of multiple bricks or adding a brick, with copying of data from an original brick to the new brick. Mirroring is generally less efficient in space than erasure coding, but is more efficient in time and expenditure of processing cycles.

FAB Storage Units

As discussed above, a FAB system may provide for an enormous amount of data-storage space. The overall storage space may be logically partitioned into hierarchical data units, a data unit at each non-lowest hierarchical level logically composed of data units of a next-lowest hierarchical level. The logical data units may be mapped to physical storage space within one or more bricks.

Figure 7:
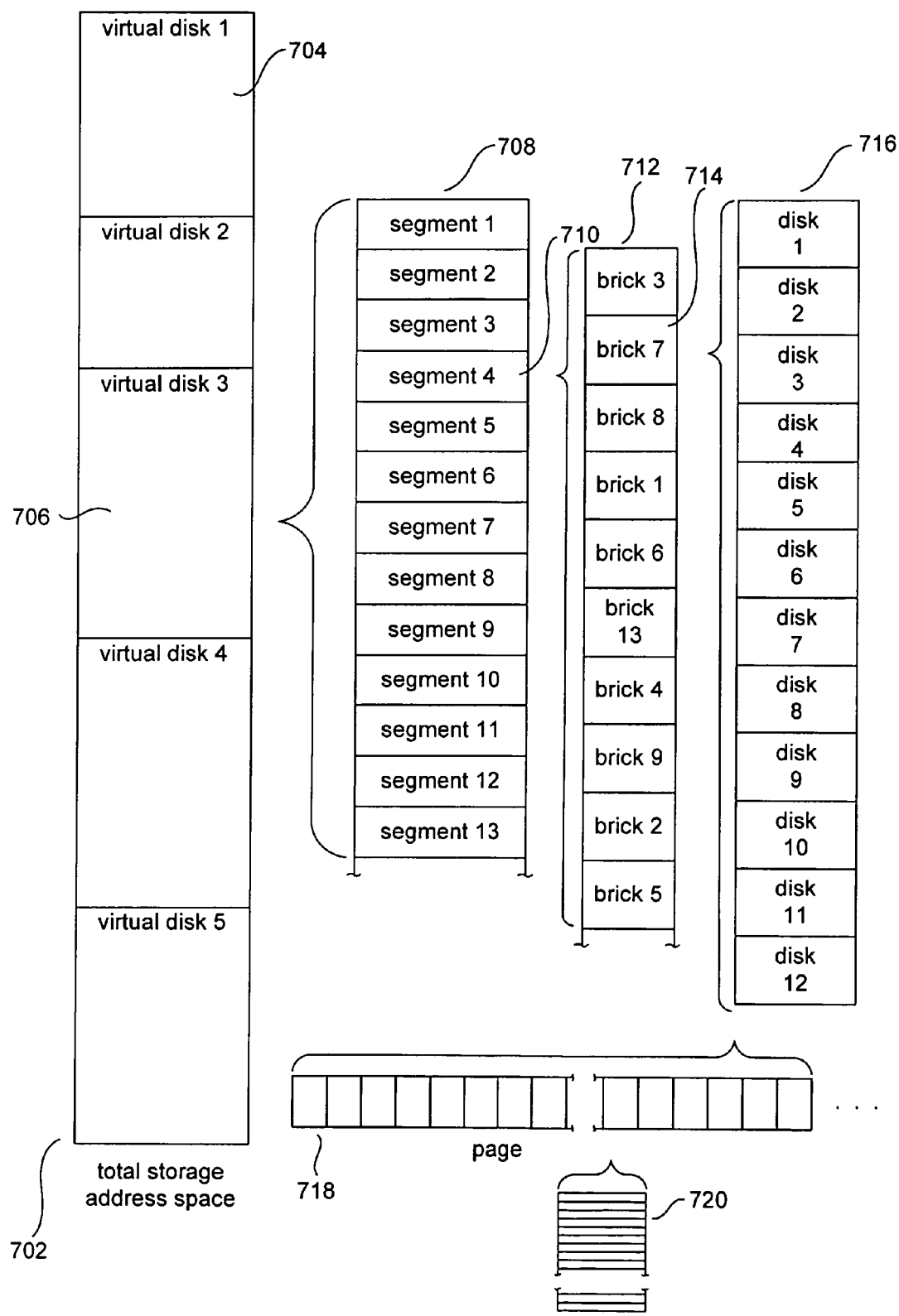
FIG. 7 illustrates the hierarchical data units employed in a current FAB implementation that represent one embodiment of the present invention.

FIG. 7 illustrates the hierarchical data units employed in a current FAB implementation that represent one embodiment of the present invention. The highest-level data unit is referred to as a "virtual disk," and the total available storage space within a FAB system can be considered to be partitioned into one or more virtual disks. In FIG. 7, the total storage space 702 is shown partitioned into five virtual disks, including a first virtual disk 704. A virtual disk can be configured to be of arbitrary size greater than or equal to the size of the next-lowest hierarchical data unit, referred to as a "segment." In FIG. 7, the third virtual disk 706 is shown to be logically partitioned into a number of segments 708. The segments may be consecutively ordered, and together compose a linear, logical storage space corresponding to a virtual disk. As shown in FIG. 7 each segment, such as segment 4 (710 in FIG. 7) may be distributed over a number of bricks 712 according to a particular redundancy scheme. The segment represents the granularity of data distribution across bricks. For example, in FIG. 7, segment 4 (710 in FIG. 7) may be distributed over bricks 1-9 and 13 according to an 8+2 erasure coding redundancy scheme. Thus, brick 3 may store one-eighth of the segment data, and brick 2 may store one-half of the parity data for the segment under the 8+2 erasure coding redundancy scheme, if parity data is stored separately from the segment data. Each brick, such as brick 7 (714 in FIG. 7) may choose to distribute a segment or segment portion over any of the internal disks of the brick 716 or in cache memory. When stored on an internal disk, or in cache memory, a segment or segment portion is logically considered to comprise a number of pages, such as page 718 shown in FIG. 7, each page, in turn, comprising a consecutive sequence of blocks, such as block 720 shown in FIG. 7. The block (e.g. 720 in FIG. 7) is the data unit level with which timestamps are associated, and which are managed according to a storage-register data-consistency regime discussed below. In one FAB system under development, segments comprise 256 consecutive megabytes, pages comprise eight megabytes, and blocks comprise 512 bytes.

Figure 8A:
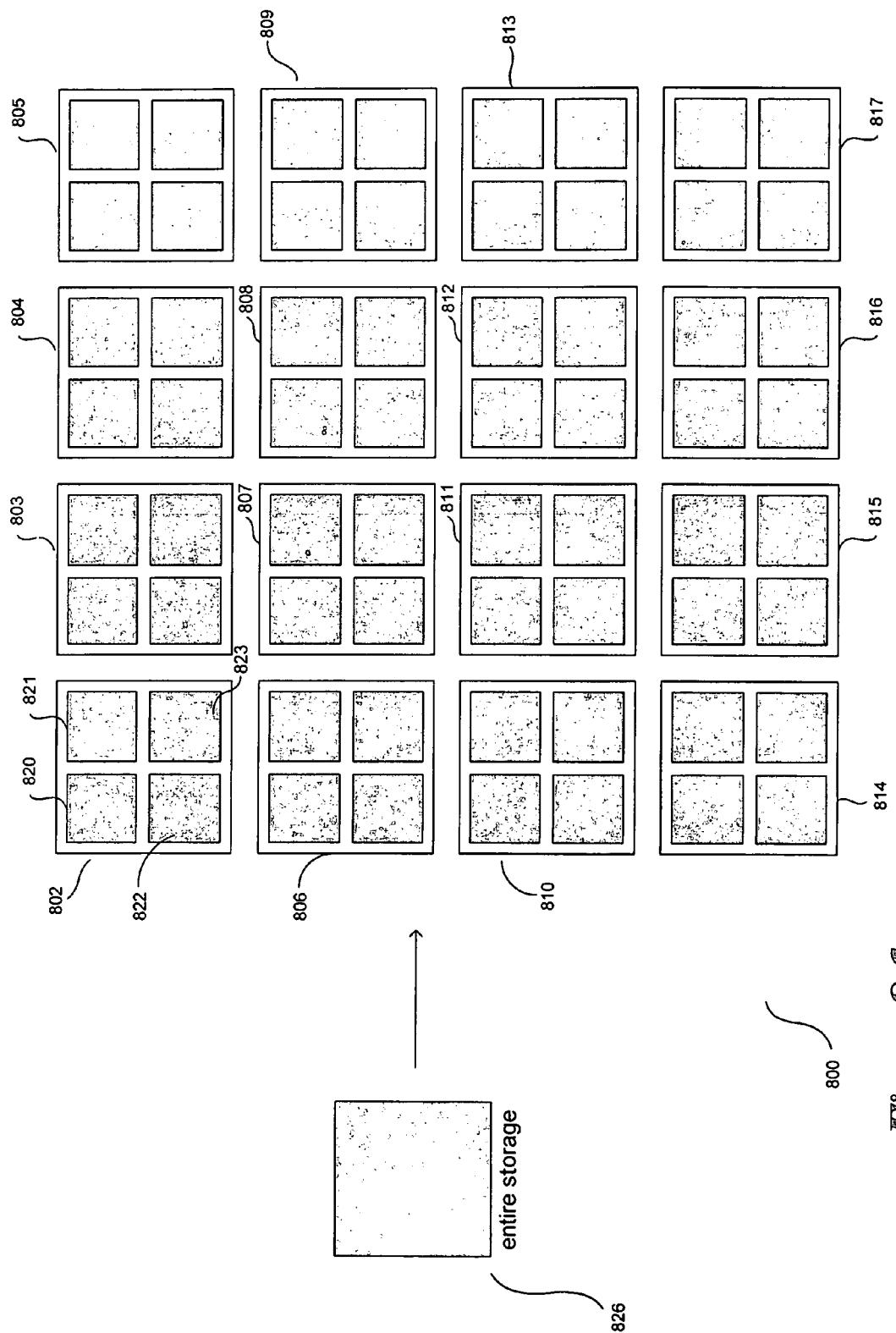

FIGS. 8A-D illustrate a hypothetical mapping of logical data units to bricks and internal disks of a FAB system that represents one embodiment of the present invention. FIGS. 8A-D all employ the same illustration conventions, discussed next with reference to FIG. 8A. The FAB system is represented as 16 bricks 802-817. Each brick is shown as containing four internal disk drives, such as internal disk drives 820-823 within brick 802. In FIGS. 8A-D, the logical data unit being illustrated is shown on the left-hand side of the figure. The logical data unit illustrated in FIG. 8A is the entire available storage space 826. Shading within the square representations of internal disk drives indicates regions of the internal disk drives to which the logical data unit illustrated in the figure is mapped. For example, in FIG. 8A, the entire storage space 826 is shown to be mapped across the entire space available on all internal disk drives of all bricks. It should be noted that a certain, small amount of internal storage space may be reserved for control and management purposes by the control logic of each brick, but that internal space is not shown in FIG. 8A. Also, data may reside in cache in random-access memory, prior to being written to disk, but the storage space is, for the purposes of FIGS. 8A-D, considered to comprise only 4 internal disks for each brick, for simplicity of illustration.

Figure 8C:
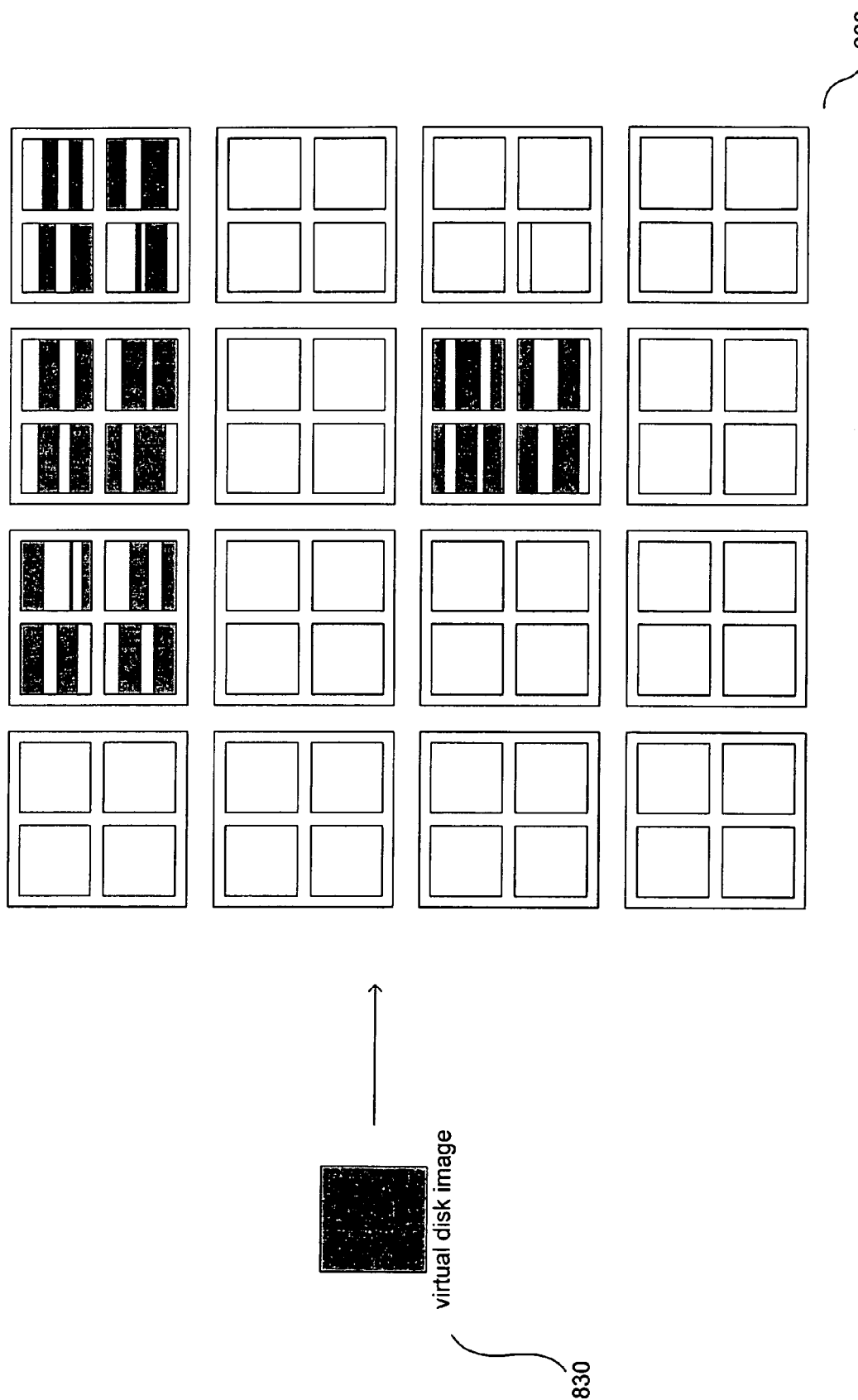

FIG. 8B shows an exemplary mapping of a virtual-disk logical data unit 828 to the storage space of the FAB system 800. FIG. 8B illustrates that a virtual disk may be mapped to portions of many, or even all, internal disks within bricks of the FAB system 800. FIG. 8C illustrates an exemplary mapping of a virtual-disk-image logical data unit 830 to the internal storage space of the FAB system 800. A virtual-disk-image logical data unit may be mapped to a large portion of the internal storage space of a significant number of bricks within a FAB system. The virtual-disk-image logical data unit represents a copy, or image, of a virtual disk. Virtual disks may be replicated as two or more virtual disk images, each virtual disk image in discrete partition of bricks within a FAB system, in order to provide a high-level of redundancy. Virtual-disk replication allows, for example, virtual disks to be replicated over geographically distinct, discrete partitions of the bricks within a FAB system, so that a large scale catastrophe at one geographical location does not result in unrecoverable loss of virtual disk data.

FIG. 8D illustrates an exemplary mapping of a segment 832 to the internal storage space within bricks of a FAB system 800. As can be seen in FIG. 8D, a segment may be mapped to many small portions of the internal disks of a relatively small subset of the bricks within a FAB system. As discussed above, a segment is, in many embodiments of the present invention, the logical data unit level for distribution of data according to lower-level redundancy schemes, including erasure coding schemes and mirroring schemes. Thus, if no data redundancy is desired, a segment can be mapped to a single disk drive of a single brick. However, for most purposes, segments will be at least mirrored to two bricks. As discussed above, a brick distributes the pages of a segment or portion of a segment among its internal disks according to various considerations, including available space, and including optimal distributions to take advantage of various characteristics of internal disk drives, including head movement delays, rotational delays, access frequency, and other considerations.

Figure 9:
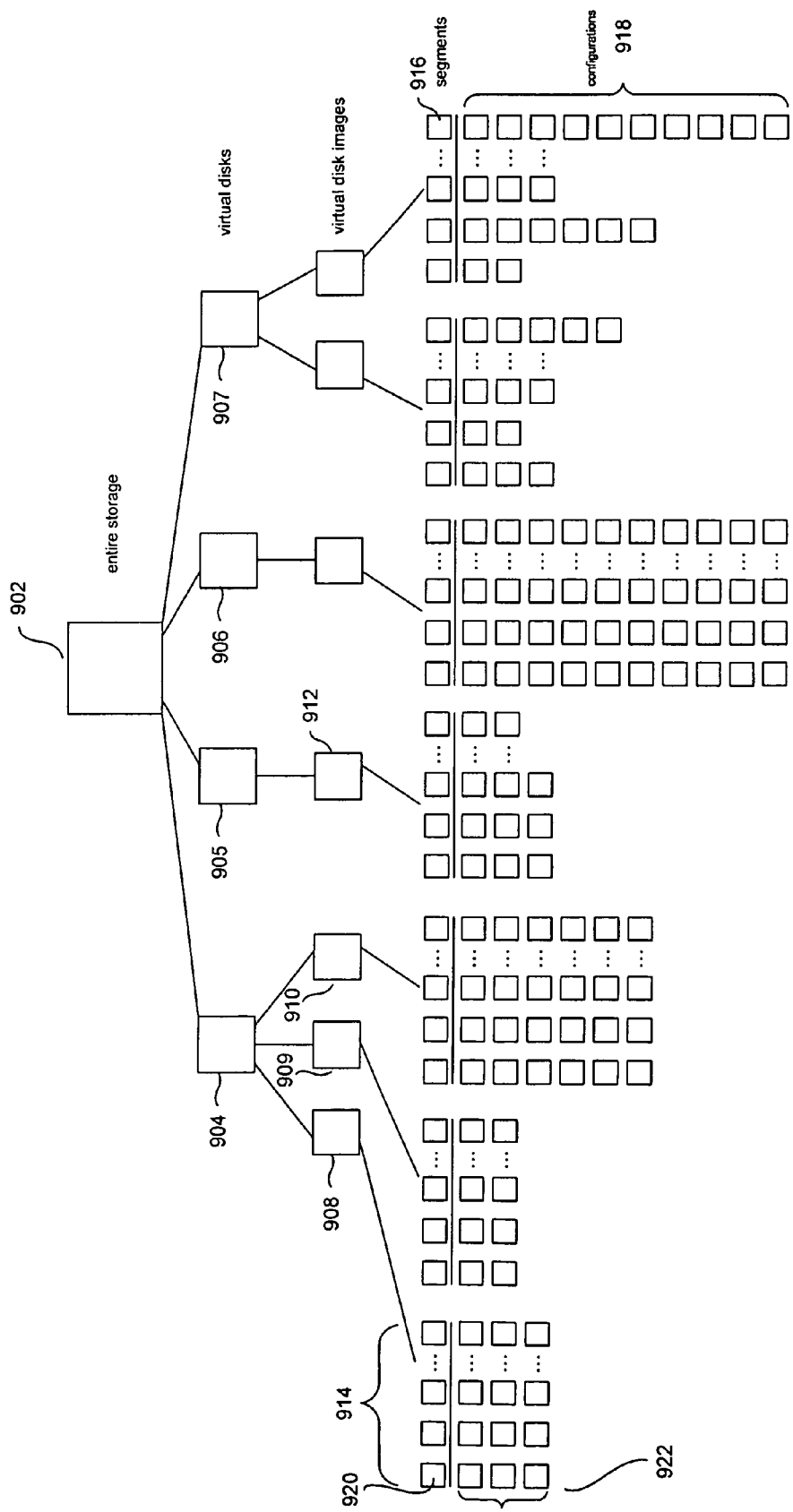
FIG. 9 illustrates, using a different illustration convention, the logical data units employed within a FAB system that represent one embodiment of the present invention.

FIG. 9 illustrates the logical data units employed within a FAB system that represent one embodiment of the present invention. The entire available data-storage space 902 may be partitioned into virtual disks 904-907. The virtual disks are, in turn, replicated, when desired, into multiple virtual disk images. For example, virtual disk 904 is replicated into virtual disk images 908-910. If the virtual disk is not replicated, the virtual disk may be considered to comprise a single virtual disk image. For example, virtual disk 905 corresponds to the single virtual disk image 912. Each virtual disk image comprises an ordered sequence of segments. For example, virtual disk image 908 comprises an ordered list of segments 914. Each segment is distributed across one or more bricks according to a redundancy scheme. For example, in FIG. 9, segment 916 is distributed across 10 bricks 918 according to an 8+2 erasure coding redundancy scheme. As another example, segment 920 is shown in FIG. 9 as distributed across three bricks 922 according to a triple-mirroring redundancy scheme.

FAB Data-State-Describing Data Structure

As discussed above, each brick within a FAB system may execute essentially the same control program, and each brick can receive and respond to requests from remote host computers. Therefore, each brick contains data structures that represent the overall data state of the FAB system, down to, but generally not including, brick-specific state information appropriately managed by individual bricks, in internal, volatile random access memory, non-volatile memory, and/or internal disk space, much as each cell of the human body contains the entire DNA-encoded architecture for the entire organism. The overall data state includes the sizes and locations of the hierarchical data units shown in FIG. 9, along with information concerning the operational states, or health, of bricks and the redundancy schemes under which segments are stored. In general, brick-specific data-state information, including the internal page and block addresses of data stored within a brick, is not considered to be part of the overall data state of the FAB system.

Figure 10A:
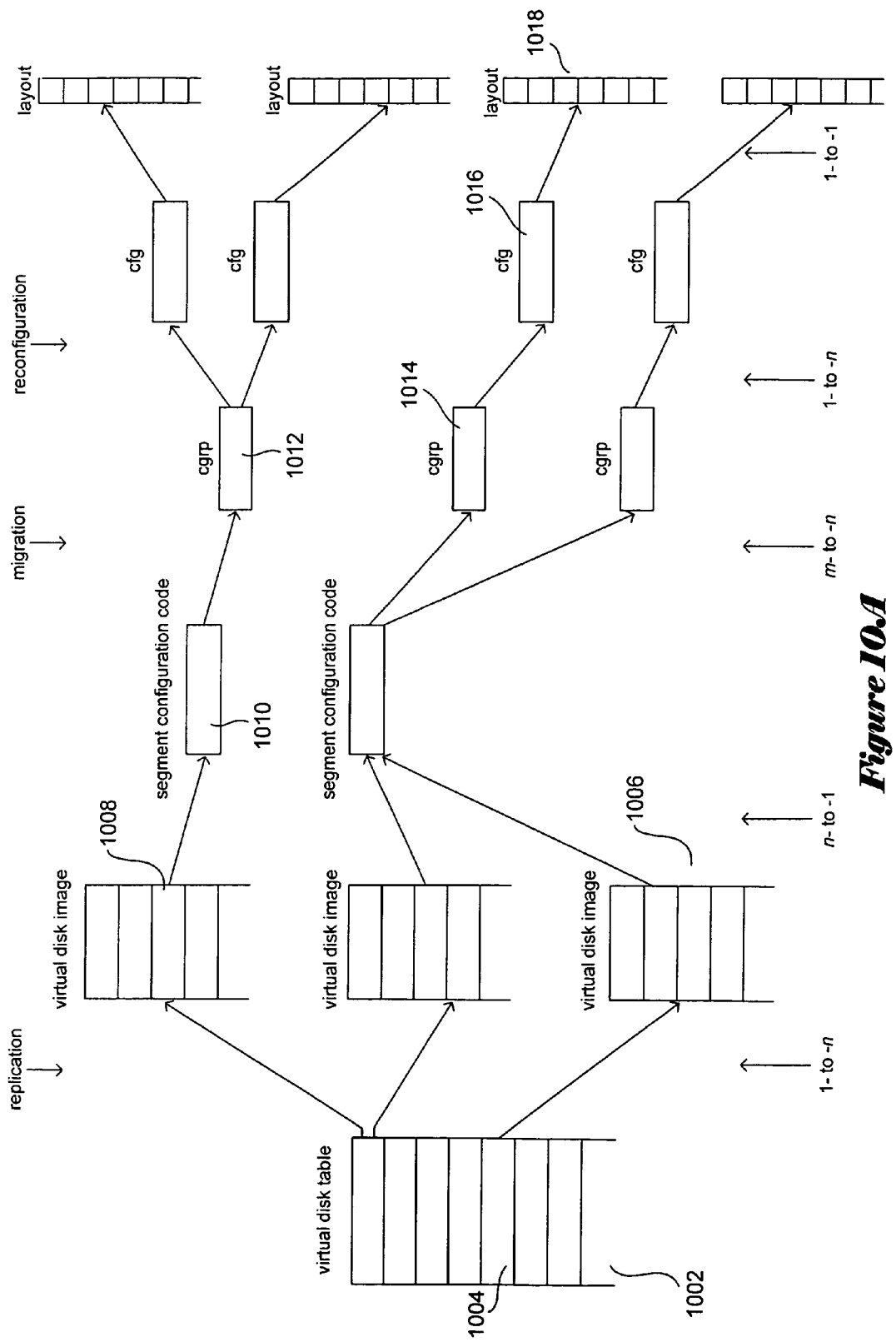
FIG. 10A illustrates the data structure maintained by each brick that describes the overall data state of the FAB system and that represents one embodiment of the present invention.

FIG. 10A illustrates the data structure maintained by each brick that describes the overall data state of the FAB system and that represents one embodiment of the present invention. The data structure is generally hierarchical, in order to mirror the hierarchical logical data units described in the previous subsection. At the highest level, the data structure may include a virtual disk table 1002, each entry of which describes a virtual disk. Each virtual disk table entry ("VDTE") may reference one or more virtual-disk-image ("VDI") tables. For example, VDTE 1004 references VDI table 1006 in FIG. 10A. A VDI table may include a reference to a segment configuration node ("SCN") for each segment of the virtual disk image. Multiple VDI-table entries may reference a single SCN, in order to conserve memory and storage space devoted to the data structure. In FIG. 10A, the VDI-table entry 1008 references SCN 1010. Each SCN may represent one or two configuration groups ("cgrp"). For example, in FIG. 10A, SCN 1010 references cgrp 1012. Each cgrp may reference one or more configurations ("cfg"). For example, in FIG. 10A, cgrp 1014 references cfg 1016. Finally, each cfg may be associated with a single layout data-structure element. For example, in FIG. 10A, cfg 1016 is associated with layout data-structure element 1018. The layout data-structure element may be contained within the cfg with which it is associated, or may be distinct from the cfg, and may contain indications of the bricks within the associated cfg. The VDI table may be quite large, and efficient storage schemes may be employed to efficiently store the VDI table, or portions of the VDI table, in memory and in a non-volatile storage medium. For example, a UNIX-like i-node structure, with a root node directly containing references to segments, and with additional nodes with indirect references or doubly indirect references through nodes containing i-node references to additional segment-reference-containing nodes. Other efficient storage schemes are possible.

For both the VDI table, and all other data-structure elements of the data structure maintained by each brick that describes the overall data state of the FAB system, a wide variety of physical representations and storage techniques may be used. As one example, variable length data-structure elements can be allocated as fixed-length data-structure elements of sufficient size to contain a maximum possible or maximum expected number of data entries, or may be represented as linked-lists, trees, or other such dynamic data-structure elements which can be, in real time, resized, as needed, to accommodate new data or for removal of no-longer-needed data. Nodes represented as being separate and distinct in the tree-like representations shown in FIGS. 10A and 11A-H may, in practical implementations, be stored together in tables, while data-structure elements shown as being stored in nodes or tables may alternatively be stored in linked lists, trees, or other more complex data-structure implementations.

As discussed above, VDIs may be used to represent replication of virtual disks. Therefore, the hierarchical fan-out from VDTEs to VDIs can be considered to represent replication of virtual disks. SCNs may be employed to allow for migration of a segment from one redundancy scheme to another. It may be desirable or necessary to transfer a segment distributed according to a 4+2 erasure coding redundancy scheme to an 8+2 erasure coding redundancy scheme. Migration of the segment involves creating a space for the new redundancy scheme distributed across a potentially new group of bricks, synchronizing the new configuration with the existing configuration, and, once the new configuration is synchronized with the existing configuration, removing the existing configuration. Thus, for a period of time during which migration occurs, an SCN may concurrently reference two different cgrps representing a transient state comprising an existing configuration under one redundancy scheme and a new configuration under a different redundancy scheme. Data-altering and data-state-altering operations carried out with respect to a segment under migration are carried out with respect to both configurations of the transient state, until full synchronization is achieved, and the old configuration can be removed. Synchronization involves establishing quorums, discussed below, for all blocks in the new configuration, copying of data from the old configuration to the new configuration, as needed, and carrying out all data updates needed to carry out operations directed to the segment during migration. In certain cases, the transient state is maintained until the new configuration is entirely built, since a failure during building of the new configuration would leave the configuration unrecoverably damaged. In other cases, including cases discussed below, only minimal synchronization is needed, since all existing quorums in the old configuration remain valid in the new configuration.

Figure 10B:
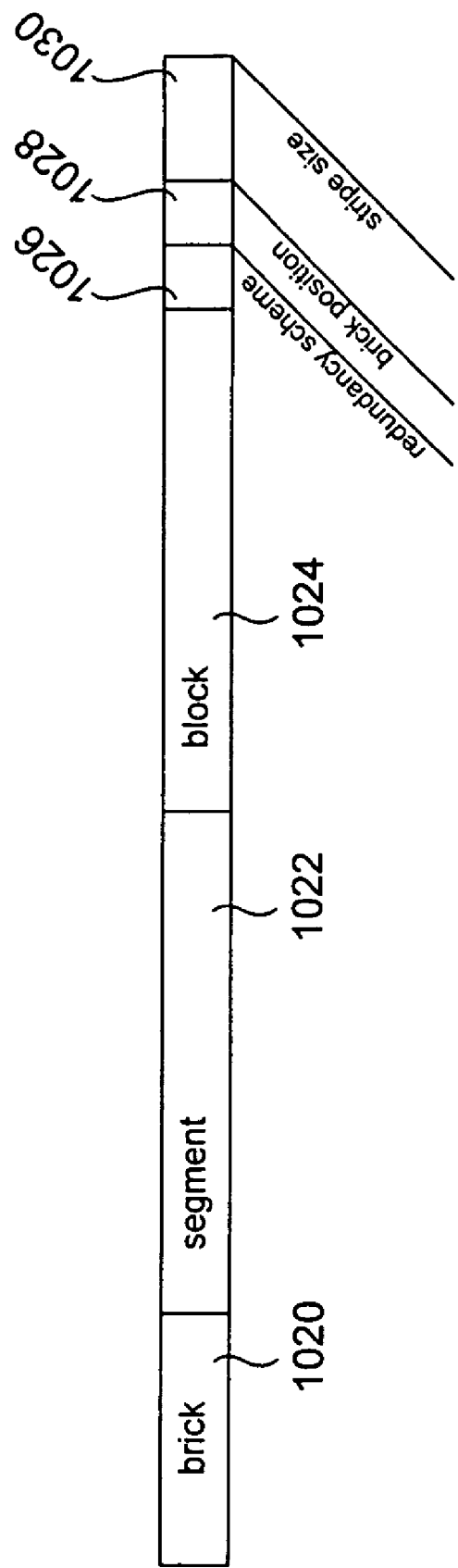
FIG. 10B illustrates a brick segment address that incorporates a brick role according to one embodiment of the present invention.

The set of bricks across which the segment is distributed according to the existing redundancy scheme may intersect with the set of bricks across which the segment is distributed according to the new redundancy scheme. Therefore, block addresses within the FAB system may include an additional field or object describing the particular redundancy scheme, or role of the block, in the case that the segment is currently under migration. The block addresses therefore distinguish between two blocks of the same segment stored under two different redundancy schemes in a single brick. FIG. 10B illustrates a brick segment address that incorporates a brick role according to one embodiment of the present invention. The block address shown in FIG. 10B includes the following fields: (1) a brick field 1020 that contains the identity of the brick containing the block referenced by the block address; (2) a segment field 1022 that contains the identity of the segment containing the block referenced by the block address; (3) a block field 1024 that contains the identity of the block within the segment identified in the segment field; (4) a field 1026 containing an indication of the redundancy scheme under which the segment is stored; (5) a field 1028 containing an indication of the brick position of the brick identified by the brick field within an erasure coding redundancy scheme, in the case that the segment is stored under an erasure coding redundancy scheme; and (6) a field 1030 containing an indication of the stripe size of the erasure coding redundancy scheme, in the case that the segment is stored under an erasure coding redundancy scheme. The block address may contain additional fields, as needed to fully describe the position of a block in a given FAB implementation. In general, fields 1026, 1028, and 1030 together compose a brick role that defines the role played by the brick storing the referenced block. Any of various numerical encodings of the redundancy scheme, brick position, and stripe size may be employed to minimize the number of bits devoted to the brick-role encoding. For example, in the case that the FAB implementation employs only a handful of different stripe sizes for various erasure coding redundancy schemes, stripe sizes may be represented by various values of an enumeration, or, in other words, by a relatively small bit field adequate to contain numerical representations of the handful of different stripe sizes.

A cgrp may reference multiple cfg data-structure elements when the cgrp is undergoing reconfiguration. Reconfiguration may involve change in the bricks across which a segment is distributed, but not a change from a mirroring redundancy scheme to an erasure-coding redundancy scheme, from one erasure-coding redundancy scheme, such as 4+3, to another erasure-coding redundancy scheme, such as 8+2, or other such changes that involve reconstructing or changing the contents of multiple bricks. For example, reconfiguration may involve reconfiguring a triple mirror stored on bricks 1, 2, and 3 to a double mirror stored on bricks 2 and 3.

A cfg data-structure element generally describes a set of one or more bricks that together store a particular segment under a particular redundancy scheme. A cfg data-structure element generally contains information about the health, or operational state, of the bricks within the configuration represented by the cfg data-structure element.

A layout data-structure element, such as layout 1018 in FIG. 10A, includes identifiers of all bricks to which a particular segment is distributed under a particular redundancy scheme. A layout data-structure element may include one or more fields that describe the particular redundancy scheme under which the represented segment is stored, and may include additional fields. All other elements of the data structure shown in FIG. 10A may include additional fields and descriptive sub-elements, as necessary, to facilitate data storage and maintenance according to the data-distribution scheme represented by the data structure. At the bottom of FIG. 10A, indications are provided for the mapping relationship between data-structure elements at successive levels. It should be noted that multiple, different segment entries within one or more VDI tables may reference a single SCN node, representing distribution of the different segments across an identical set of bricks according to the same redundancy scheme.

The data structure maintained by each brick that describes the overall data state of the FAB system, and that represents one embodiment of the present invention, is a dynamic representation that constantly changes, and that induces various control routines to make additional state changes, as blocks are stored, accessed, and removed, bricks are added and removed, bricks and interconnections fail, redundancy schemes and other parameters and characteristics of the FAB system are changed through management interfaces, and other events occur. In order to avoid large overheads for locking schemes to control and serialize operations directed to portions of the data structure, all data-structure elements from the cgrp level down to the layout level may be considered to be immutable. When their contents or interconnections need to be changed, new data-structure elements with the new contents and/or interconnections are added, and references to the previous versions eventually deleted, rather than the data-structure elements at the cgrp level down to the layout level being locked, altered, and unlocked. Data-structure elements replaced in this fashion eventually become orphaned, after the data represented by the old and new data-structure elements has been synchronized by establishing new quorums and carrying out any needed updates, and the orphaned data-structure elements are then garbage collected. This approach can be summarized by referring to the data-structure elements from the cgrp level down to the layout level as being "immutable."

Another aspect of the data structure maintained by each brick that describes the overall data state of the FAB system, and that represents one embodiment of the present invention, is that each brick may maintain both an in-memory, or partially in-memory version of the data structure, for rapid access to the most frequently and most recently accessed levels and data-structure elements, as well as a persistent version stored on a non-volatile data-storage medium. The data-elements of the in-memory version of the data-structure may include additional fields not included in the persistent version of the data structure, and generally not shown in FIGS. 10A, 11A-H, and subsequent figures. For example, the in-memory version may contain reverse mapping elements, such as pointers, that allow for efficient traversal of the data structure in bottom-up, lateral, and more complex directions, in addition to the top-down traversal indicated by the downward directions of the pointers shown in the figures. Certain of the data-structure elements of the in-memory version of the data structure may also include reference count fields to facilitate garbage collection and coordination of control-routine-executed operations that alter the state of the brick containing the data structure.

Figure 11A:
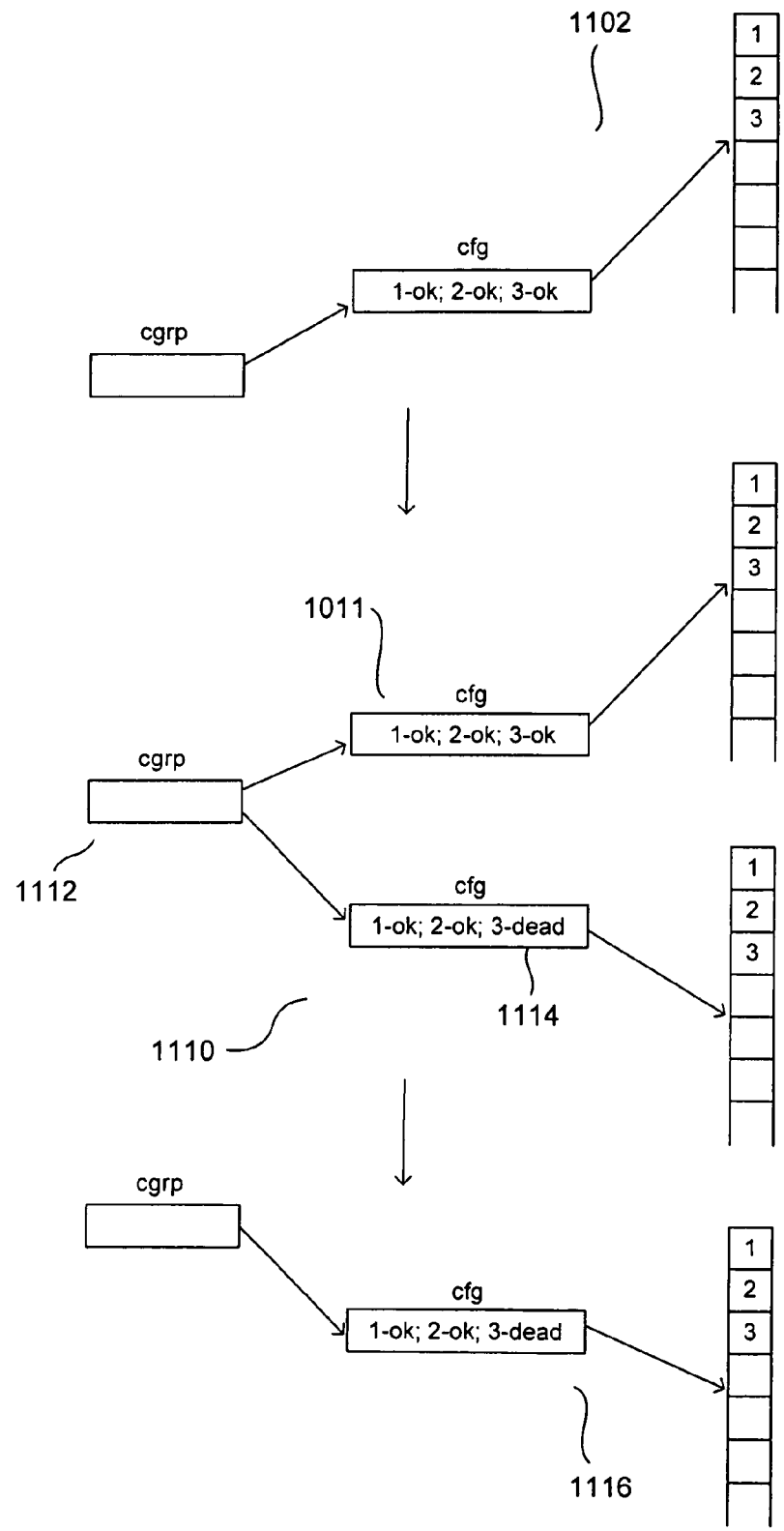
FIGS. 11A-H illustrate various different types of configuration changes reflected in the data-description data structure shown in FIG. 10A within a FAB system that represent one embodiment of the present invention.

FIGS. 11A-H illustrate various different types of configuration changes reflected in the data-description data structure shown in FIG. 10A within a FAB system that represents one embodiment of the present invention. FIGS. 11A-D illustrate a simple configuration change involving a change in the health status of a brick. In this case, a segment distributed over bricks 1, 2, and 3 according to a triple mirroring redundancy scheme (1102 in FIG. 11A) is either reconfigured to being distributed over: (1) bricks 1, 2, and 3 according to a triple mirroring scheme (1104 in FIG. 11B), due to repair of brick 3; (2) bricks 1, 2, and 4 according to a triple mirroring scheme (1106 in FIG. 11C), due to failure of brick 3 and replacement of brick 3 by spare storage space within brick 4; or (3) bricks 1 and 2 according to a double mirroring scheme (1108 in FIG. 11D), due to failure of brick 3. When the failure of brick 3 is first detected, a new cgrp 1112 that includes a new cfg 1110 with the brick-health indication for brick 3 1114 indicating that brick 3 is dead, as well as a copy of the initial cfg 1011, is added to the data structure, replacing the initial cgrp, cfg, and layout representation of the distributed segment (1102 in FIG. 11). The "dead brick" indication stored for the health status of brick 3 is an important feature of the overall data structure shown in FIG. 10A. The "dead brick" status allows a record of a previous participation of a subsequently failed brick to be preserved in the data structure, to allow for subsequent synchronization and other operations that may need to be aware of the failed brick's former participation. Once any synchronization between the initial configuration and new configuration is completed, including establishing new quorums for blocks without current quorums due to the failure of brick 3, and a new representation of the distributed segment 1116 is added to the data structure, the transient, 2-cfg representation of the distributed segment comprising data-structure elements 1110-1112 can be deleted and garbage collected, leaving the final description of the distributed segment 1116 with a single cfg data structure indicating that brick 3 has failed. In FIGS. 11A-D, and in subsequent figures, only the relevant portion of the data structure is shown, assuming an understanding that, for example, the cgrps shown in FIG. 11A are referenced by one or more SCN nodes.

Figure 11B:
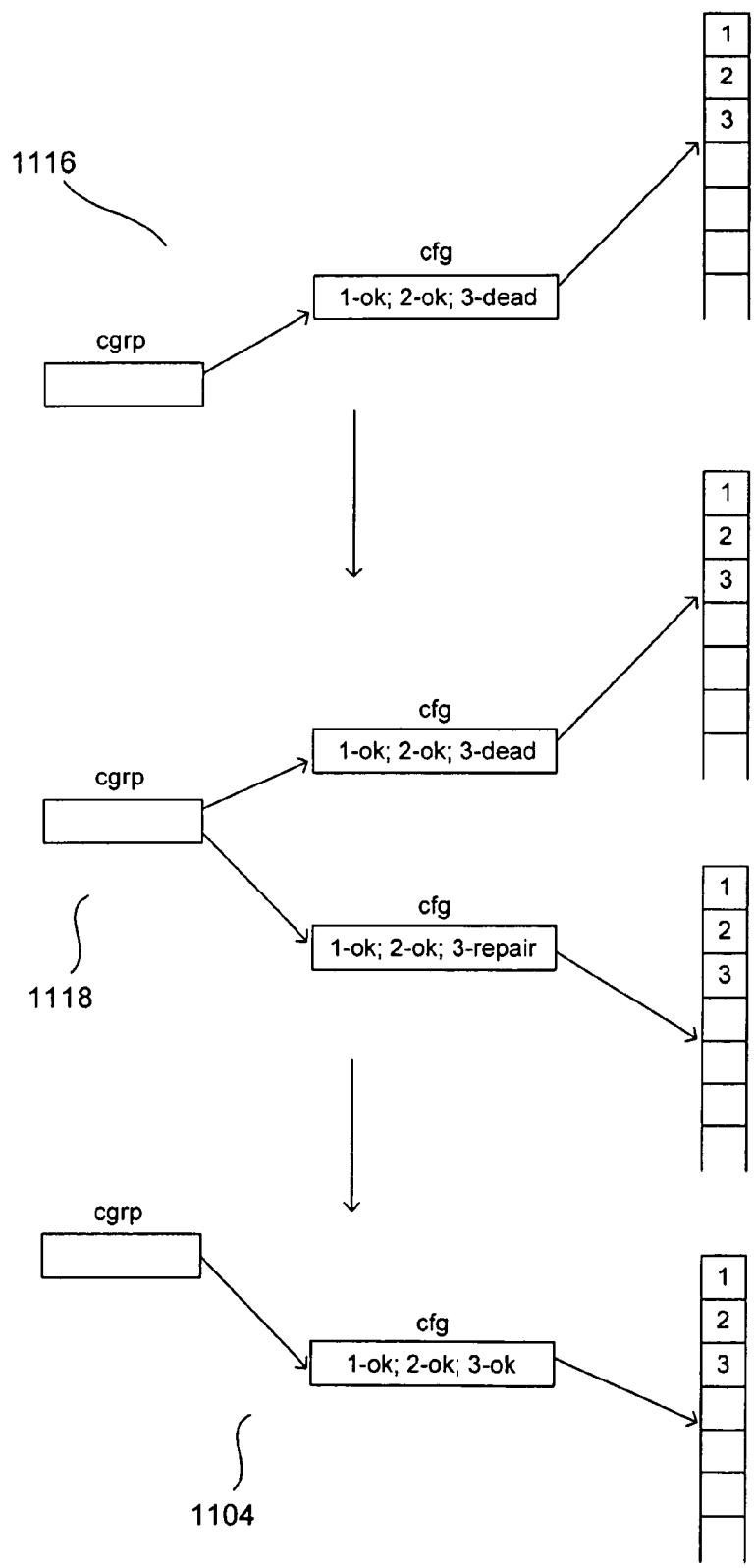
Figure 11C:
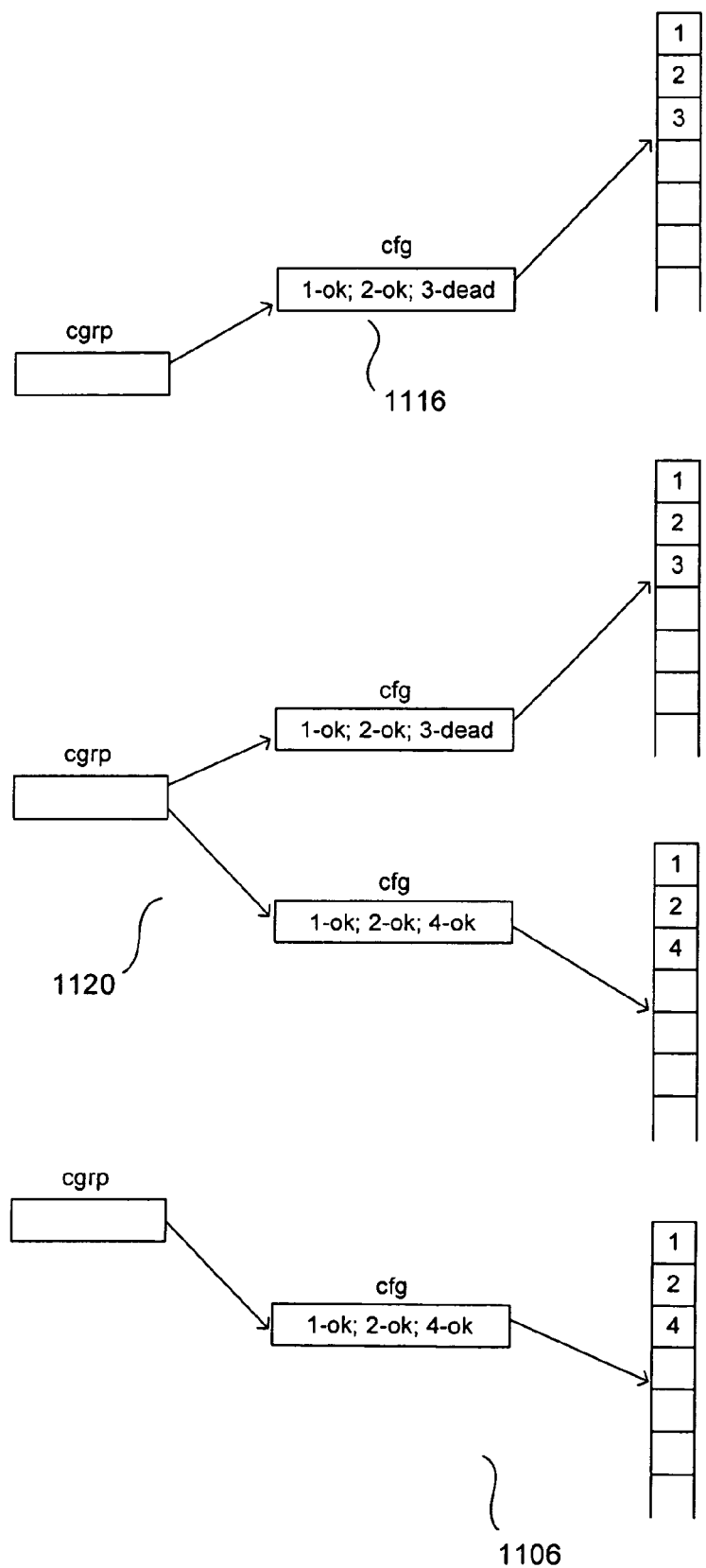
Figure 11D:
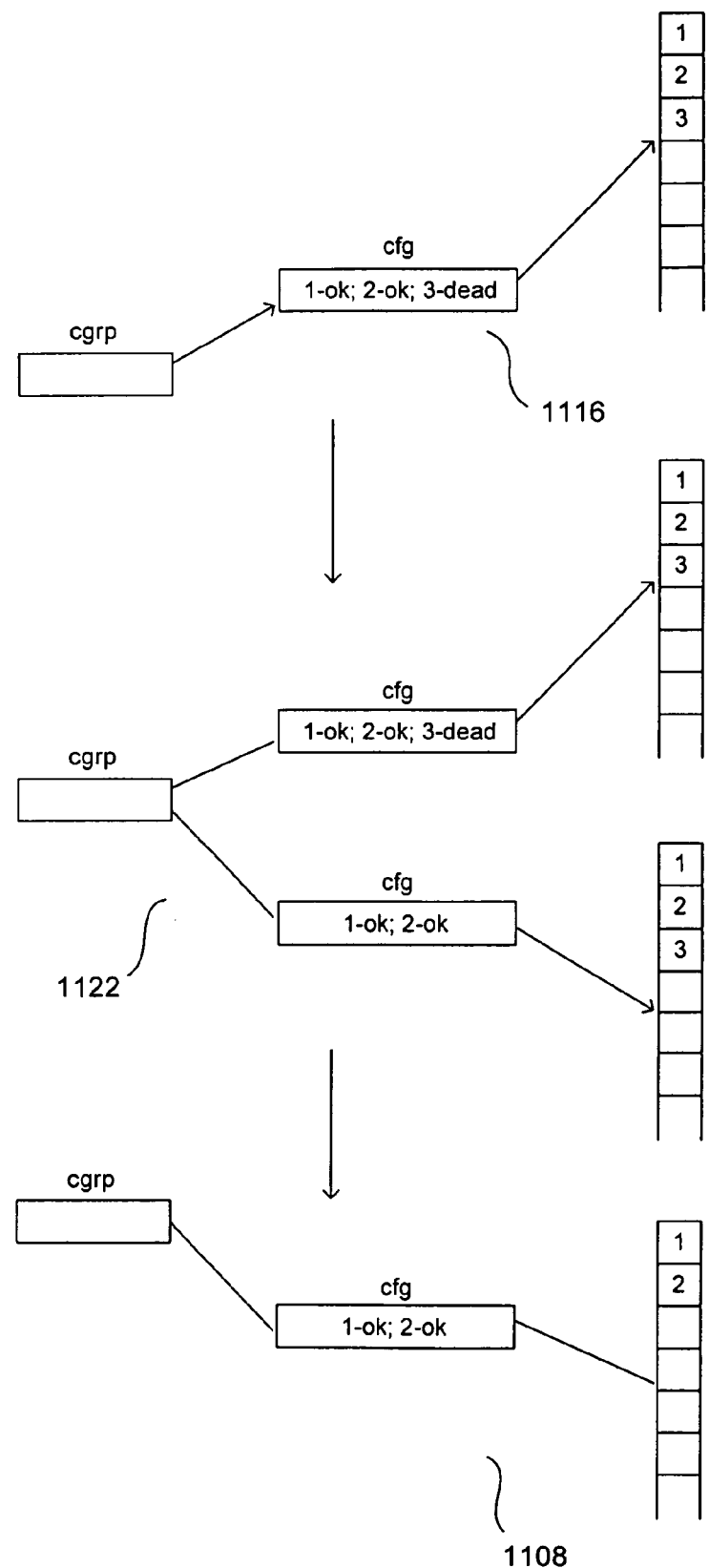

FIGS. 11B-D describe three different outcomes for the failure of brick 3, each starting with the representation of the distributed segment 1116 shown at the bottom of FIG. 11A. All three outcomes involve a transient, 2-cfg state, shown as the middle state of the data structure, composed of yet another new cgrp referencing two new cfg data-structure elements, one containing a copy of the cfg from the representation of the distributed segment 1116 shown at the bottom of FIG. 11A, and the other containing new brick-health information. In FIG. 11B, brick 3 is repaired, with the transient 2-cfg state 1118 includes both descriptions of the failed state of brick 3 and a repaired state of brick 3. In FIG. 11C, brick 3 is replaced by spare storage space on brick 4, with the transient 2-cfg state 1120 including both descriptions of the failed state of brick 3 and a new configuration with brick 3 replaced by brick 4. In FIG. 11D, brick 3 is completely failed, and the segment reconfigured to distribution over 2 bricks rather than 3, with the transient 2-cfg state 1122 including both descriptions of the failed state of brick 3 and a double-mirroring configuration in which the data is distributed over bricks 1 and 2.

Figure 11E:
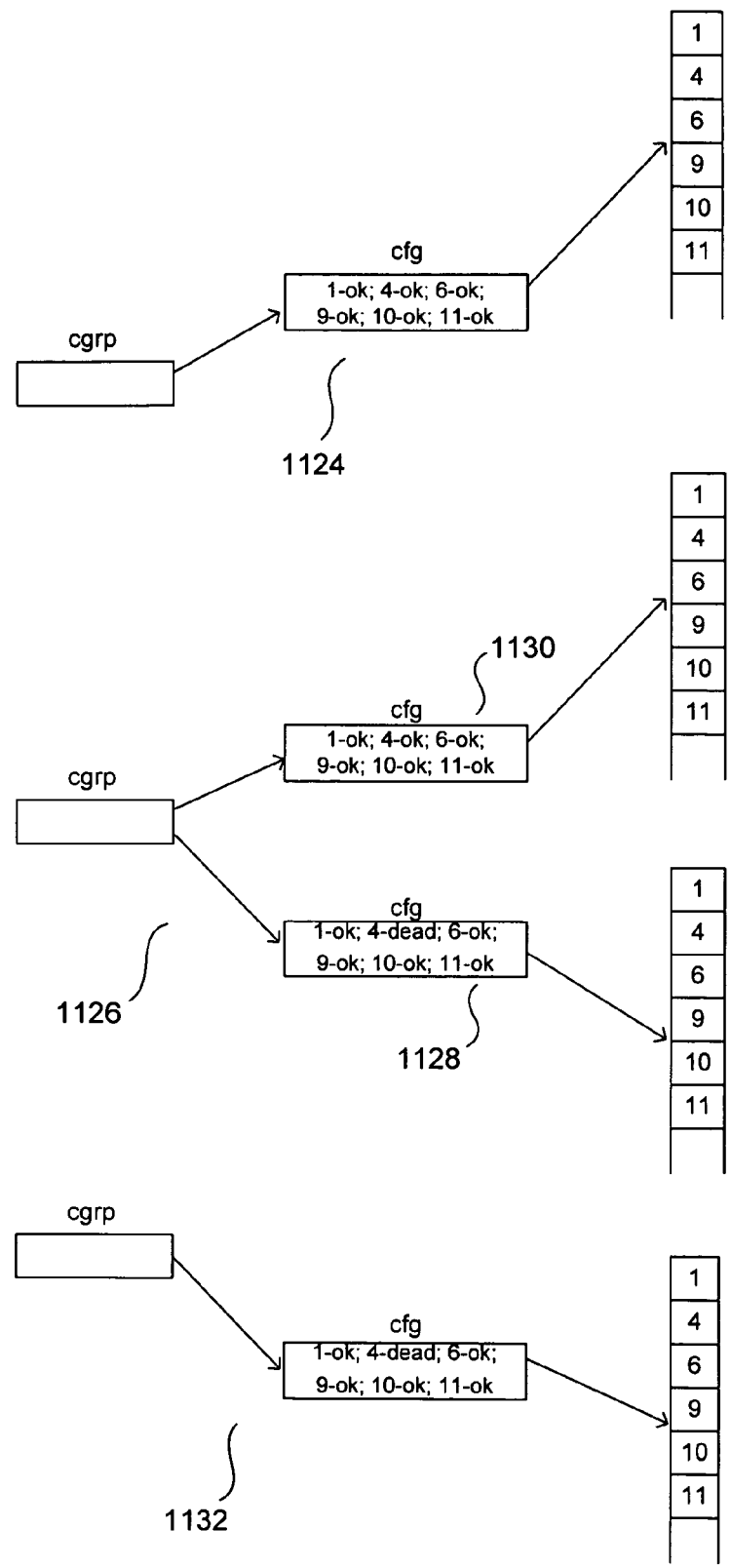
Figure 11F:
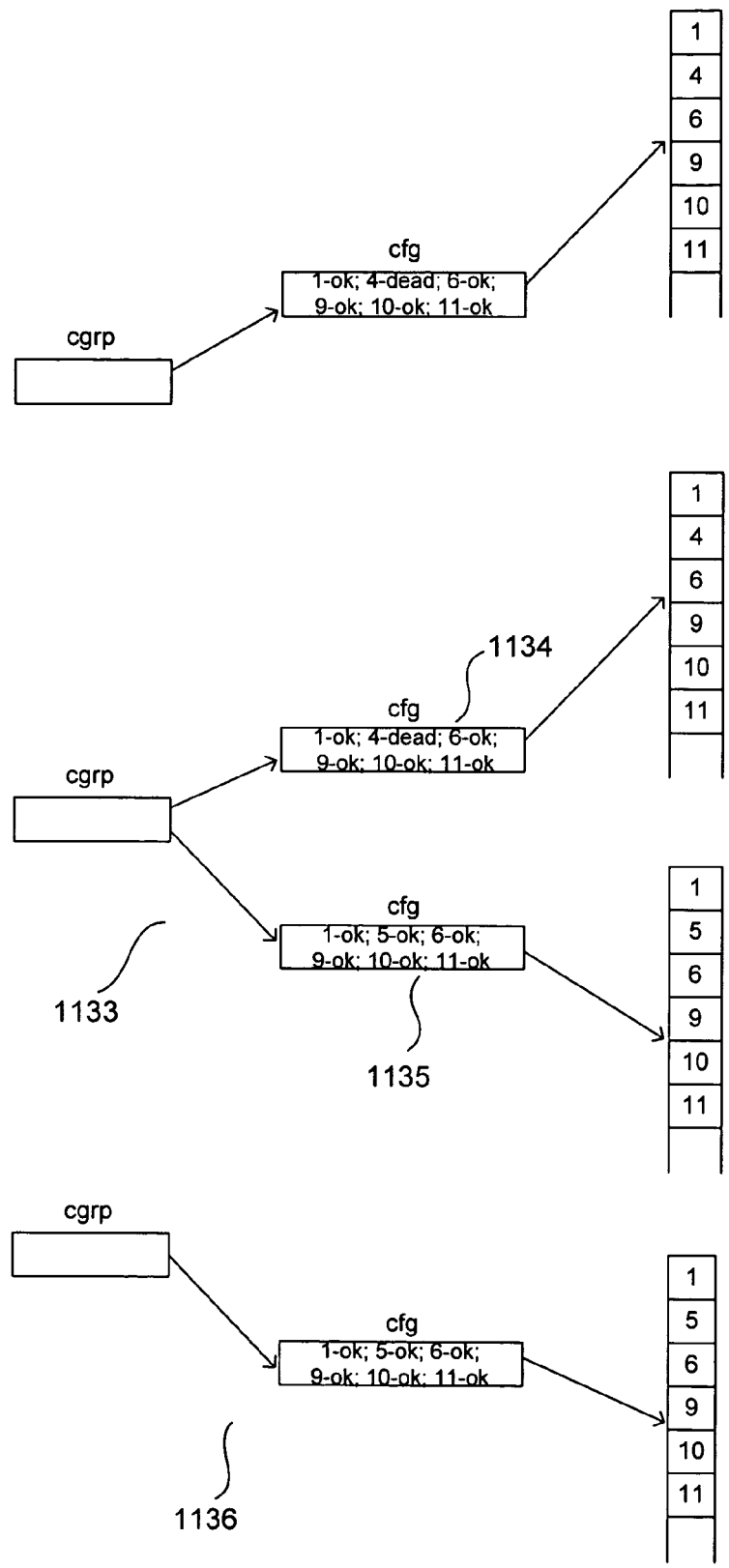

FIGS. 11E-F illustrate loss of a brick across which a segment is distributed according to a 4+2 erasure coding redundancy scheme, and substitution of a new brick for the lost brick. Initially, the segment is distributed over bricks 1, 4, 6, 9, 10, and 11 (1124 in FIG. 11E). When a failure at brick 4 is detected, a transient 2-cfg state 1126 obtains, including a new cgrp that references two new cfg data-structure elements, the new cfg 1128 indicating that brick 4 has failed. The initial representation of the distributed segment 1124 can then be garbage collected. Once synchronization of the new configuration, with a failed brick 4, is carried out with respect to the old configuration, and a description of the distributed segment 1132 with a new cgrp referencing a single cfg data-structure element indicating that brick 4 has failed has been added, the transient 2-cfg representation 1126 can be garbage collected. Next, a new configuration, with spare storage space on brick 5 replacing the storage space previously provided by brick 4, is added to create a transient 2-cfg state 1133, with the previous representation 1132 then garbage collected. Once synchronization of the new configuration, with brick 5 replacing brick 4, is completed, and a final, new representation 1136 of the distributed segment is added, the transient 2-cfg representation 1134 can be garbage collected.

The two alternative configurations in 2-cfg transient states, such as cfgs 1134 and 1135 in FIG. 11F, are concurrently maintained in the transient 2-cfg representations shown in FIGS. 11A-F during the time that the new configuration, such as cfg 1135 in FIG. 11F, is synchronized with the old configuration, such as cfg 1134 in FIG. 11F. For example, while the contents of brick 5 are being reconstructed according to the matrix inversion method discussed in a previous subsection, new WRITE operations issued to the segment are issued to both configurations, to be sure that the WRITE operations successfully complete on a quorum of bricks in each configuration. Quorums and other consistency mechanisms are discussed below. Finally, when the new configuration 1135 is fully reconstructed, and the data state of the new configuration is fully synchronized to the data state of the old configuration 1114, the old configuration can be removed by replacing the entire representation 1133 with a new representation 1136 that includes only the final configuration, with the transient 2-cfg representation then garbage collected. By not changing existing data-structure elements at the cgrp and lower levels, but by instead adding new data-structure elements through the 2-cfg transient states, the appropriate synchronization can be completed, and no locking or other serialization techniques need be employed to control access to the data structure. WRITE operations are illustrative of operations on data that alter the data state within one or more bricks, and therefore, in this discussion, are used to represent the class of operations or tasks during the execution of which data consistency issues arise due to changes in the data state of the FAB system. However, other operations and tasks may also change the data state, and the above-described techniques allow for proper transition between configurations when such other operations and tasks are carried out in a FAB implementation. In still other cases, the 2-cfg transient representations may not be needed, or may not be needed to be maintained for significant periods, when all quorums for blocks under an initial configuration remain essentially unchanged and valid in the new configuration. For example, when a doubly mirrored segment is reconfigured to a non-redundant configuration, due to failure of one of two bricks, all quorums remain valid, since a majority of bricks in the doubly mirrored configuration needed to agree on the value of each block, meaning that all bricks therefore agreed in the previous configuration, and no ambiguities or broken quorums result from loss of one of the two bricks.

Figure 11G:
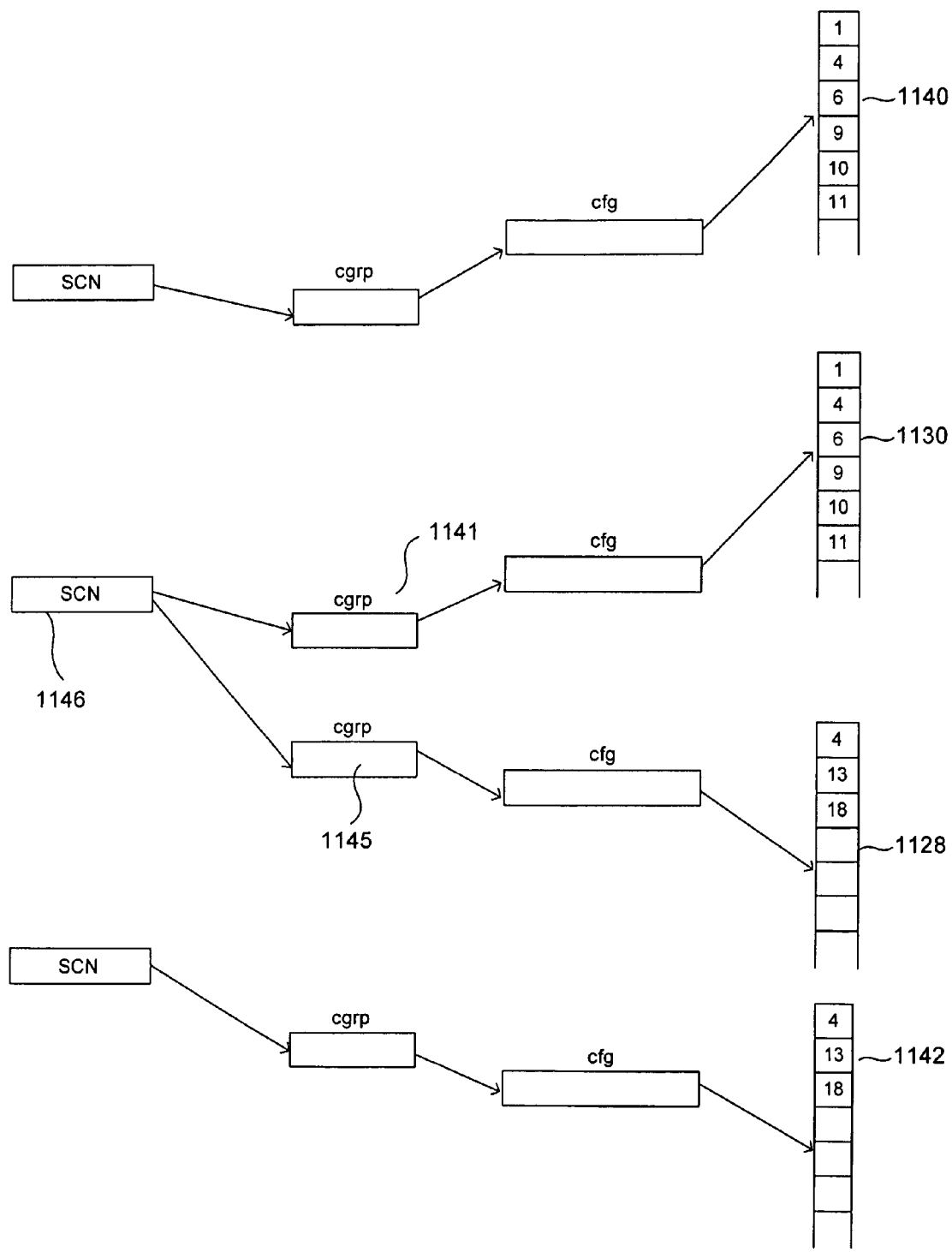

FIG. 11G illustrates a still more complex configuration change, involving a change in the redundancy scheme by which a segment is distributed over bricks of a FAB system. In the case shown in FIG. 11G, a segment initially distributed according to a 4+2 erasure coding redundancy over bricks 1, 4, 6, 9, 10, and 11 (1140 in FIG. 11G) migrates to a triple mirroring redundancy scheme over bricks 4, 13, and 18 (1142 in FIG. 11G). Changing the redundancy scheme involves maintaining two different cgrp data-structure elements 1144-1145 referenced from an SCN node 1146 while the new configuration 1128 is being synchronized with the previous configuration 1140. Control logic at the SCN level coordinates direction of WRITE operations to the two different configurations while the new configuration is synchronized with the old configuration, since the techniques for ensuring consistent execution of WRITE operations differ in the two different redundancy schemes. Because SCN nodes may be locked, or access to SCN nodes may be otherwise operationally controlled, the state of an SCN node may be altered during a migration. However, because SCN nodes may be referenced by multiple VDI-table entries, a new SCN node 1146 is generally allocated for the migration operation.

Figure 11H:
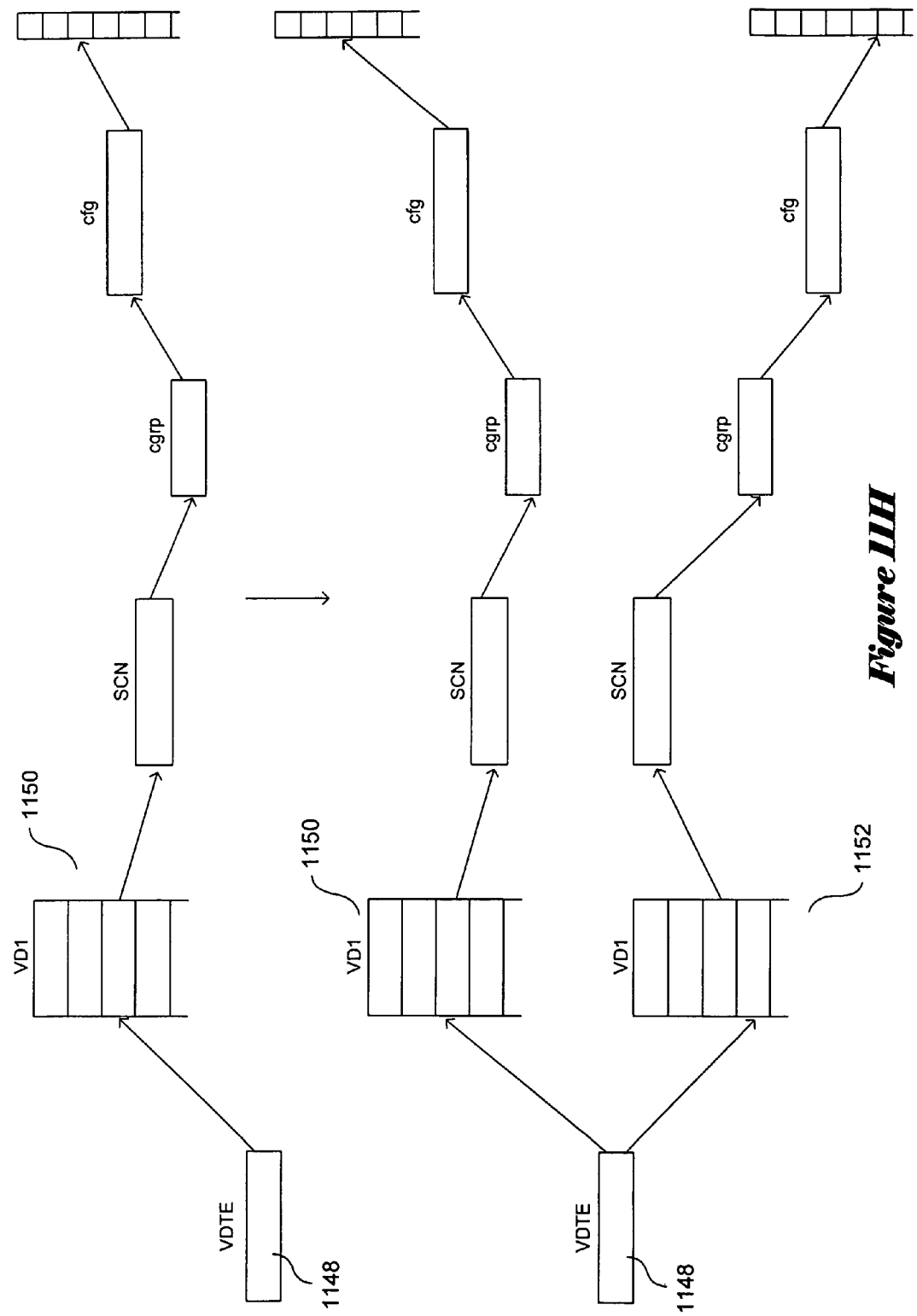

Finally, FIG. 11H illustrates an exemplary replication of a virtual disk within a FAB system. The virtual disk is represented by a VDTE entry 1148 that references a single VDI table 1150. Replication of the virtual disk involves creating a new VDI table 1152 that is concurrently referenced from the VDTE 1132 along with the original VDI table 1150. Control logic at the virtual-disk level within the hierarchy of control logic coordinates synchronization of the new VDI with the previous VDI, continuing to field WRITE operations directed to the virtual disk during the synchronization process.

The hierarchical levels within the data description data structure shown in FIG. 10A reflect control logic levels within the control logic executed by each brick in the FAB system. The control-logic levels manipulate the data-structure elements at corresponding levels in the data-state-description data structure, and data-structure elements below that level. A request received from a host computer is initially received at a top processing level and directed, as one or more operations for execution, by the top processing level to an appropriate virtual disk. Control logic at the virtual-disk level then directs the operation to one or more VDIs representing one or more replicates of the virtual disk. Control logic at the VDI level determines the segments in the one or more VDIs to which the operation is directed, and directs the operation to the appropriate segments. Control logic at the SCN level directs the operation to appropriate configuration groups, and control logic at the configuration-group level directs the operations to appropriate configurations. Control logic at the configuration level directs the requests to bricks of the configuration, and internal-brick-level control logic within bricks maps the requests to particular pages and blocks within the internal disk drives and coordinates local, physical access operations.

Storage Register Model

The FAB system may employ a storage-register model for quorum-based, distributed READ and WRITE operations. A storage-register is a distributed unit of data. In current FAB systems, blocks are treated as storage registers.

Figure 12:
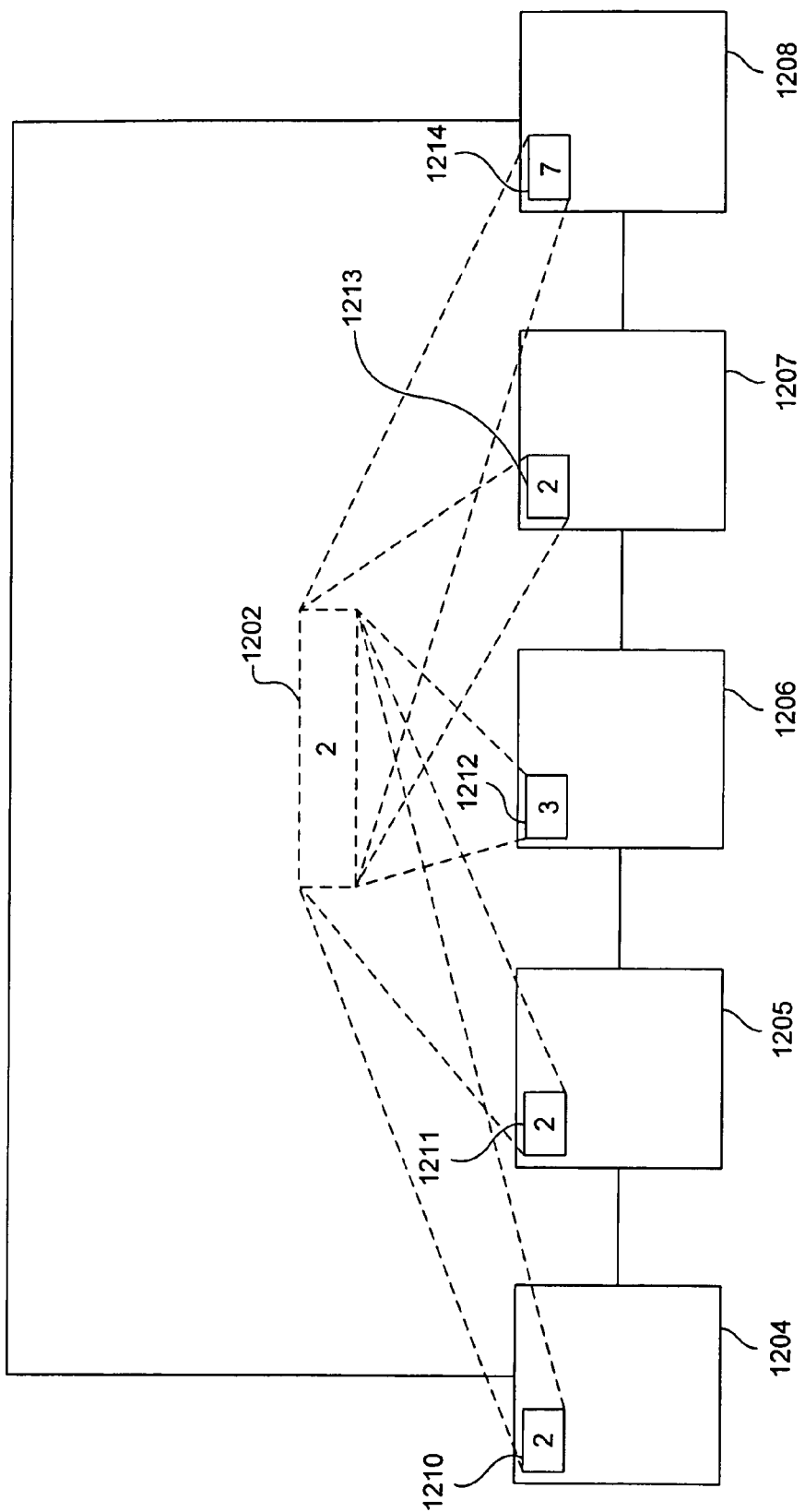
FIGS. 12-18 illustrate the basic operation of a distributed storage register.

FIGS. 12-18 illustrate the basic operation of a distributed storage register. As shown in FIG. 12, the distributed storage register 1202 is preferably an abstract, or virtual, register, rather than a physical register implemented in the hardware of one particular electronic device. Each process running on a processor or computer system 1204-1208 employs a small number of values stored in dynamic memory, and optionally backed up in non-volatile memory, along with a small number of distributed-storage-register-related routines, to collectively implement the distributed storage register 1202. At the very least, one set of stored values and routines is associated with each processing entity that accesses the distributed storage register. In some implementations, each process running on a physical processor or multi-processor system may manage its own stored values and routines and, in other implementations, processes running on a particular processor or multi-processor system may share the stored values and routines, providing that the sharing is locally coordinated to prevent concurrent access problems by multiple processes running on the processor.

In FIG. 12, each computer system maintains a local value 1210-1214 for the distributed storage register. In general, the local values stored by the different computer systems are normally identical, and equal to the value of the distributed storage register 1202. However, occasionally the local values may not all be identical, as in the example shown in FIG. 12, in which case, if a majority of the computer systems currently maintain a single locally stored value, then the value of the distributed storage register is the majority-held value.

Figure 13:
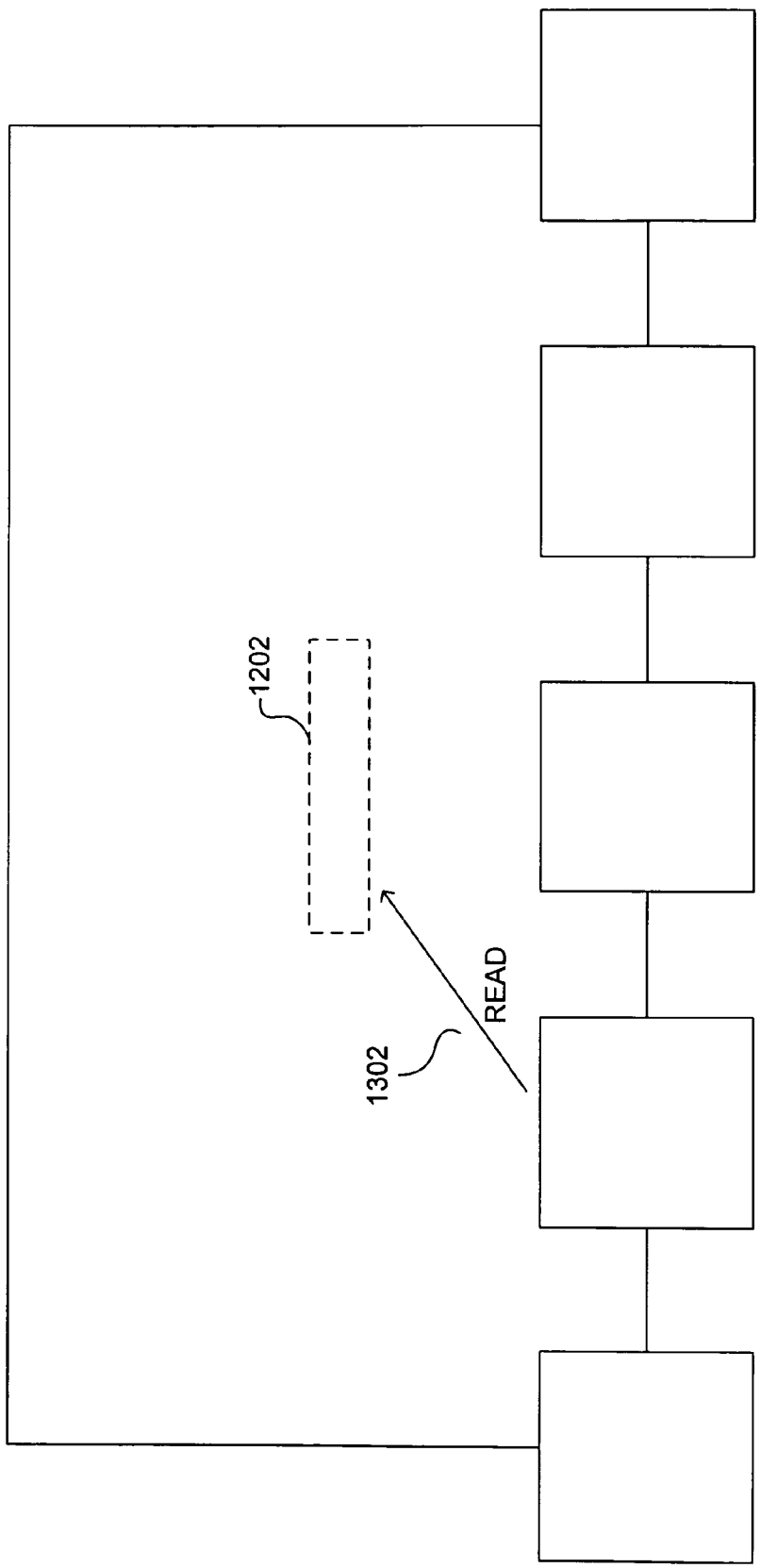
Figure 14:
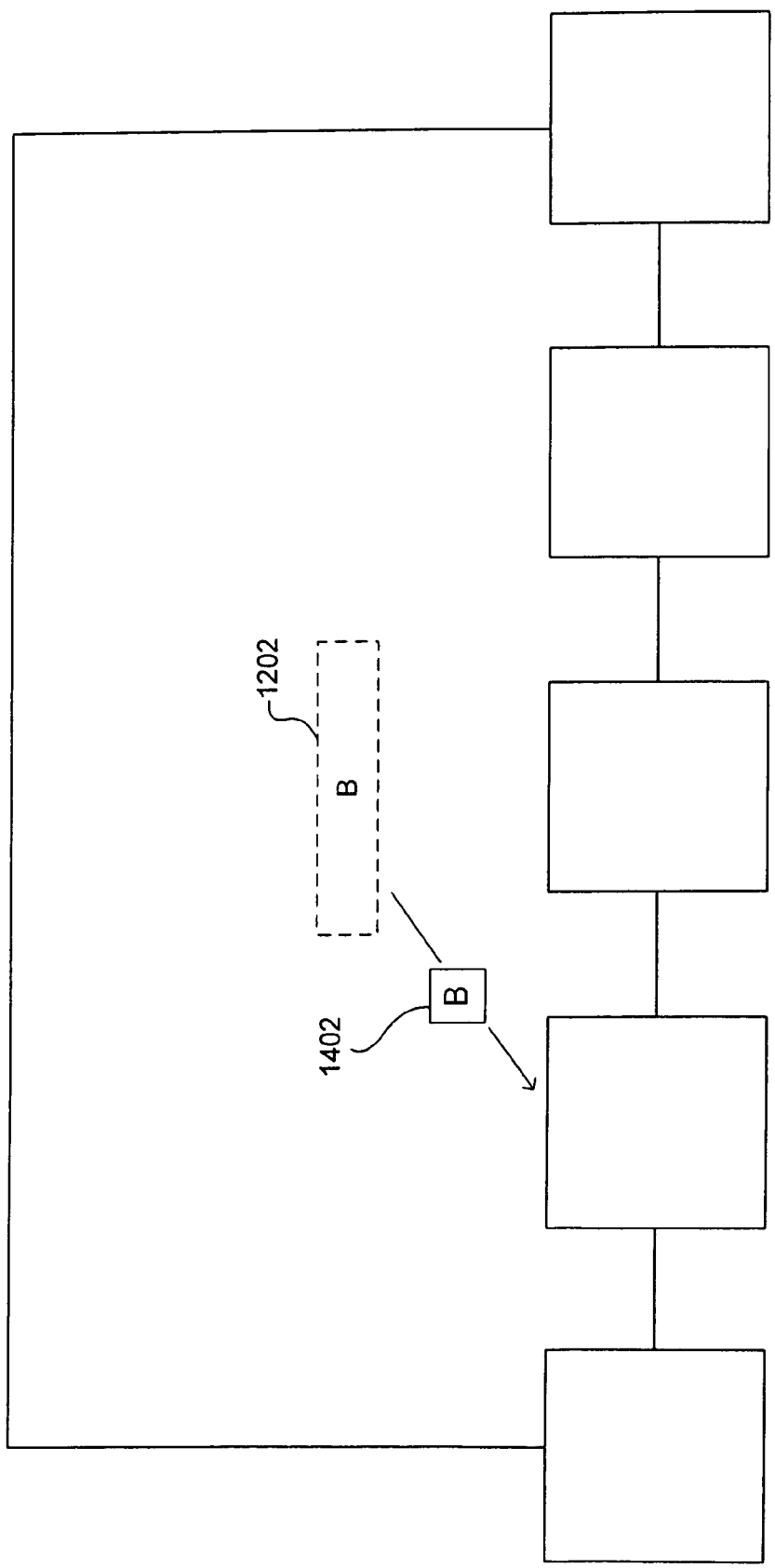
Figure 15:
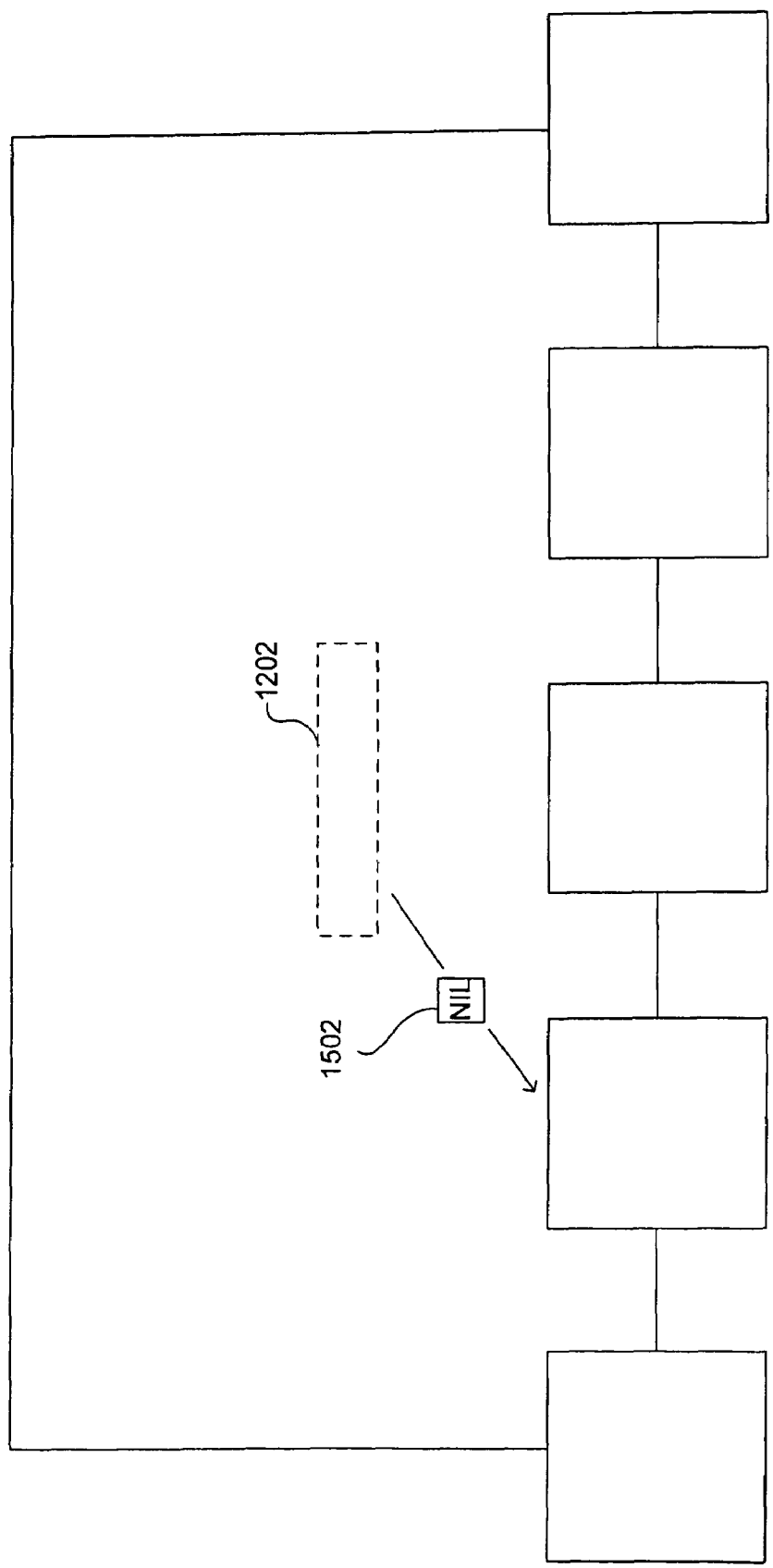

A distributed storage register provides two fundamental high-level functions to a number of intercommunicating processes that collectively implement the distributed storage register. As shown in FIG. 13, a process can direct a READ request 1302 to the distributed storage register 1202. If the distributed storage register currently holds a valid value, as shown in FIG. 14 by the value "B" within the distributed storage register 1202, the current, valid value is returned 1402 to the requesting process. However, as shown in FIG. 15, if the distributed storage register 1202 does not currently contain a valid value, then the value NIL 1502 is returned to the requesting process. The value NIL is a value that cannot be a valid value stored within the distributed storage register.

Figure 16:
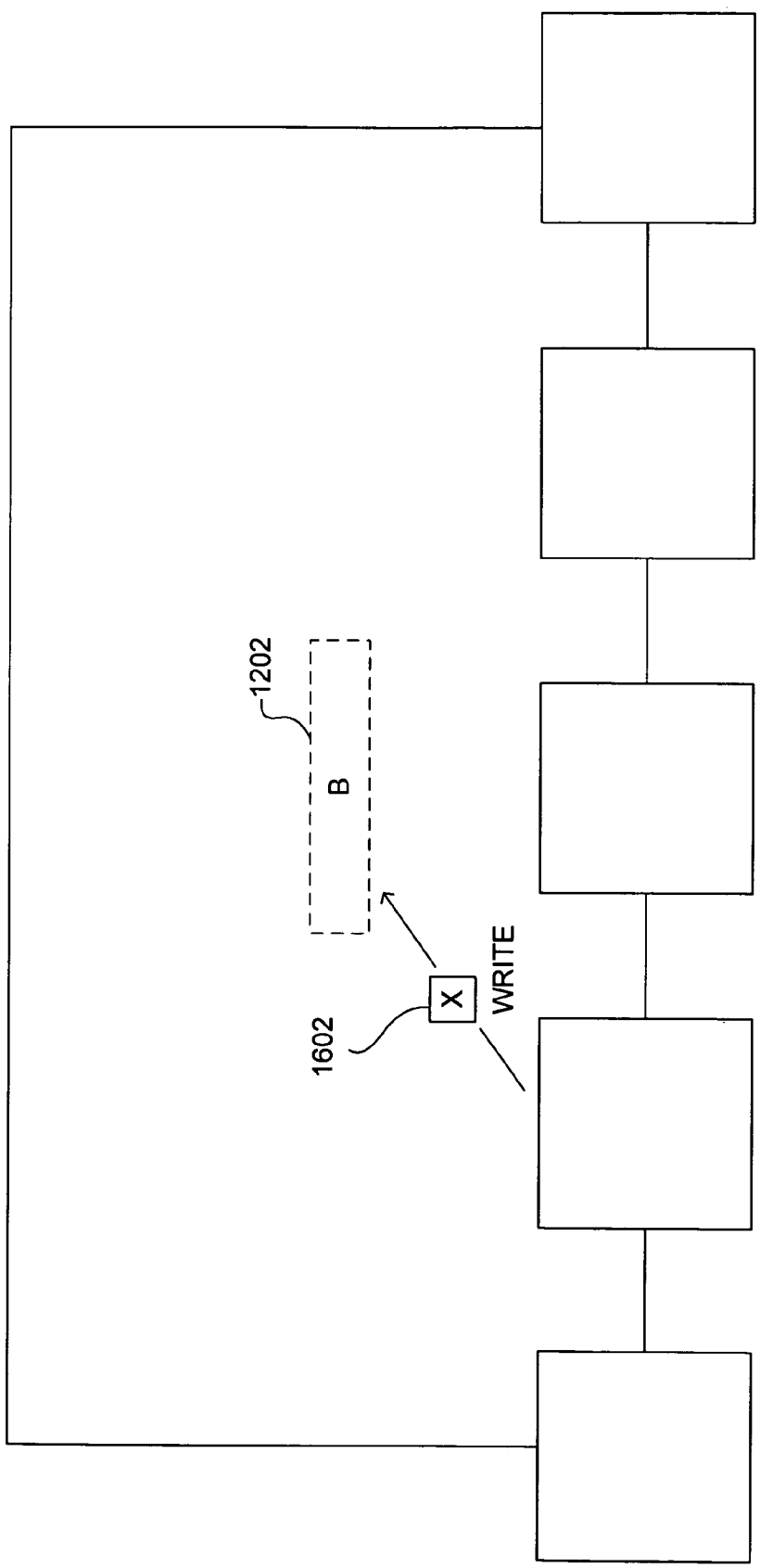
Figure 17:
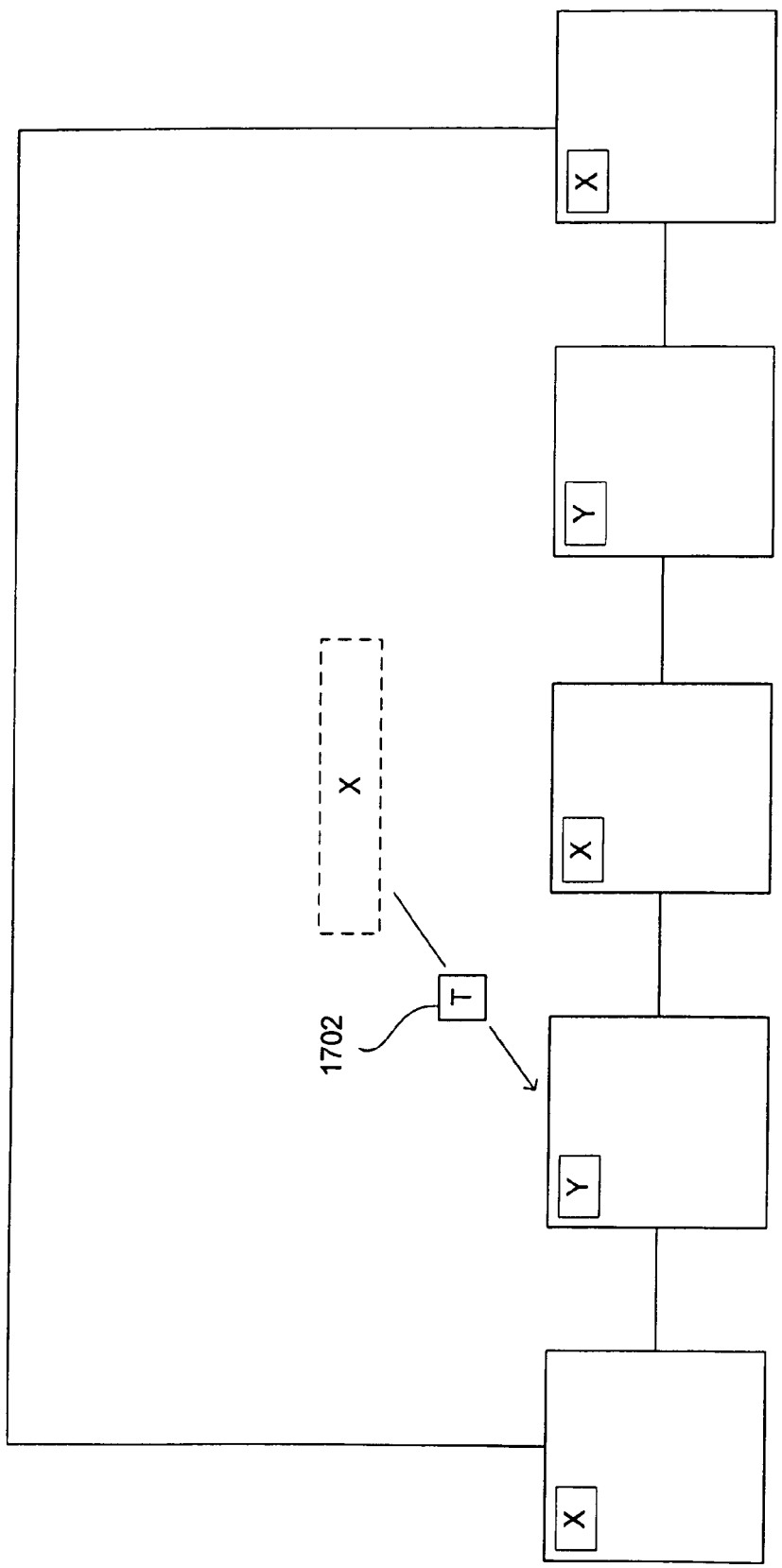
Figure 18:
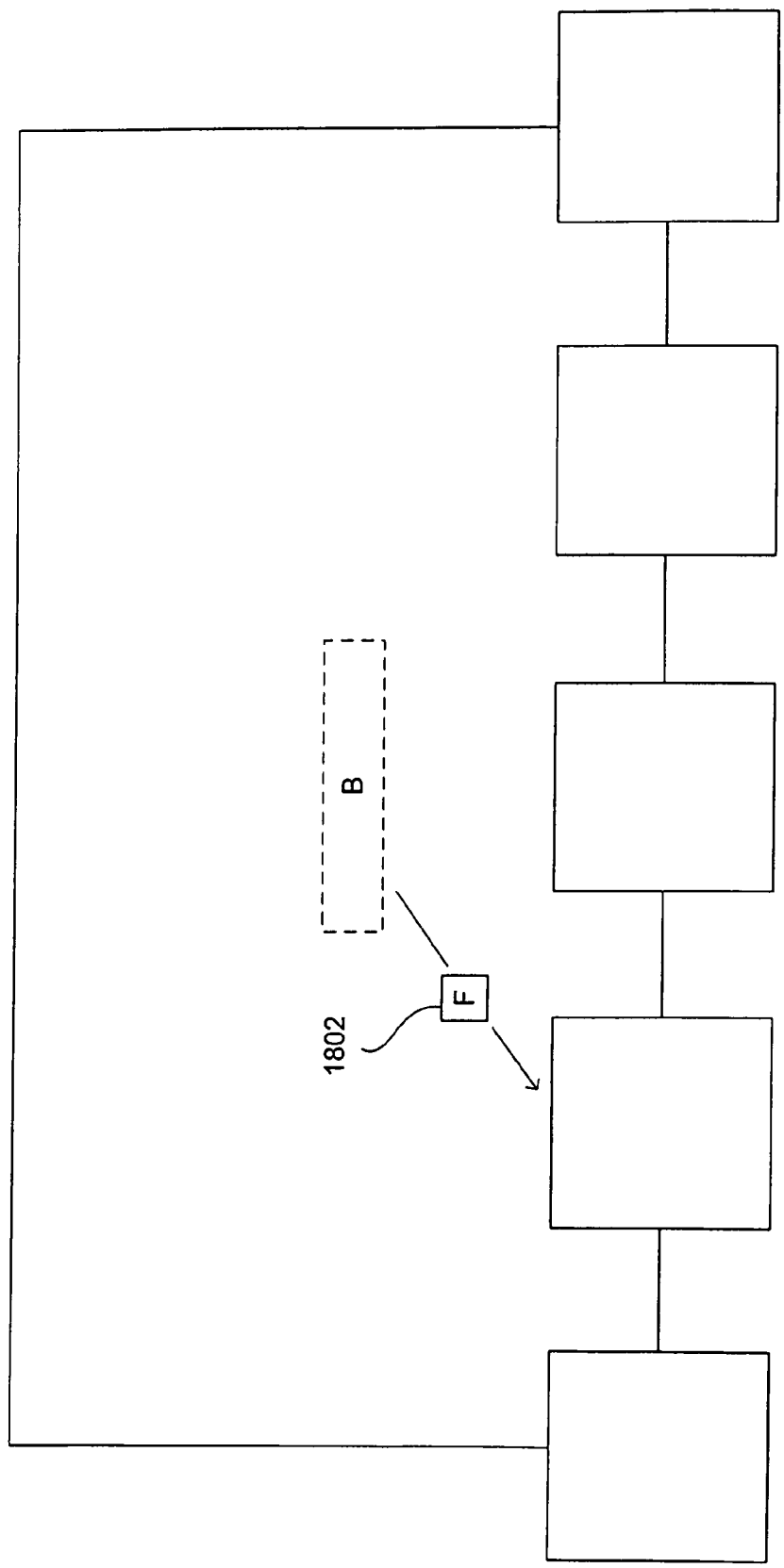

A process may also write a value to the distributed storage register. In FIG. 16, a process directs a WRITE message 1602 to the distributed storage register 1202, the WRITE message 1602 including a new value "X" to be written to the distributed storage register 1202. If the value transmitted to the distributed storage register successfully overwrites whatever value is currently stored in the distributed storage register, as shown in FIG. 17, then a Boolean value "TRUE" is returned 1702 to the process that directed the WRITE request to the distributed storage register. Otherwise, as shown in FIG. 18, the WRITE request fails, and a Boolean value "FALSE" is returned 1802 to the process that directed the WRITE request to the distributed storage register, the value stored in the distributed storage register unchanged by the WRITE request. In certain implementations, the distributed storage register returns binary values "OK" and "NOK," with OK indicating successful execution of the WRITE request and NOK indicating that the contents of the distributed storage register are indefinite, or, in other words, that the WRITE may or may not have succeeded.

Figure 19:
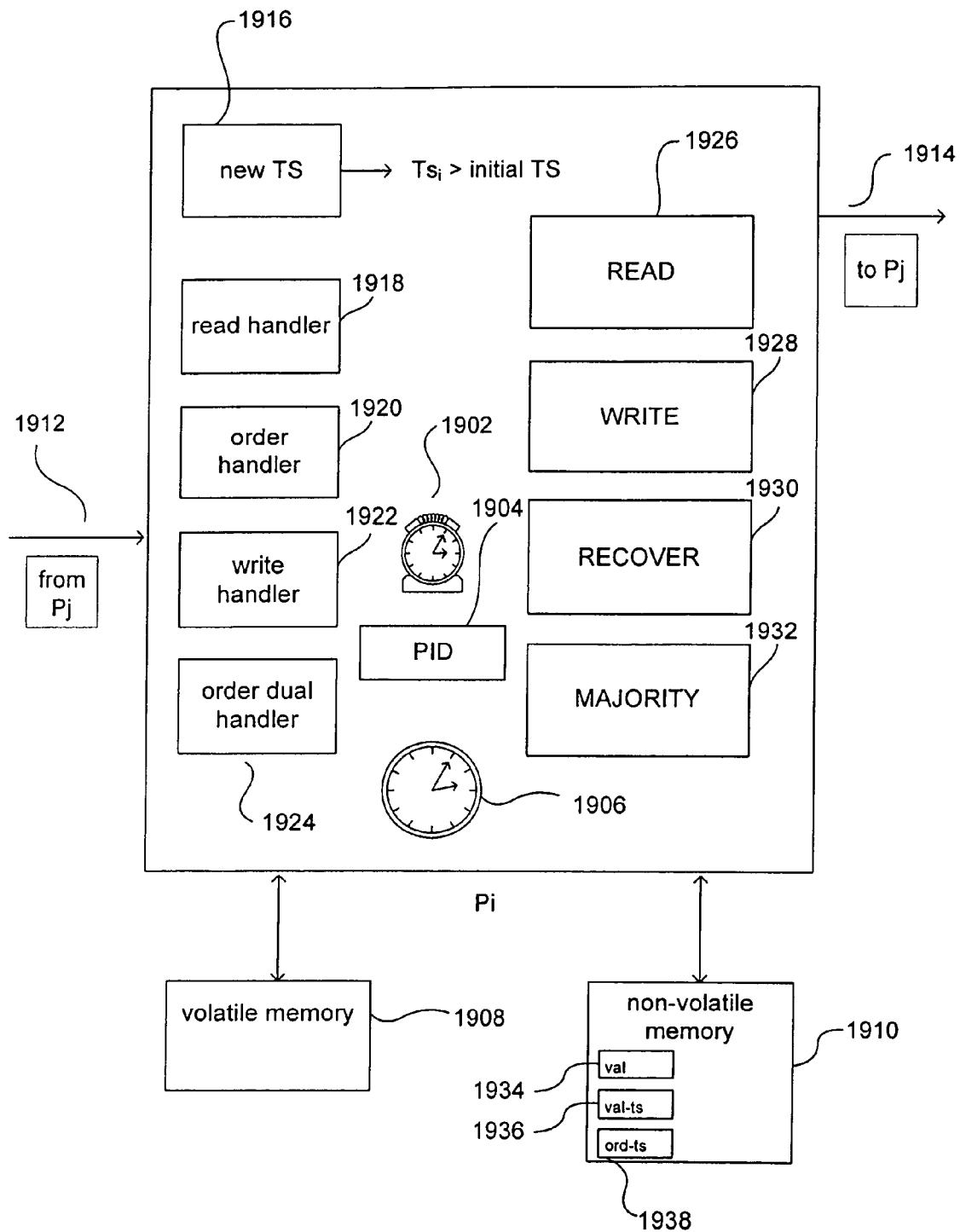
FIG. 19 shows the components used by a process or processing entity $P_i$ that implements, along with a number of other processes and/or processing entities, $P_{j \ne i}$, a distributed storage register.

FIG. 19 shows the components used by a process or processing entity $P_i$ that implements, along with a number of other processes and/or processing entities, $P_{j\neq i}$, a distributed storage register. A processor or processing entity uses three low level primitives: a timer mechanism 1902, a unique ID 1904, and a clock 1906. The processor or processing entity $P_i$ uses a local timer mechanism 1902 that allows $P_i$ to set a timer for a specified period of time, and to then wait for that timer to expire, with $P_i$ notified on expiration of the timer in order to continue some operation. A process can set a timer and continue execution, checking or polling the timer for expiration, or a process can set a timer, suspend execution, and be re-awakened when the timer expires. In either case, the timer allows the process to logically suspend an operation, and subsequently resume the operation after a specified period of time, or to perform some operation for a specified period of time, until the timer expires. The process or processing entity $P_i$ also has a reliably stored and reliably retrievable local process ID ("PID") 1904. Each processor or processing entity has a local PID that is unique with respect to all other processes and/or processing entities that together implement the distributed storage register. Finally, the processor processing entity $P_i$ has a real-time clock 1906 that is roughly coordinated with some absolute time. The real-time clocks of all the processes and/or processing entities that together collectively implement a distributed storage register need not be precisely synchronized, but should be reasonably reflective of some shared conception of absolute time. Most computers, including personal computers, include a battery-powered system clock that reflects a current, universal time value. For most purposes, including implementation of a distributed storage register, these system clocks need not be precisely synchronized, but only approximately reflective of a current universal time.

Each processor or processing entity $P_i$ includes a volatile memory 1908 and, in some embodiments, a non-volatile memory 1910. The volatile memory 1908 is used for storing instructions for execution and local values of a number of variables used for the distributed-storage-register protocol. The non-volatile memory 1910 is used for persistently storing the variables used, in some embodiments, for the distributed-storage-register protocol. Persistent storage of variable values provides a relatively straightforward resumption of a process's participation in the collective implementation of a distributed storage register following a crash or communications interruption. However, persistent storage is not required for resumption of a crashed or temporally isolated processor's participation in the collective implementation of the distributed storage register. Instead, provided that the variable values stored in dynamic memory, in non-persistent-storage embodiments, if lost, are all lost together, provided that lost variables are properly re-initialized, and provided that a quorum of processors remains functional and interconnected at all times, the distributed storage register protocol correctly operates, and progress of processes and processing entities using the distributed storage register is maintained. Each process $P_i$ stores three variables: (1) val 1934, which holds the current, local value for the distributed storage register; (2) val-ts 1936, which indicates the time-stamp value associated with the current local value for the distributed storage register; and (3) ord-ts 1938, which indicates the most recent timestamp associated with a WRITE operation. The variable val is initialized, particularly in non-persistent-storage embodiments, to a value NIL that is different from any value written to the distributed storage register by processes or processing entities, and that is, therefore, distinguishable from all other distributed-storage-register values. Similarly, the values of variables val-ts and ord-ts are initialized to the value "initialTS," a value less than any timestamp value returned by a routine "newTS" used to generate time-stamp values. Providing that val, val-ts, and ord-ts are together re-initialized to these values, the collectively implemented distributed storage register tolerates communications interruptions and process and processing entity crashes, provided that at least a majority of processes and processing entities recover and resume correction operation.

Each processor or processing entity $P_i$ may be interconnected to the other processes and processing entities $P_{j \neq i}$ via a message-based network in order to receive 1912 and send 1914 messages to the other processes and processing entities $P_{j \neq i}$. Each processor or processing entity $P_i$ includes a routine "newTS" 1916 that returns a timestamp $TS_i$ when called, the timestamp $TS_i$ greater than some initial value "initialTS." Each time the routine "newTS" is called, it returns a timestamp $TS_i$ greater than any timestamp previously returned. Also, any timestamp value $TS_i$ returned by the newTS called by a processor or processing entity $P_i$ should be different from any timestamp $TS_j$ returned by newTS called by any other processor processing entity $P_j$. One practical method for implementing newTS is for newTS to return a timestamp TS comprising the concatenation of the local PID 1904 with the current time reported by the system clock 1906. Each processor or processing entity $P_i$ that implements the distributed storage register includes four different handler routines: (1) a READ handler 1918; (2) an ORDER handler 1920; (3) a WRITE handler 1922; and (4) an ORDER&READ handler 1924. It is important to note that handler routines may need to employ critical sections, or code sections single-threaded by locks, to prevent race conditions in testing and setting of various local data values. Each processor or processing entity $P_i$ also has four operational routines: (1) READ 1926; (2) WRITE 1928; (3) RECOVER 1930; and (4) MAJORITY 1932. Both the four handler routines and the four operational routines are discussed in detail, below.

Correct operation of a distributed storage register, and liveness, or progress, of processes and processing entities using a distributed storage register depends on a number of assumptions. Each process or processing entity $P_i$ is assumed to not behave maliciously. In other words, each processor or processing entity $P_i$ faithfully adheres to the distributed-storage-register protocol. Another assumption is that a majority of the processes and/or processing entities $P_i$ that collectively implement a distributed storage register either never crash or eventually stop crashing and execute reliably. As discussed above, a distributed storage register implementation is tolerant to lost messages, communications interruptions, and process and processing-entity crashes. When a number of processes or processing entities are crashed or isolated that is less than sufficient to break the quorum of processes or processing entities, the distributed storage register remains correct and live. When a sufficient number of processes or processing entities are crashed or isolated to break the quorum of processes or processing entities, the system remains correct, but not live. As mentioned above, all of the processes and/or processing entities are fully interconnected by a message-based network. The message-based network may be asynchronous, with no bounds on message-transmission times. However, a fair-loss property for the network is assumed, which essentially guarantees that if $P_i$ receives a message m from $P_j$, then $P_j$ sent the message m, and also essentially guarantees that if $P_i$ repeatedly transmits the message m to $P_j$, $P_j$ will eventually receive message m, if $P_j$ is a correct process or processing entity. Again, as discussed above, it is assumed that the system clocks for all processes or processing entities are all reasonably reflective of some shared time standard, but need not be precisely synchronized.

These assumptions are useful to prove correctness of the distributed-storage-register protocol and to guarantee progress. However, in certain practical implementations, one or more of the assumptions may be violated, and a reasonably functional distributed storage register obtained. In addition, additional safeguards may be built into the handler routines and operational routines in order to overcome particular deficiencies in the hardware platforms and processing entities.

Figure 20:
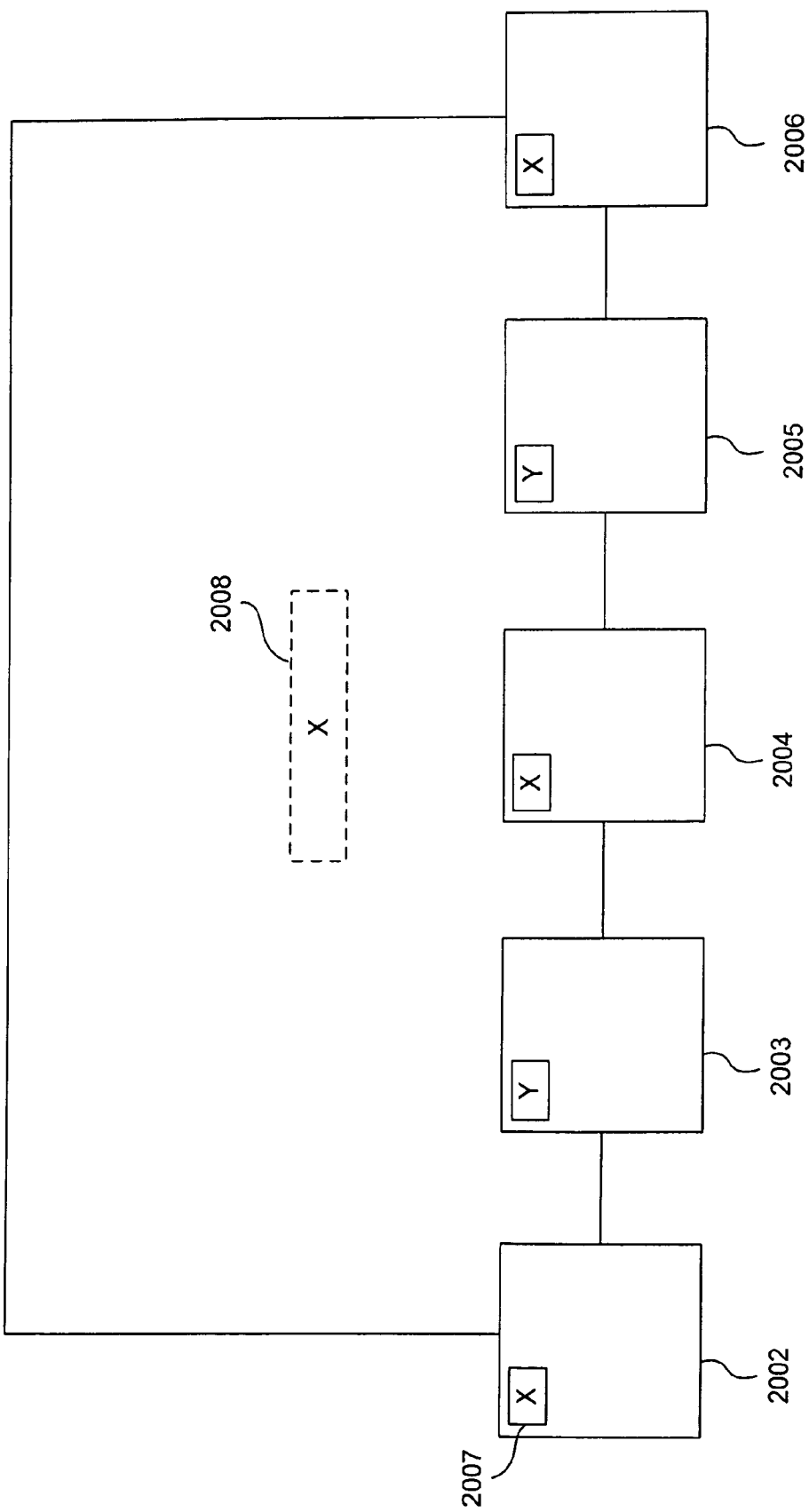
FIG. 20 illustrates determination of the current value of a distributed storage register by means of a quorum.

Operation of the distributed storage register is based on the concept of a quorum. FIG. 20 illustrates determination of the current value of a distributed storage register by means of a quorum. FIG. 20 uses similar illustration conventions as used in FIGS. 12-18. In FIG. 20, each of the processes or processing entities 2002-2006 maintains the local variable, val-ts, such as local variable 2007 maintained by process or processing entity 2002, that holds a local time-stamp value for the distributed storage register. If, as in FIG. 16, a majority of the local values maintained by the various processes and/or processing entities that collectively implement the distributed storage register currently agree on a time-stamp value val-ts, associated with the distributed storage register, then the current value of the distributed storage register 2008 is considered to be the value of the variable val held by the majority of the processes or processing entities. If a majority of the processes and processing entities cannot agree on a time-stamp value val-ts, or there is no single majority-held value, then the contents of the distributed storage register are undefined. However, a minority-held value can be then selected and agreed upon by a majority of processes and/or processing entities, in order to recover the distributed storage register.

FIG. 21 shows pseudocode implementations for the routine handlers and operational routines shown diagrammatically in FIG. 19. It should be noted that these pseudocode implementations omit detailed error handling and specific details of low-level communications primitives, local locking, and other details that are well understood and straightforwardly implemented by those skilled in the art of computer programming. The routine "majority" 2102 sends a message, on line 2, from a process or processing entity $P_i$ to itself and to all other processes or processing entities $P_{j \neq i}$ that, together with $P_i$, collectively implement a distributed storage register. The message is periodically resent, until an adequate number of replies are received, and, in many implementations, a timer is set to place a finite time and execution limit on this step. Then, on lines 3-4, the routine "majority" waits to receive replies to the message, and then returns the received replies on line 5. The assumption that a majority of processes are correct, discussed above, essentially guarantees that the routine "majority" will eventually return, whether or not a timer is used. In practical implementations, a timer facilitates handling error occurrences in a timely manner. Note that each message is uniquely identified, generally with a timestamp or other unique number, so that replies received by process $P_i$ can be correlated with a previously sent message.

The routine "read" 2104 reads a value from the distributed storage register. On line 2, the routine "read" calls the routine "majority" to send a READ message to itself and to each of the other processes or processing entities $P_{j \neq i}$. The READ message includes an indication that the message is a READ message, as well as the time-stamp value associated with the local, current distributed storage register value held by process $P_i$, val-ts. If the routine "majority" returns a set of replies, all containing the Boolean value "TRUE," as determined on line 3, then the routine "read" returns the local current distributed-storage-register value, val. Otherwise, on line 4, the routine "read" calls the routine "recover."

The routine "recover" 2106 seeks to determine a current value of the distributed storage register by a quorum technique. First, on line 2, a new timestamp ts is obtained by calling the routine "newTS." Then, on line 3, the routine "majority" is called to send ORDER&READ messages to all of the processes and/or processing entities. If any status in the replies returned by the routine "majority" are "FALSE," then "recover" returns the value NIL, on line 4. Otherwise, on line 5, the local current value of the distributed storage register, val, is set to the value associated with the highest value timestamp in the set of replies returned by routine "majority." Next, on line 6, the routine "majority" is again called to send a WRITE message that includes the new timestamp ts, obtained on line 2, and the new local current value of the distributed storage register, val. If the status in all the replies has the Boolean value "TRUE," then the WRITE operation has succeeded, and a majority of the processes and/or processing entities now concur with that new value, stored in the local copy val on line 5. Otherwise, the routine "recover" returns the value NIL.

The routine "write" 2108 writes a new value to the distributed storage register. A new timestamp, ts, is obtained on line 2. The routine "majority" is called, on line 3, to send an ORDER message, including the new timestamp, to all of the processes and/or processing entities. If any of the status values returned in reply messages returned by the routine "majority" are "FALSE," then the value "NOK" is returned by the routine "write," on line 4. Otherwise, the value val is written to the other processes and/or processing entities, on line 5, by sending a WRITE message via the routine "majority." If all the status vales in replies returned by the routine "majority" are "TRUE," as determined on line 6, then the routine "write" returns the value "OK." Otherwise, on line 7, the routine "write" returns the value "NOK." Note that, in both the case of the routine "recover" 2106 and the routine "write," the local copy of the distributed-storage-register value val and the local copy of the timestamp value val-ts are both updated by local handler routines, discussed below.

Next, the handler routines are discussed. At the onset, it should be noted that the handler routines compare received values to local-variable values, and then set local variable values according to the outcome of the comparisons. These types of operations may need to be strictly serialized, and protected against race conditions within each process and/or processing entity for data structures that store multiple values. Local serialization is easily accomplished using critical sections or local locks based on atomic test-and-set instructions. The READ handler routine 2110 receives a READ message, and replies to the READ message with a status value that indicates whether or not the local copy of the timestamp val-ts in the receiving process or entity is equal to the timestamp received in the READ message, and whether or not the timestamp ts received in the READ message is greater than or equal to the current value of a local variable ord-ts. The WRITE handler routine 2112 receives a WRITE message determines a value for a local variable status, on line 2, that indicates whether or not the local copy of the timestamp val-ts in the receiving process or entity is greater than the timestamp received in the WRITE message, and whether or not the timestamp ts received in the WRITE message is greater than or equal to the current value of a local variable ord-ts. If the value of the status local variable is "TRUE," determined on line 3, then the WRITE handler routine updates the locally stored value and timestamp, val and val-ts, on lines 4-5, both in dynamic memory and in persistent memory, with the value and timestamp received in the WRITE message. Finally, on line 6, the value held in the local variable status is returned to the process or processing entity that sent the WRITE message handled by the WRITE handler routine 2112.

The ORDER&READ handler 2114 computes a value for the local variable status, on line 2, and returns that value to the process or processing entity from which an ORDER&READ message was received. The computed value of status is a Boolean value indicating whether or not the timestamp received in the ORDER&READ message is greater than both the values stored in local variables val-ts and ord-ts. If the computed value of status is "TRUE," then the received timestamp ts is stored into both dynamic memory and persistent memory in the variable ord-ts.

Similarly, the ORDER handler 2116 computes a value for a local variable status, on line 2, and returns that status to the process or processing entity from which an ORDER message was received. The status reflects whether or not the received timestamp is greater than the values held in local variables val-ts and ord-ts. If the computed value of status is "TRUE," then the received timestamp ts is stored into both dynamic memory and persistent memory in the variable ord-ts.

Using the distributed storage register method and protocol, discussed above, shared state information that is continuously consistently maintained in a distributed data-storage system can be stored in a set of distributed storage registers, one unit of shared state information per register. The size of a register may vary to accommodate different natural sizes of units of shared state information. The granularity of state information units can be determined by performance monitoring, or by analysis of expected exchange rates of units of state information within a particular distributed system. Larger units incur less overhead for protocol variables and other data maintained for a distributed storage register, but may result in increased communications overhead if different portions of the units are accessed at different times. It should also be noted that, while the above pseudocode and illustrations are directed to implementation of a single distributed storage register, these pseudocode routines can be generalized by adding parameters identifying a particular distributed storage register, of unit of state information, to which operations are directed, and by maintaining arrays of variables, such as val-ts, val, and ord-ts, indexed by the identifying parameters.

Generalized Storage Register Model

The storage register model is generally applied, by a FAB system, at the block level to maintain consistency across segments distributed according to mirroring redundancy schemes. In other words, each block of a segment can be considered to be a storage register distributed across multiple bricks, and the above-described techniques involving quorums and message passing are used to maintain data consistency across the mirror copies. However, the storage-register scheme may be extended to handle erasure coding redundancy schemes. First, rather than a quorum consisting of a majority of the bricks across which a block is distributed, as described in the above section and as used for mirroring redundancy schemes, erasure-coding redundancy schemes employ quorums of $m+[(n-m)/2]$ bricks, so that the intersection of any two quorums contain at least m bricks. This type of quorum is referred to as an "m-quorum." Second, rather than writing newly received values in the second phase of a WRITE operation to blocks on internal storage, bricks instead may log the new values, along with a timestamp associated with the values. The logs may then be asynchronously processed to commit the logged WRITEs when an m-quorum of logged entries have been received and logged. Logging is used because, unlike in mirroring redundancy schemes, data cannot be recovered due to brick crashes unless an m-quorum of bricks have received and correctly executed a particular WRITE operation. FIG. 22 shows modified pseudocode, similar to the pseudocode provided in FIG. 17, which includes extensions to the storage-register model that handle distribution of segments across bricks according to erasure coding redundancy schemes within a FAB system that represent one embodiment of the present invention. In the event that m bricks have failed to log a most recently written value, for example, the most recently written value is rolled back to a previous value that is present in at least m copies within the logs or stored within at least m bricks.

Figure 23:
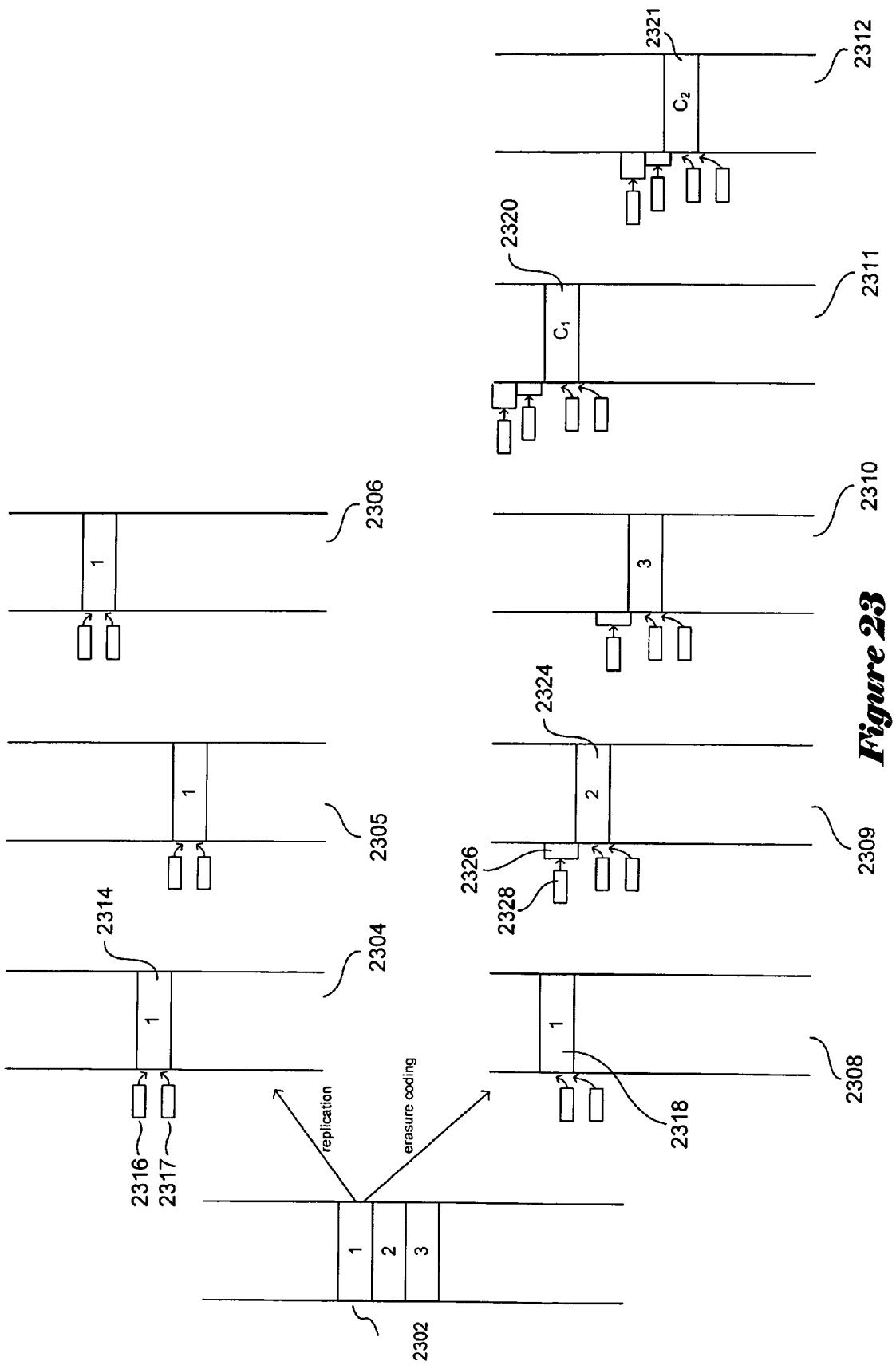
FIG. 23 illustrates the large dependence on timestamps by the data consistency techniques based on the storage-register model within a FAB system that represent one embodiment of the present invention.

FIG. 23 illustrates the large dependence on timestamps by the data consistency techniques based on the storage-register model within a FAB system that represents one embodiment of the present invention. In FIG. 23, a block 2302 is shown distributed across three bricks 2304-2306 according to a triple mirroring redundancy scheme, and distributed across five bricks 2308-2312 according to a 3+2 erasure coding scheme. In the triple mirroring redundancy scheme, each copy of the block, such as block 2314, is associated with two timestamps 2316-2317, as discussed in the previous subsection. In the erasure coding redundancy scheme, each block, such as the first block 2318, is associated with at least two timestamps. The checksum bits computed from the block 2320-2321, and from other blocks in the block's stripe, are associated with two timestamps, but a block, such as block 2324 may, in addition, be associated with log entries (shown below and overlain by the block), such as log entry 2326, each of which is also associated with a timestamp, such as timestamp 2328. Clearly, the data consistency techniques based on the storage-register model potentially involve storage and maintenance of a very large number of timestamps, and the total storage space devoted to timestamps may be a significant fraction of the total available storage space within a FAB system. Moreover, message traffic overhead may arise from passing timestamps between bricks during the above-described READ and WRITE operations directed to storage registers.

Figure 24:
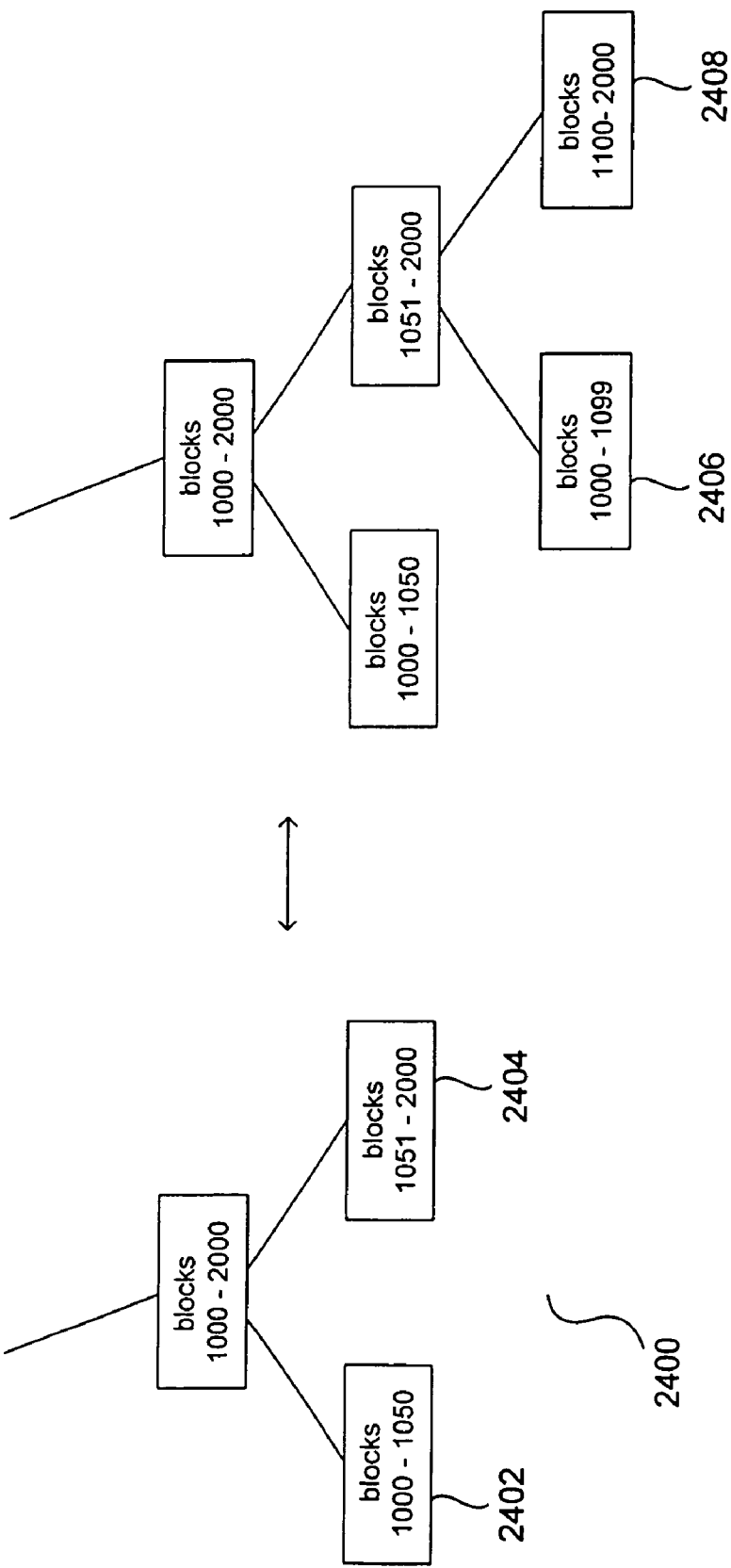
FIG. 24 illustrates hierarchical time-stamp management that represents one embodiment of the present invention.

Because of the enormous potential overhead related to timestamps, a FAB system may employ a number of techniques to ameliorate the storage and messaging overheads related to timestamps. First, timestamps may be hierarchically stored by bricks in non-volatile random access memory, so that a single timestamp may be associated with a large, contiguous number of blocks written in a single WRITE operation. FIG. 24 illustrates hierarchical timestamp management that represents one embodiment of the present invention. In FIG. 24, timestamps are associated with leaf nodes in a type of large acyclic graph known as an "interval tree," only a small portion of which is shown in FIG. 24. In the displayed portion of the graph, the two leaf nodes 2402 and 2404 represent timestamps associated with blocks 1000-1050 and 1051-2000, respectively. If, in a subsequent WRITE operation, a WRITE is directed to blocks 1051-1099, then leaf node 2404 in the original acyclic graph is split into two, lower-level blocks 2406 and 2408 in a modified acyclic graph. Separate timestamps can be associated with each of the new, leaf node blocks. Conversely, if blocks 1051-2000 are subsequently written in a single WRITE operation, the two blocks 2406 and 2408 can be subsequently coalesced, returning the acyclic graph to the original acyclic graph 2400. Associating timestamps with groups of blocks written in single WRITE operations can significantly decrease the number of timestamps maintained by a brick.

Another way to decrease the number of timestamps maintained by a brick is to aggressively garbage collect timestamps. As discussed in the previous subsection, timestamps may be associated with blocks to facilitate the quorum-based consistency methods of the storage-register model. However, when all bricks across which a block is distributed have been successfully updated, the timestamps associated with the blocks are no longer needed, since the blocks are in a completely consistent and fully redundantly stored state. Thus, a FAB system may further extend the storage-register model to include aggressive garbage collection of timestamps following full completion of WRITE operations. Further methods employed by the FAB system for decreasing timestamp-related overheads may include piggybacking timestamp-related messages within other messages and processing related timestamps together in combined processing tasks, including hierarchical demotion, discussed below.

The quorum-based, storage-register model may be further extended to handle reconfiguration and migration, discussed above in a previous subsection, in which layouts and redundancy schemes are changed. As discussed in that subsection, during reconfiguration operations, two or more different configurations may be concurrently maintained while new configurations are synchronized with previously existing configurations, prior to removal and garbage collection of the previous configurations. WRITE operations are directed to both configurations during the synchronization process. Thus, a higher-level quorum of configurations need to successfully complete a WRITE operation before the cfg group or SCN-level control logic considers a received WRITE operation to have successfully completed. FIGS. 25-26 provide pseudocode for a further extended storage-register model that includes the concept of quorum-based writes to multiple, active configurations that may be present due to reconfiguration of a distributed segment within a FAB system that represent one embodiment of the present invention.

Unfortunately, migration is yet another level of reconfiguration that may require yet a further extension to the storage-register model. Like the previously discussed reconfiguration scenario, migration involves multiple active configurations to which SCN-level control logic directs WRITE operations during synchronization of a new configuration with an old configuration. However, unlike the reconfiguration level, the migration level requires that a WRITE directed to active configurations successfully completes on all configurations, rather than a quorum of active configurations, since the redundancy schemes are different for the active configurations, and a failed WRITE on one redundancy scheme may not be recoverable from a different active configuration using a different redundancy scheme. Therefore, at the migration level, a quorum of active configurations consists of all of the active configurations. Extension of the storage-register model to the migration level therefore results in a more general storage-register-like model. FIG. 27 shows high-level pseudocode for extension of the storage-register model to the migration level within a FAB system that represents one embodiment of the present invention. Yet different considerations may apply at the replication level, in which WRITES are directed to multiple replicates of a virtual disk. However, the most general storage-register-model extension discussed above, with reference to FIG. 27, is sufficiently general for application at the VDI and virtual disk levels when VDI-level considerations are incorporated in the general storage-register model.

Figure 28:
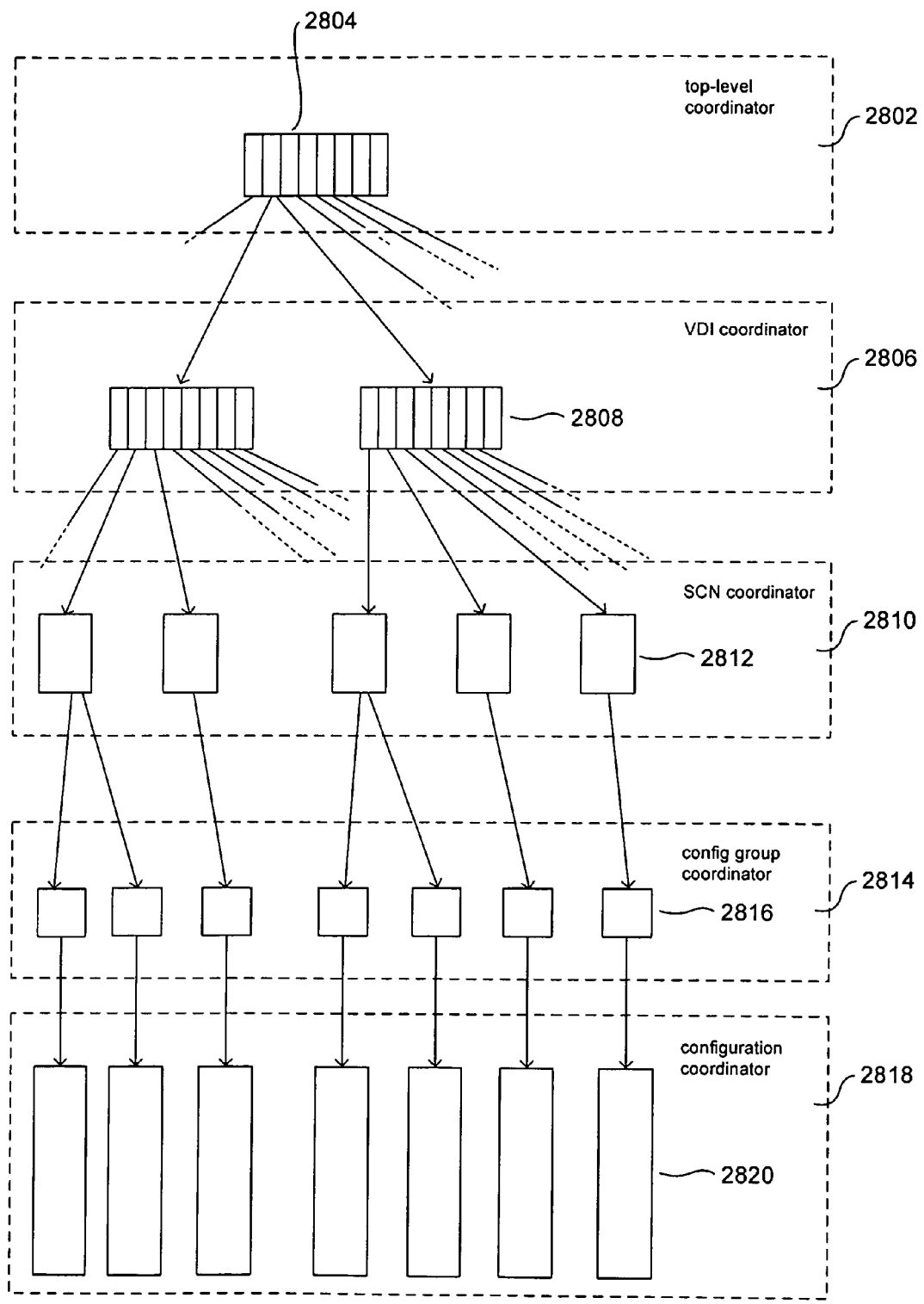
FIG. 28 illustrates the overall hierarchical structure of both control processing and data storage within a FAB system that represents one embodiment of the present invention.

As a result of the storage-register model extensions and considerations discussed above, a final, high-level description of the hierarchical control logic and hierarchical data storage within a FAB system is obtained. FIG. 28 illustrates the overall hierarchical structure of both control processing and data storage within a FAB system that represents one embodiment of the present invention. Top level coordinator logic, referred to as the "top-level coordinator" 2802, may be associated with the virtual-disk level 2804 of the hierarchical data-storage model. VDI-level control logic, referred to as the "VDI-level coordinator" 2806, may be associated with the VDI level 2808 of the data-storage model. SCN-level control logic, referred to as the "SCN coordinator" 2810, may be associated with the SCN level 2812 of the data-storage model. Configuration-group-level control logic, referred to as the "configuration-group coordinator" 2814, may be associated with the configuration group level 2816 of the data-storage model. Finally, configuration-level control logic, referred to as the "configuration coordinator" 2818, may be associated with the configuration level of the data storage model 2820. Note in FIG. 28, and subsequent figures that employ the illustration conventions used in FIG. 28, the cfg and layout data-structure elements are combined together in one data-storage-model node. Each of the coordinators in the hierarchical organization of coordinators carries out an extended storage-register-model consistency method appropriate for the hierarchical level of the coordinator. For example, the cfg-group coordinator employs quorum-based techniques for mirroring redundancy schemes and m-quorum-based techniques for erasure coding redundancy schemes. By contrast, the SCN coordinator employs an extended storage-register model requiring completion of a WRITE operation by all referenced configuration groups in order for the WRITE operation to be considered to have succeeded.

The Timestamp Problem

Figure 29A:
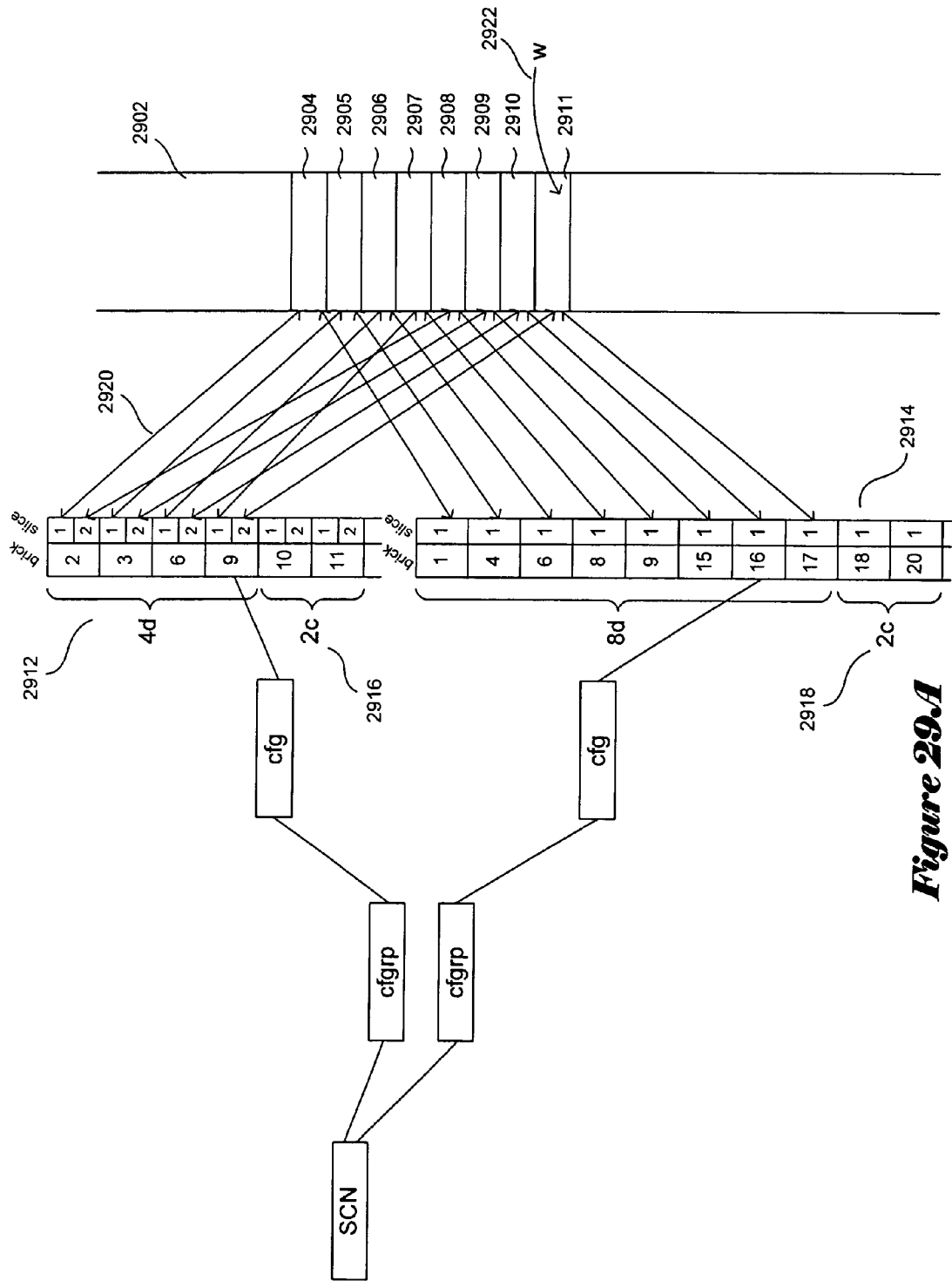
FIGS. 29A-C illustrate a time-stamp problem in the context of a migration from a 4+2 erasure coding redundancy scheme to an 8+2 erasure coding redundancy scheme for distribution of a particular segment.
Figure 29B:
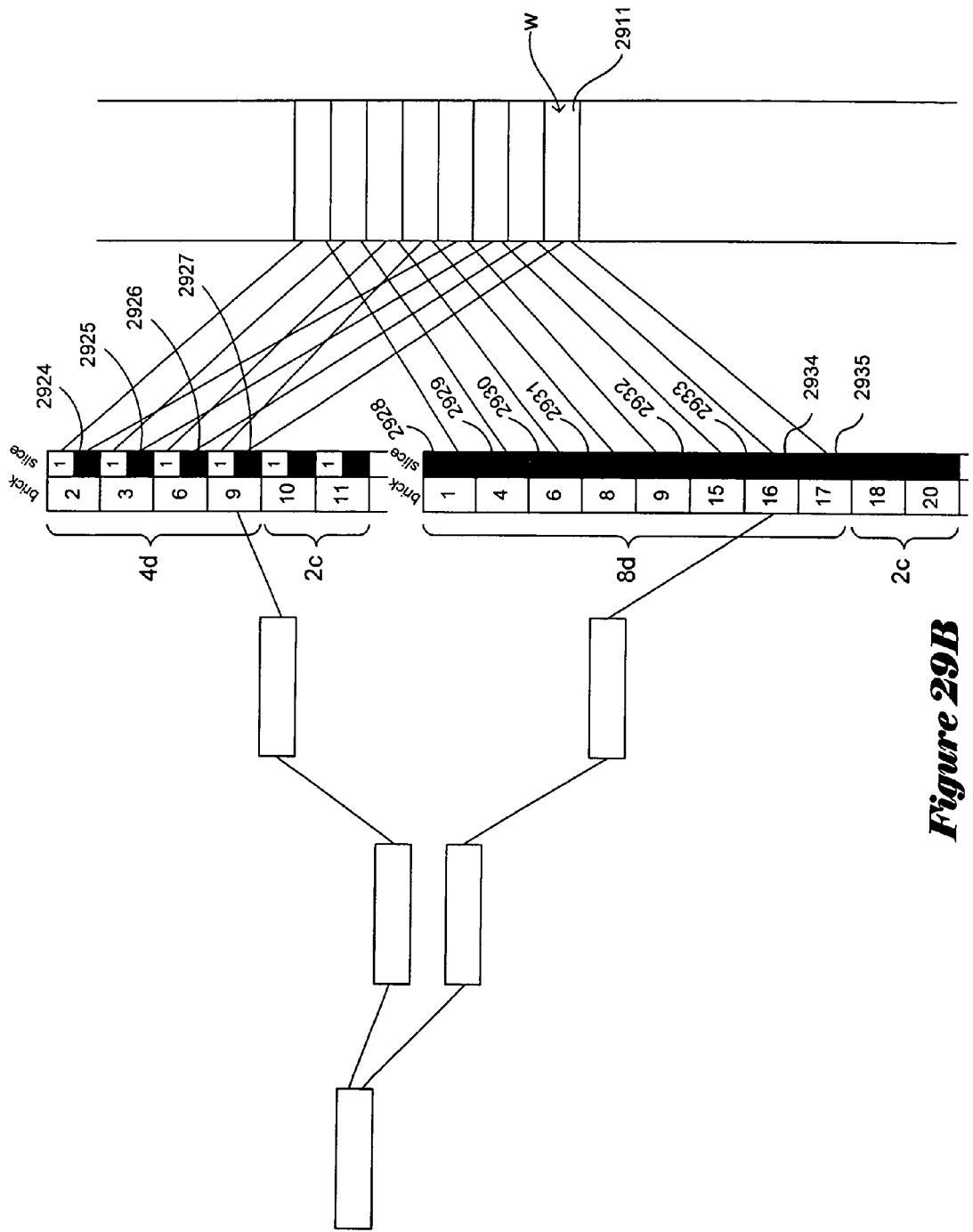
Figure 29C:
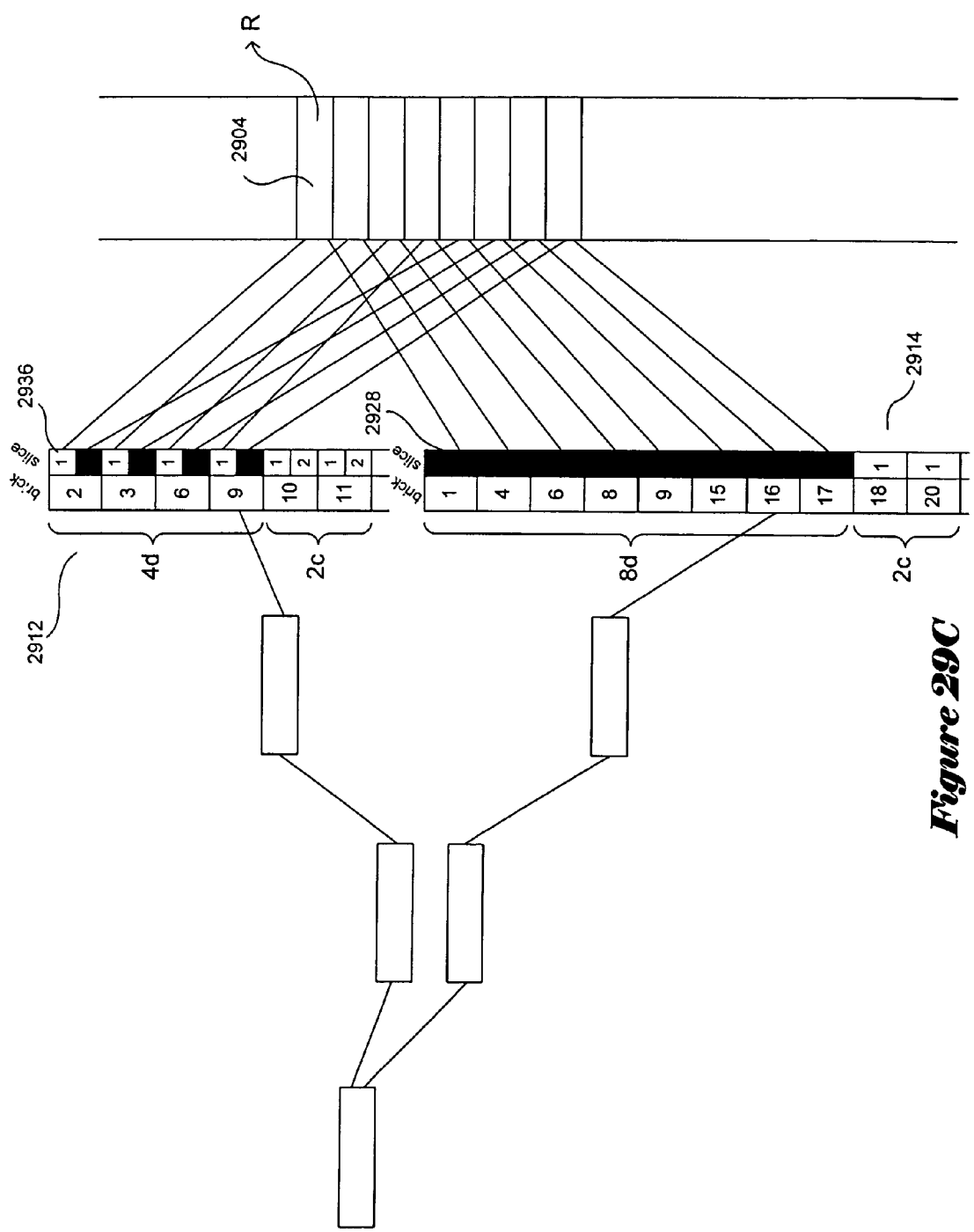

Although the hierarchical control processing in a data-storage model discussed in a previous subsection provides a logical and extensible model for supporting currently envisioned data-storage models and operations, and additional data-storage models and operations that may be added to future FAB-system architectures, a significant problem regarding timestamps remains. The timestamp problem is best discussed with reference to a concrete example. FIGS. 29A-C illustrate a time-stamp problem in the context of a migration from a 4+2 erasure coding redundancy scheme to an 8+2 erasure coding redundancy scheme for distribution of a particular segment. FIG. 29A illustrates the layouts for the previous 4+2 redundancy scheme and the new 8+2 erasure coding redundancy scheme for a segment. In FIG. 29A, the segment 2902 is shown as a contiguous sequence of eight blocks 2904-2911. The 4+2 redundancy-scheme layout 2912 distributes the eight blocks in two stripes across bricks 2, 3, 6, 9, 10, and 11. The 8+2 redundancy-scheme layout 2914 distributes the eight blocks in a single stripe across bricks 1, 4, 6, 8, 9, 15, 16, 17, 18, and 20. Because both layouts use bricks 6 and 9, bricks 6 and 9 contain blocks of both the old and new configuration. In the 4+2 configuration, checksum blocks are distributed across bricks 10 and 11 2916, and in the 8+2 configuration, checksum blocks are distributed across bricks 18 and 20 2918. In FIG. 29A, the mapping between blocks of the segment 2904-2911 and stripes within bricks are indicated by double-headed arrows, such as double-headed arrow 2920.

Consider a WRITE of the final block 2911 of the segment, indicated in FIG. 29A by arrow 2922. In an erasure coding redundancy-scheme layout, all blocks in a stripe in which a block is written are associated with a new timestamp for the WRITE operation, since a write to any block affects the parity bits for all blocks in the stripe. Thus, as shown in FIG. 29B, writing to the last block of the segment 2911 results in all blocks in the second stripe 2924-2927 of the 4+2 layout being associated with a new timestamp corresponding to the WRITE operation. However, in the 8+2 layout, all blocks within the single stripe are associated with the new timestamp 2928-2935. In FIG. 29B, blocks associated with the new timestamp are darkened. Next, consider a READ of the first block of the segment 2904, as illustrated in FIG. 29C. When read from the 4+2 layout 2912, the first block is associated with an old timestamp, as indicated by the absence of shading in block 2936. However, when read from the 8+2 layout 2914, the first block is associated with the new timestamp 2938, as indicated by shading in the first block. Therefore, control logic receiving the read blocks and timestamps may conclude that there is a time-stamp mismatch with respect to the first block of the segment, and therefore that copies of the block are inconsistent. For example, the SCN coordinator may fail the READ and may undertake recovery steps, because of the timestamp disparity reported to the SCN coordinator by the two different cgrps managing the two different, concurrently existing redundancy schemes for the segment. In fact, there is no data inconsistency, and the timestamp disparity arises only from the different time-stamp assignment behavior of the two different redundancy schemes managed at the configuration coordinator level below the SCN coordinator. The timestamp problem illustrated in FIGS. 29A-C is but one example of many different timestamp-related problems that can occur in the hierarchical coordinator and data-storage model illustrated in FIG. 28.

Hierarchical-Timestamp Solution to the Timestamp Problem

Although various different solutions may be proposed to solve the timestamp problem addressed in the previous subsection, many of the proposed solutions would introduce further overheads and inefficiencies, and require many specific and non-extensible modifications of the storage-register model. One embodiment of the present invention is a relatively straightforward and extensible method that employs a new type of timestamp and that provides isolation of different, hierarchical processing levels from one another by staged constriction of the scope of timestamps as hierarchical processing levels complete timestamp-associated operations. The scope of a timestamp, in this embodiment, is the range of processing levels over which the timestamp is considered live. In one embodiment, the scope of timestamps is constrained in a top-down fashion, with timestamp scope successively narrowed to lower processing levels, but different embodiments may differently constrict timestamp scope. In essence, this embodiment of the present invention is directed to a new type of timestamp that directly maps into the hierarchical processing and data-storage model shown in FIG. 28.

Figure 30:
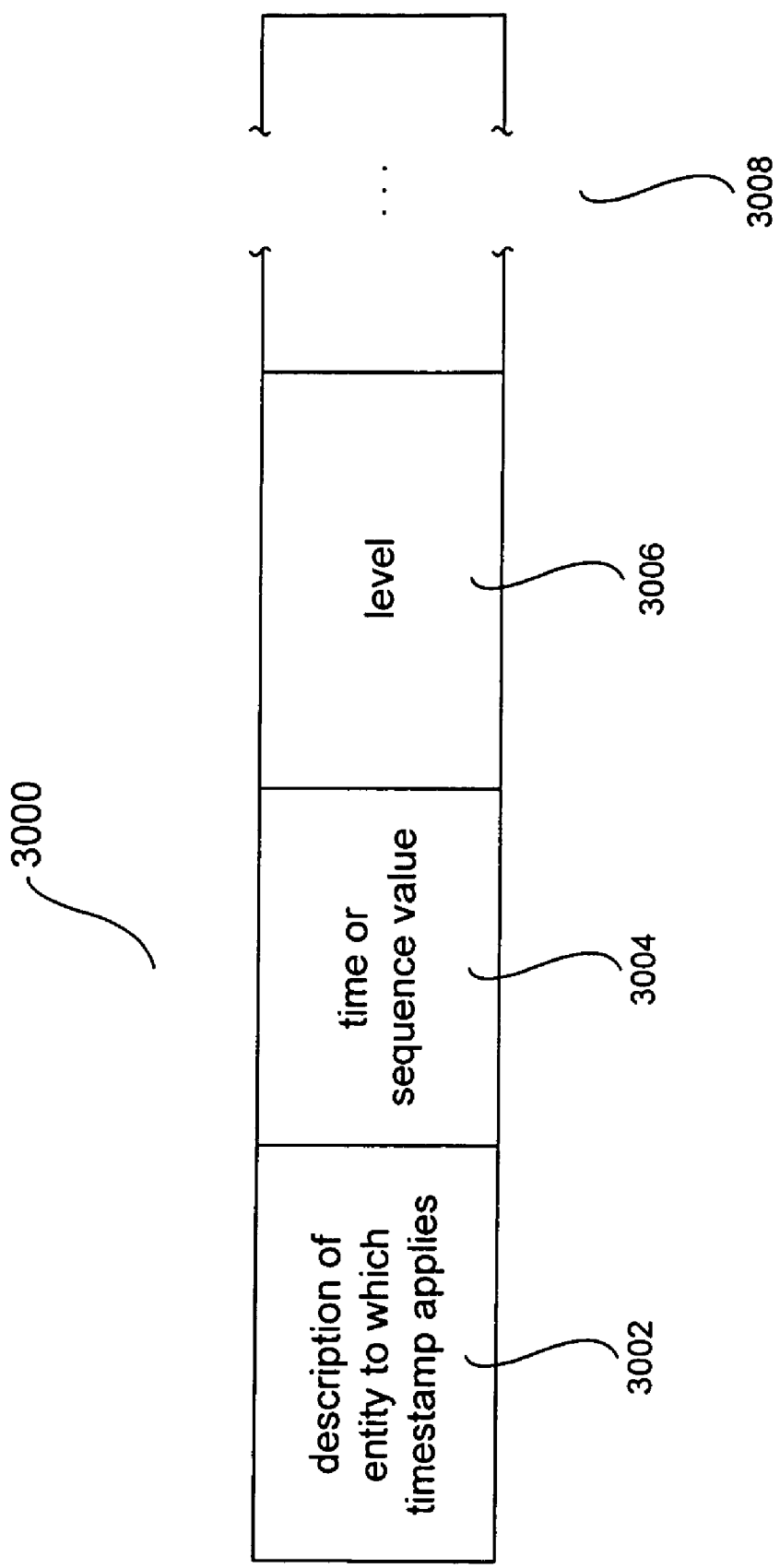
FIG. 30 illustrates one of a new type of timestamps that represent one embodiment of the present invention.

FIG. 30 illustrates one of a new type of timestamps that represent one embodiment of the present invention. The timestamp 3000 is a data structure, generally stored in non-volatile random access memory within bricks, in association with data structures, data-structure nodes, and data entities, and communicated between bricks and processes in messages. An example of the new type of timestamp 3000, shown in FIG. 30, may include a field 3002 that describes, or references, the entity with which the timestamp is associated, such as a data block or log entry, a field 3004 that includes the real-time time value, logical time value, or sequence value that the timestamp associates with the entity described or referenced in the first field 3002, a level field 3006 that indicates the highest level within the processing and data-storage hierarchy illustrated in FIG. 28 at which the timestamp is considered live, and, optionally, additional fields 3008 used for various purposes, including fast garbage collection and other purposes. Timestamps may, in various different systems, be associated with a wide variety of different entities, including data structures, stored in memory, on a mass storage device, or in another fashion, processes, ports, physical devices, messages, and almost any other physical or computational entity that can be referenced by, manipulated by, or managed by software routines.

Figure 31A:
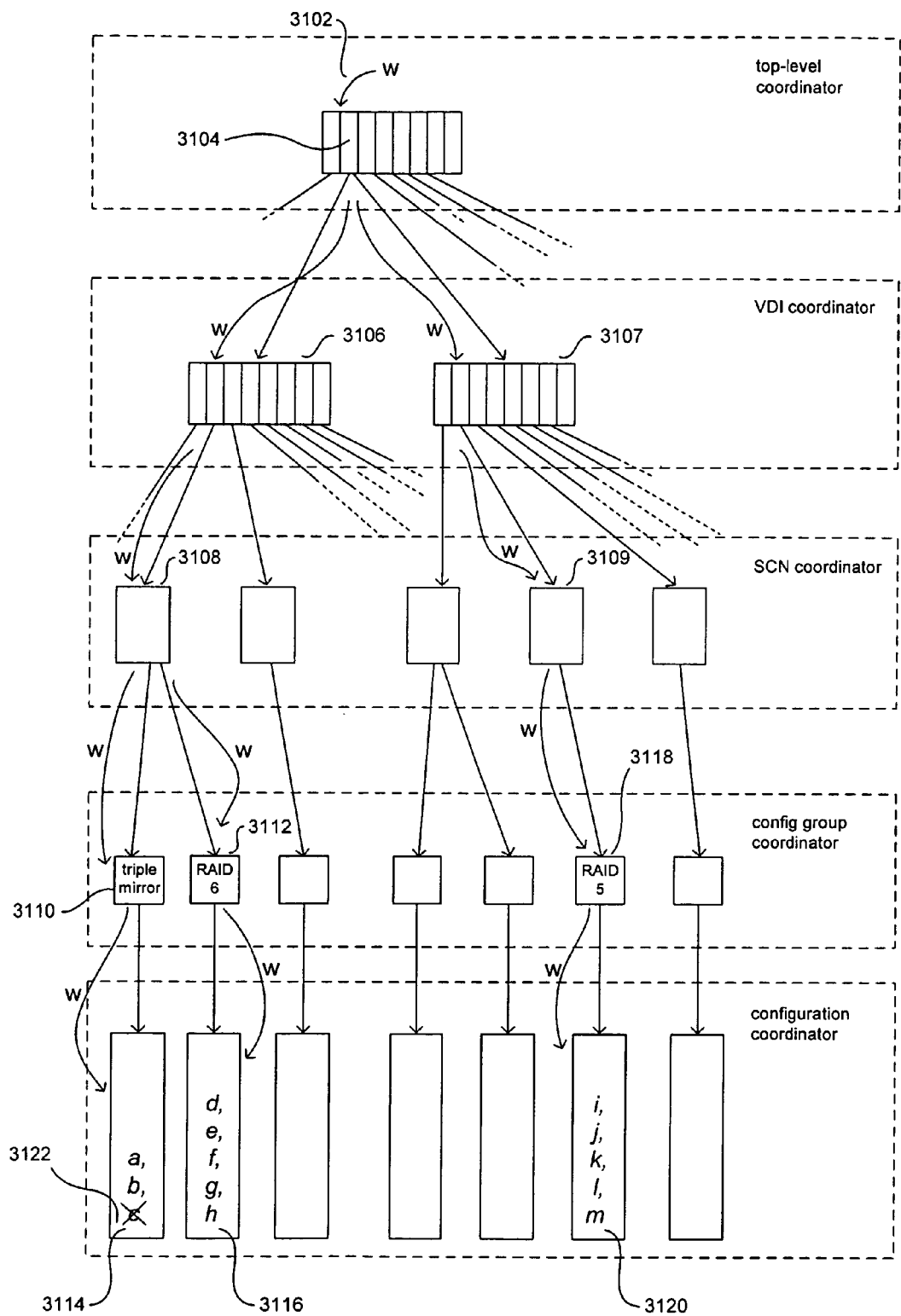
FIGS. 31A-F illustrate a use of the new type of timestamp, representing one embodiment of the present invention, to facilitate data consistency during a WRITE operation to a FAB segment distributed over multiple bricks under multiple redundancy schemes.
Figure 31B:
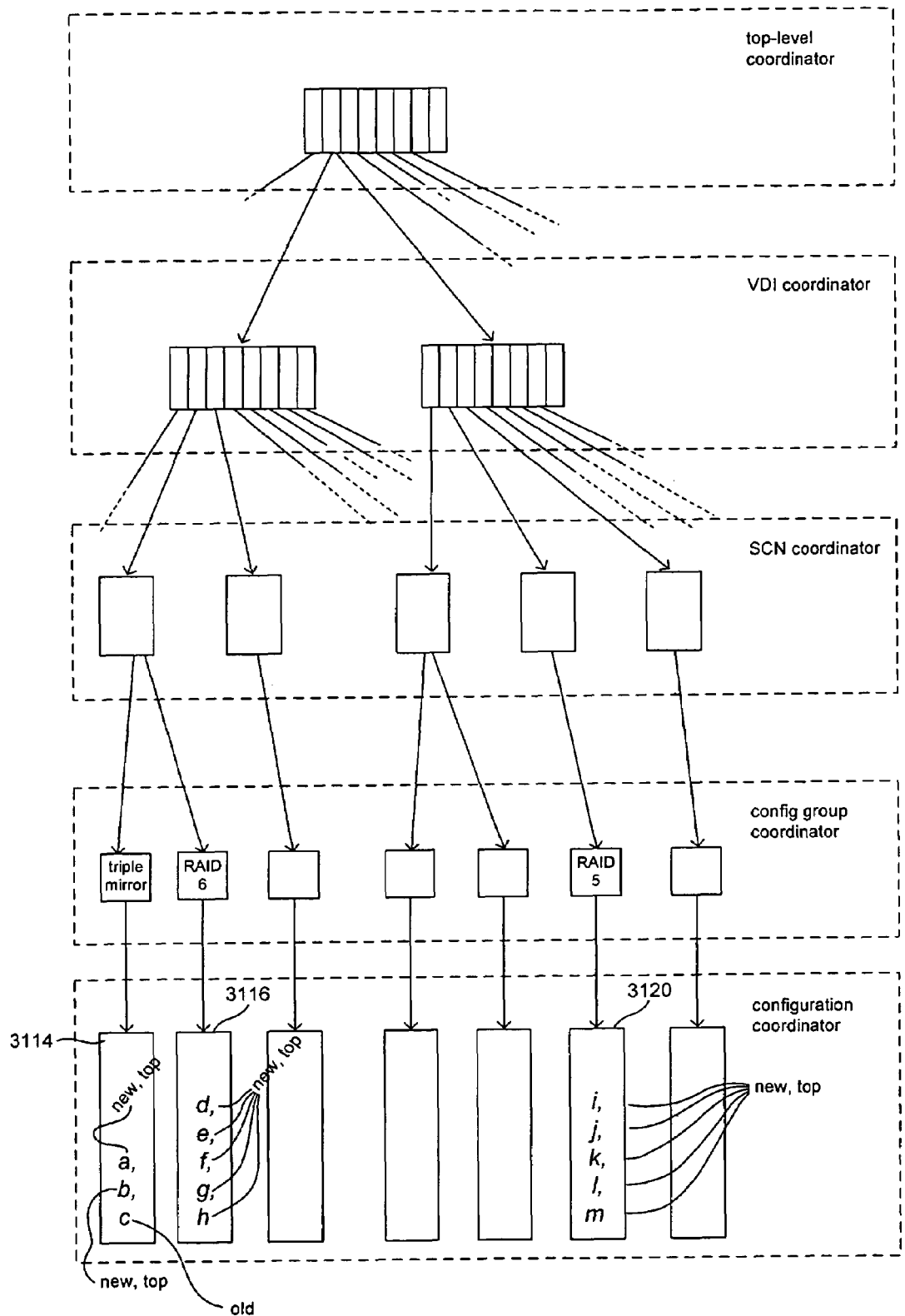

The semantics of the level field, and use of the new type of timestamp, are best described with reference to a concrete example. FIGS. 31A-F illustrate a use of the new type of timestamp, representing one embodiment of the present invention, to facilitate data consistency during a WRITE operation to a FAB segment distributed over multiple bricks under multiple redundancy schemes. FIGS. 31A-F all employ the same illustration conventions employed in FIG. 28, described above with reference to FIG. 28. Consider a WRITE operation 3102 directed to a particular virtual disk 3104 within a FAB system. The top-level coordinator directs the WRITE request to two VDI replicates 3106-3107 of the virtual disk, and the VDI coordinator, in turn, directs the WRITE request to two different SCN nodes 3108-3109 corresponding to the segment to which the WRITE request is directed. A migration is occurring with respect to the first SCN node 3108, and the SCN coordinator therefore directs the WRITE request to two different cfg groups 3110 and 3112, the first cfg group representing triple mirror redundancy, and the second cfg group 3112 representing a RAID-6, erasure coding redundancy scheme. The two cfg groups 3110 and 3112, in turn, direct the WRITE request to corresponding configurations 3114 and 3116, respectively. The second SCN node 3109 directs the WRITE request to a single configuration group 3118 which, in turn, directs the WRITE request to the associated configuration 3120. Assume the WRITE fails with respect to brick "c" 3122 in the configuration 3114 associated with the triple mirroring cfg group 3110 of the first SCN node 3108. All other WRITE operations to bricks within the relevant configuration groups succeed. Therefore, as shown in FIG. 31B, all of the blocks affected by the WRITE request on all of the bricks within the relevant configurations 3114, 3116, and 3120 are associated with a new timestamp, while the blocks in brick "c" are associated with an old timestamp. The new timestamp has a level-field value that indicates the top level of the hierarchy, as also shown in FIG. 31B. This means that the timestamp is live with respect to all hierarchical levels in the control-processing and data-storage model.

Figure 31C:
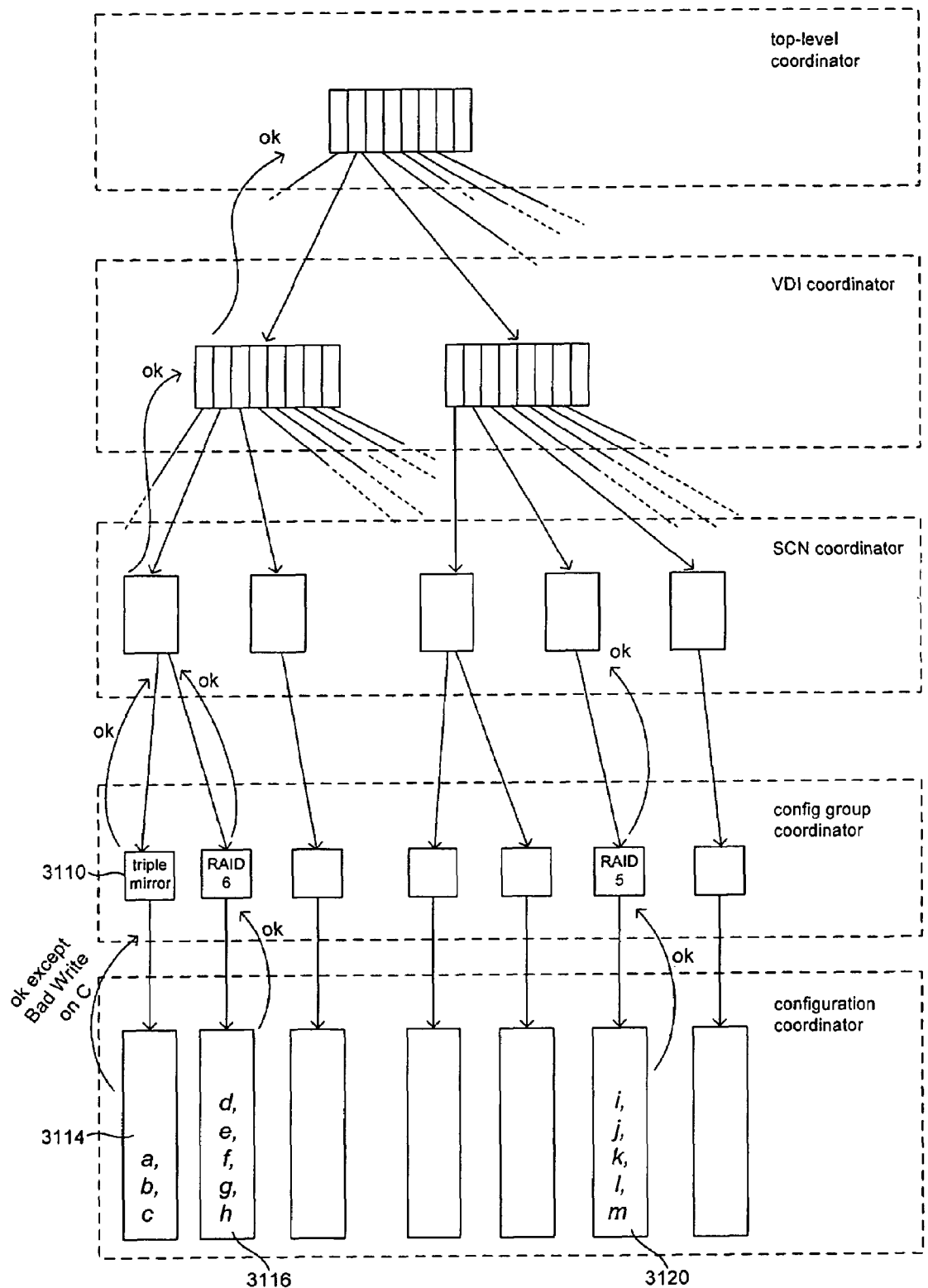

Next, as shown in FIG. 31C, the various hierarchical levels reply upward, in the hierarchical model, with respect to the WRITE operation. For example, at the configuration coordinator level, configuration 3114 returns an indication of the bad WRITE to the brick "c" to configuration group node 3110, as well as indications of success of the WRITE to bricks "a" and "b." Configuration 3116 returns an indication of success for the WRITE operation for all five bricks in the configuration. Similarly, configuration 3120 returns indications of success for all WRITE operations to all five bricks in configuration 3120. Success indications are returned, level-by-level, up the processing hierarchy all the way to the top-level coordinator. Note that the configuration group node 3110 returns an indication of success despite the failure of the WRITE to brick "c," because, under the triple mirroring redundancy scheme, successful WRITEs to bricks "a" and "b" constitute a successful WRITE to a quorum of the bricks.

Figure 31D:
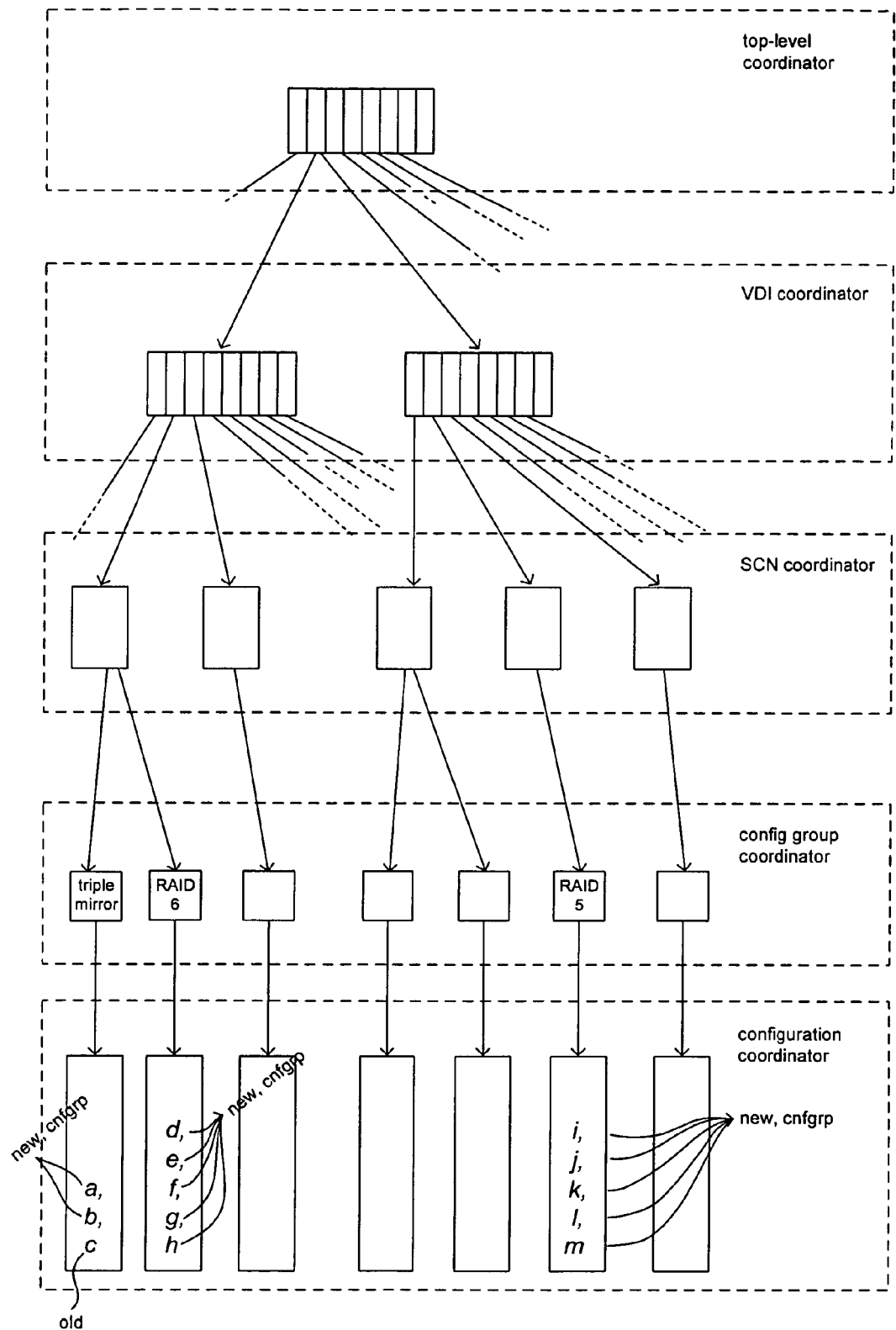

Following the return of indications of success, the hierarchical coordinator levels, from the top-level coordinator downward, demote the level field of the timestamps associated with the WRITE operation to a level-field value corresponding to the level below them. In other words, the top level coordinator demotes the level field of the timestamps associated with the bricks affected by the WRITE operation to an indication of the VDI-coordinator level, the VDI coordinator level demotes the value in the level field of the timestamps to an indication of the SCN-coordinator level, and so forth. As a result, the level fields of all the timestamps associated with the WRITE operation are demoted to an indication of the configuration-coordinator level, as shown in FIG. 31D. Because of the failure of the WRITE to brick "c," the timestamps are maintained, at the configuration-coordinator level, in a live state. The timestamps are maintained in the live state until the failed WRITE is resolved, and a complete success for the WRITE operation is obtained. However, all coordinator levels above the configuration-coordinator level consider the timestamps to have been already garbage collected.

Figure 31E:
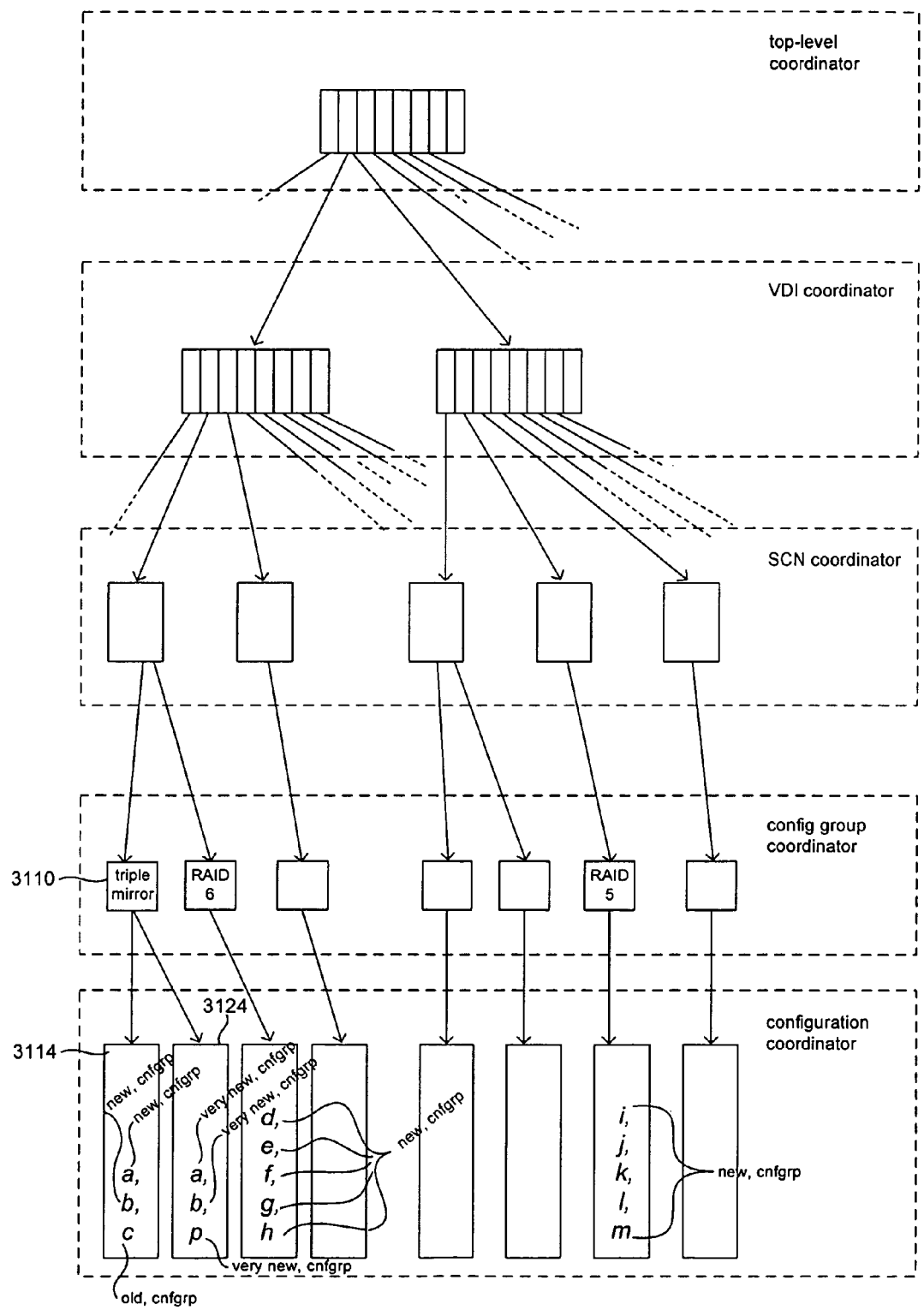

As shown in FIG. 31E, the configuration group coordinator resolves the failed WRITE by reconfiguring the configuration 3114 containing the failed brick. Thus, configuration group 3110 references both the old configuration 3114 and a new configuration 3124 in which a new brick "p" is substituted for a failed brick "c" in the old configuration. As part of the reconfiguration, blocks are copied from the old configuration 3114 to the new configuration 3124. In the example shown in FIGS. 31A-F, the copied blocks receive, in the new configuration, new timestamps with new timestamp values. In certain cases, resync routines may reconstruct data and preserve existing timestamps, while in other cases, such as the current example, new timestamps are generated. Thus, the block written in the previously described WRITE operation is associated with one timestamp value in the old configuration, and a newer timestamp value in the new configuration. Thus, a timestamp disparity exists with respect to the block in the new configuration and all other blocks in the remaining configurations.

Figure 31F:
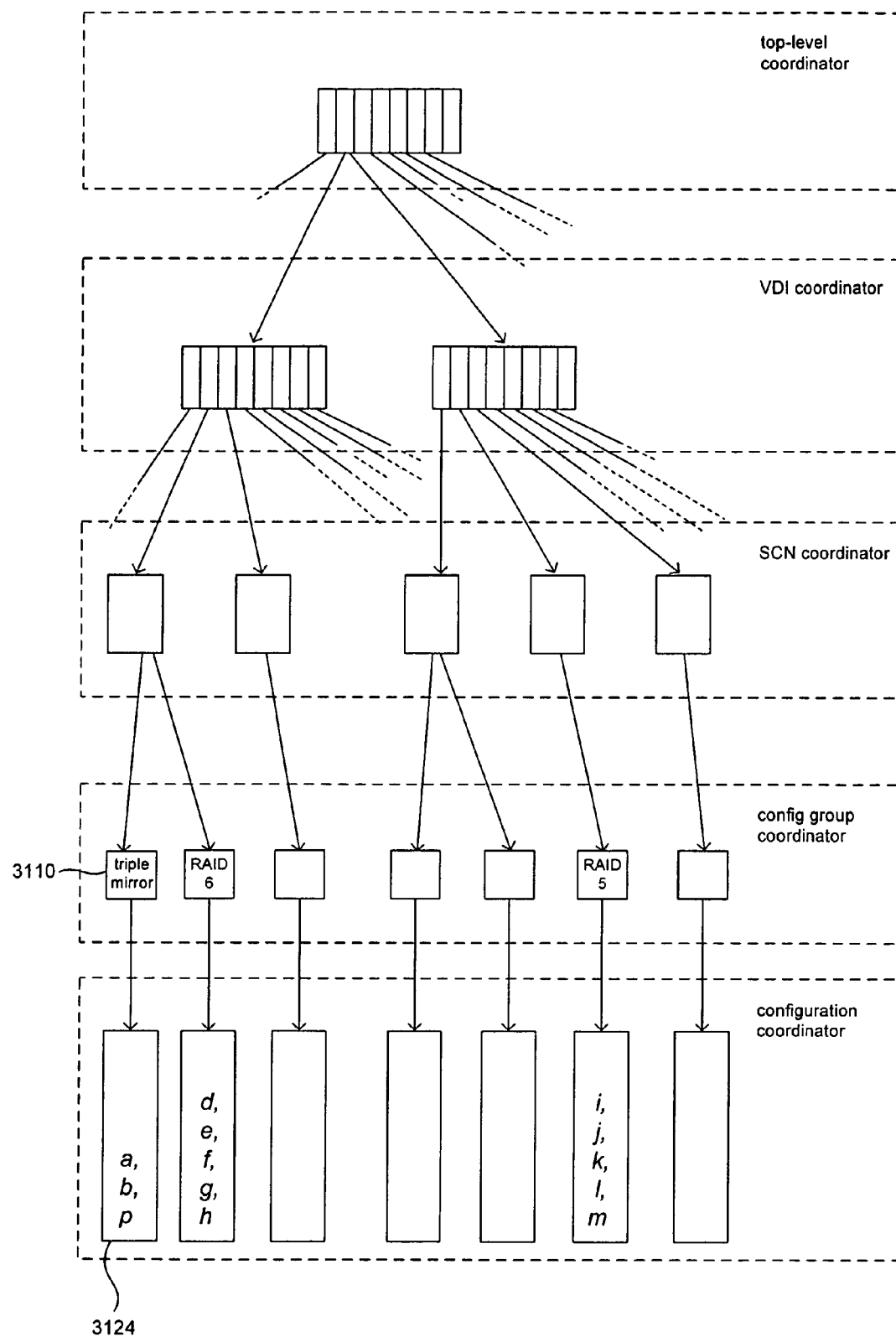

Because of the hierarchical nature of the timestamps, however, and because the timestamps in the old configuration 3114 have been demoted to the configuration-coordinator level, and the new timestamps in the new configuration 3124 were originally set to the configuration-coordinator level since they were created by the configuration coordinator, the timestamp disparity is not visible within the control-processing hierarchy above the configuration-coordinator level. Therefore, neither the configuration group coordinator, nor any coordinators above the configuration group coordinator, observes a timestamp disparity. Timestamps with levels below a current control-processing hierarchy are considered to be garbage collected by that processing level. Thus, from the standpoint of the configuration group coordinator and all higher coordinators, the timestamps associated with the block have already been garbage collected as a result of the WRITE operation having succeeded from the standpoint of the configuration group coordinator and all higher level coordinators. Once the reconfiguration of the configuration group node 3110 is complete, as shown in FIG. 31F, the old configuration (3114 in FIG. 31E) is deleted and garbage collected, leaving only a single, new configuration 3124. At that point, the WRITE failure to brick "c" has been resolved, and the configuration coordinator therefore demotes the level indication in the level fields of all the timestamps associated with blocks affected by the WRITE operation. Demotion at the configuration coordinator level means that the timestamps are no longer live at any processing level, and can be physically garbage collected by a garbage collection mechanism.

To summarize, the new, hierarchical timestamp that represents one embodiment of the present invention may include a level field that indicates the highest level, within a processing hierarchy, at which the timestamp is considered live. Coordinators above that level consider the timestamp to be already garbage collected, and therefore the timestamp is not considered by the coordinators above that level with respect to timestamp-disparity-related error detection. Thus, timestamp disparities that do not represent data inconsistency, such as the timestamp disparity described with reference to FIGS. 29A-C, are automatically isolated to those processing levels with sufficient knowledge to recognize that the timestamp disparity does not represent a data inconsistency, so that higher level control logic does not inadvertently infer failures and invoke recovery operations in cases where no data inconsistency or other errors are present. By including the processing-level field within a hierarchical timestamp, undesirable dependencies between processing levels at which processing tasks related to the data or other computational entity associated with the timestamp and processing levels at which processing is complete can be prevented. Hierarchical timestamps also facilitate staged garbage collection of timestamps through hierarchical processing stages.

Timestamp garbage collection may be carried out asynchronously at the top processing level of a hierarchy. FIG. 32 shows pseudocode for an asynchronous time-stamp-collection process that represents one embodiment of the present invention. The pseudocode routine uses three locally declared variables level, i, and ts, declared on lines 3-5. The timestamp garbage collection routine is passed an instance of a timestamp class timestamps. The timestamp garbage collection routine continuously executes the do-while loop of lines 6-20 in order to demote and ultimately garbage collect timestamps as hierarchical processing levels complete timestamp-associated operations and tasks. In the for-loop of lines 7-18, the timestamp garbage collection routine considers each processing level, from the top level downward. In the for-loop of lines 9-17, the timestamp garbage collection routine considers each outstanding timestamp at the currently considered level. If the WRITE operation associated with the timestamp has completed, as detected on line 13, then if the current level is the configuration level, or lowest control-processing level, the timestamp is marked for deallocation on line 15. Otherwise, the timestamp is demoted to the next lowest level on line 16. After consideration of all the timestamps associated with all the levels, a garbage collection routine is called, on line 20, to remove all timestamps marked for deallocation.

Figure 33B:
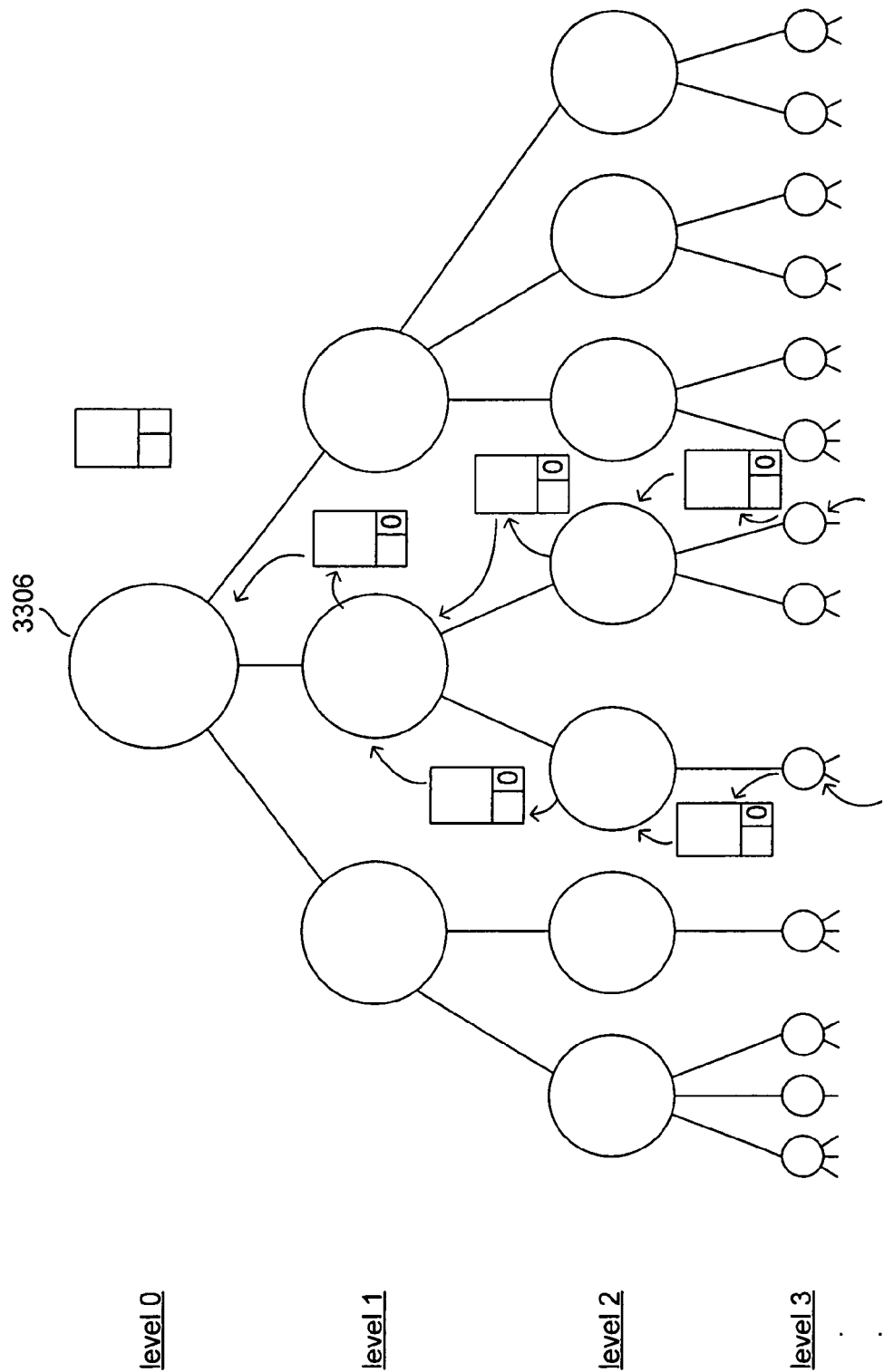

Hierarchical timestamps may find application in a wide variety of different hierarchically structured processing systems, in addition to FAB systems. Hierarchical processing systems may include network communication systems, database management systems, operating systems, various real-time systems, including control systems for complex processes, and other hierarchical processing systems. FIGS. 33A-F summarize a general method, representing an embodiment of the present invention, for staged constraint of the scope of timestamps within a hierarchically organized processing system. As shown in FIG. 33A, an initial request 3302 associated with a timestamp 3304 is input to a highest-level processing node 3306. The timestamp 3304 may have been associated with the request at a higher-level interface, or may be associated with the request by processing node 3306. Processing node 3306 then forwards the request down through a processing hierarchy. The request is first forwarded to a second-level processing node 3308 which, in turn, forwards the request to two third-level processing nodes 3310 and 3312 which, in turn, forward the request to fourth-level processing nodes 3314 and 3316. The request may be forwarded and/or copied and forwarded to processing nodes at subsequent levels.

Figure 33C:
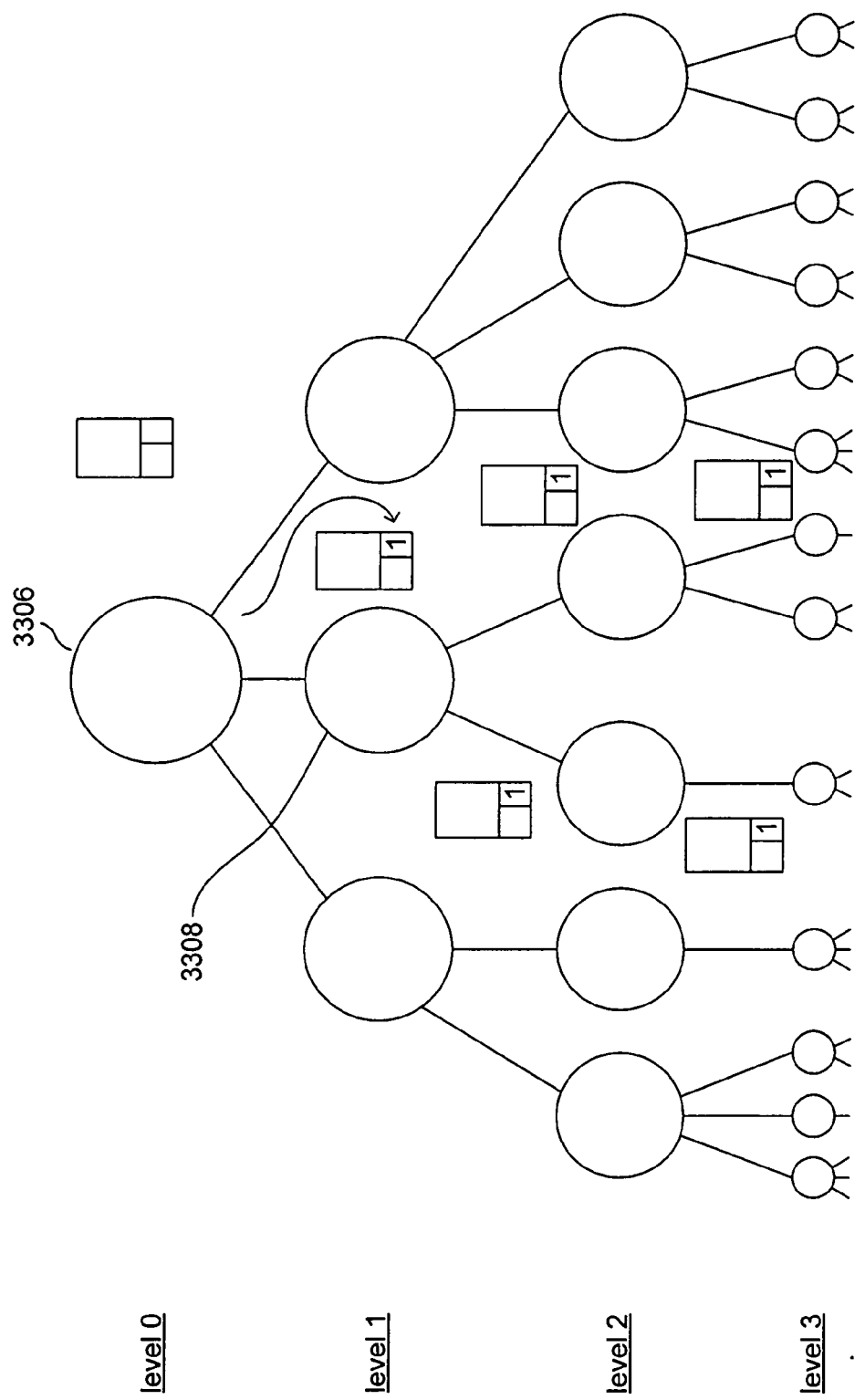

The level field of the timestamps associated with the forwarded requests, such as level field 3318 in request 3320 forwarded by processing node 3306 to processing node 3308, are all set to 0, numerically representing the top level of processing within the processing hierarchy. Next, as shown in FIG. 33B, responses to the request are returned back up the processing hierarchy to the top level processing node 3306. Copies of the request remain associated with each of the processing nodes that receive them. The level field in the timestamps associated with the processing request continue to have the value 0, indicating that the timestamps are live throughout the processing hierarchy. Next, as shown in FIG. 33C, the top-level processing node 3306, having received a successful reply from the next lowest-level processing node 3308, determines that the request has been successfully executed, and demotes the level value in the level field of all of the timestamps associated with the request. Thus, in FIG. 33C, all of the level fields of all of the timestamps maintained throughout, or visible throughout, the processing hierarchy have been demoted to the value "1." From the top level processing node's perspective, the timestamps have now been garbage collected, and are no longer live. Therefore, the top level processing node cannot subsequently detect timestamp disparities with respect to the completed operation.

Figure 33D:
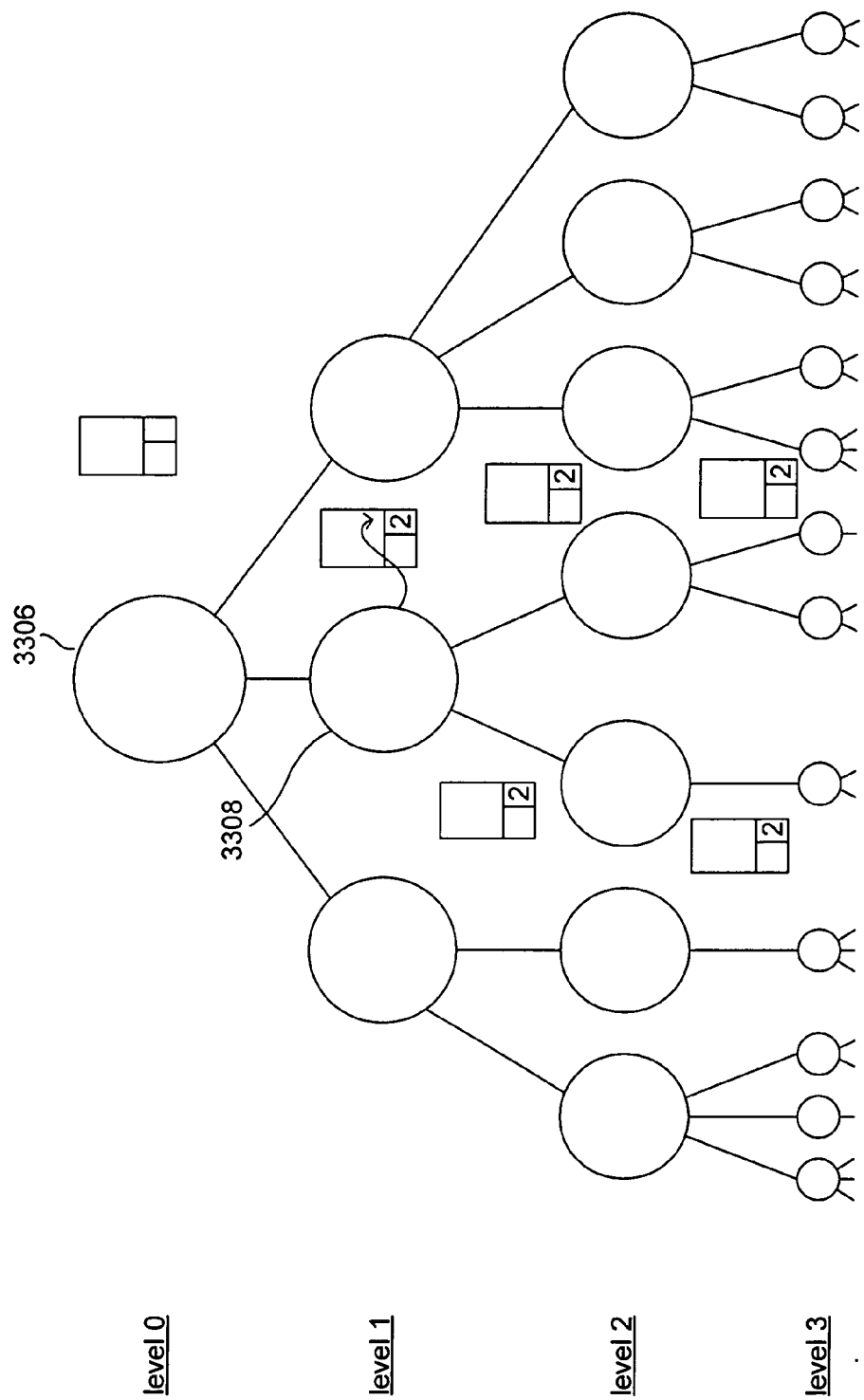
Figure 33F:
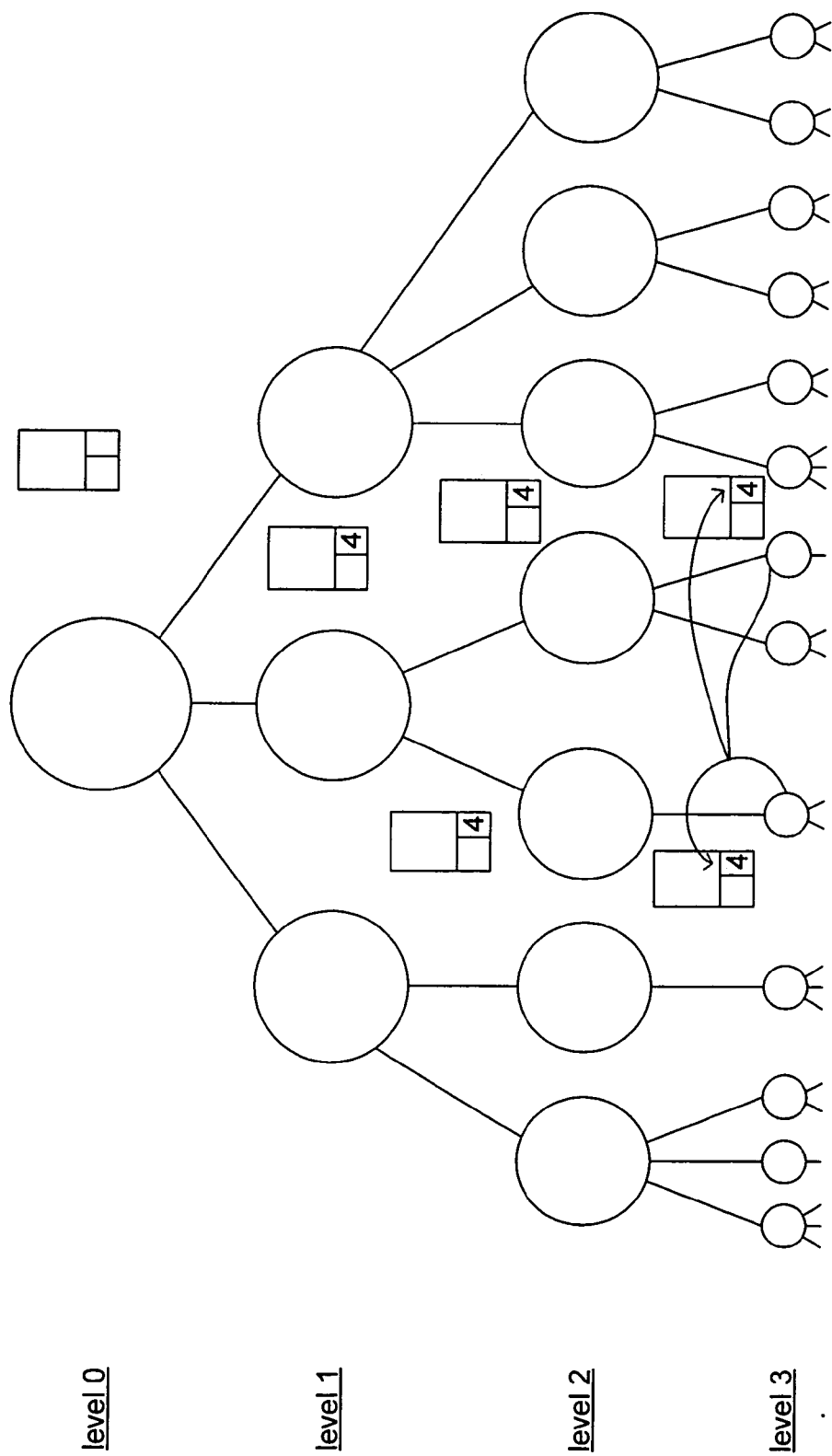

As shown in FIG. 33D, second-level processing node 3308, having received successful responses from lower-level processing nodes, determines that the request has been successfully completed, and demotes the level fields of all the timestamps associated with the request maintained throughout the processing hierarchy to the value "2." At this point, neither the top level processing node 3306 nor the second-level processing node 3308 can subsequently detect timestamp disparities with respect to the completed operation. As shown in FIGS. 33E and 33F, as each subsequent, next-lowest-level processing node or nodes conclude that the request has been successfully completed, the level value in the level field of all the timestamps associated with the request are subsequently demoted, successively narrowing the scope of the timestamps to lower and lower portions of the processing hierarchy. Finally, as the result of a final demotion, the timestamps are physically garbage collected.

Although the present invention has been described in terms of particular embodiments, it is not intended that the invention be limited to these embodiments. Modifications within the spirit of the invention will be apparent to those skilled in the art. For example, hierarchical timestamps contain at least a level field and a timestamp or sequence value, and may contain any number of additional fields useful for specific applications. Although, in the described embodiments, the scope of timestamps is successively constrained to lower levels of a processing hierarchy, timestamp scope may be changed, by changing the value in the level field of the hierarchical timestamp, according to many other patterns. For example, in alternative embodiments, the scope of the hierarchical timestamp may be successively constrained to higher and higher levels of the processing hierarchy. Hierarchical timestamps may also be employed in non-hierarchical networks and graphs in which operations are carried out in hierarchical fashion. Hierarchical timestamps can be employed in a wide variety of different computing systems and networks, and methods employing hierarchical timestamps can be coded in an essentially limitless number of different forms, including different routines and programs developed with different programming languages using different data structures, different control structures, and different modular organizations, as well as in firmware and hardware logic circuits. Hierarchical timestamps may be created and stored in a wide variety of different storage media, including electronic memory, mass-storage devices, and may be transmitted via many different communications media.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for preventing undesirable detection of timestamp disparities during processing of timestamp-associated entities in a hierarchical processing system, the method comprising:
   employing timestamps that include a processing-level indication, the processing-level indication in each timestamp reflecting a current scope of the timestamp within the hierarchical processing system; and
   when processing of a timestamp-associated entity is completed with respect to the timestamp at a processing level, changing the processing-level indication in the timestamp associated with the entity.

2. The method of claim 1 wherein changing the processing-level indication in the timestamp associated with the entity further includes setting the processing-level indication to a lower value.

3. The method of claim 1 wherein changing the processing-level indication in the timestamp associated with the entity further includes setting the processing-level indication to a higher value.

4. The method of claim 1 further including:
   at a given processing level, when checking for problems related to entities that can be identified based on timestamps associated with the entities, considering only timestamps within a processing scope, indicated by the processing level indications within the timestamps, that includes the given processing level.

5. The method of claim 4 wherein a timestamp having a processing-level indication equal to or less than the given processing level is within the processing scope of the given processing level.

6. The method of claim 4 wherein a timestamp having a processing-level indication equal to or greater than the given processing level is within the processing scope of the given processing level.

7. The method of claim 1 employed in a distributed storage system in which timestamps are associated with data blocks.

8. The method of claim 7
   wherein the distributed storage system comprises interconnected storage-system components;
   wherein the distributed storage system distributes data across storage-system components according to one or more redundancy schemes; and
   wherein the hierarchical processing levels within each distributed storage system coordinate execution of data-access operations with respect to hierarchical levels of logical data entities.

9. Computer instructions stored within a computer-readable medium that implement the method of claim 1.

10. A distributed storage system comprising:
    a number of storage-system components interconnected by one or more communications media;
    hierarchical processing logic executed by each of the number of storage-system components, higher levels of the hierarchical processing logic coordinating distributed execution of data-access operations and lower levels of the hierarchical processing logic carrying out data-access within the storage-system components; and
    hierarchical timestamps associated with data units stored within the storage-system components, each hierarchical timestamp including a processing-level indication that indicates the scope of the hierarchical timestamp within the hierarchical processing levels
    wherein, when processing of a timestamp-associated data unit related to the associated timestamp is completed at a given processing level, the processing-level indication in the timestamp is changed by the hierarchical processing logic.

11. The distributed storage system of claim 10 wherein the processing-level indication is changed to a value lower than the given processing level.

12. The distributed storage system of claim 10 wherein the processing-level indication is changed to a value higher than the given processing level.

13. The distributed storage system of claim 10 wherein, when a processing level of the hierarchical processing logic checks for problems, related to data units, that can be identified based on timestamps associated with the data units, the hierarchical processing logic checks only for problems identified by timestamps within a processing scope, indicated by the processing level indications within the timestamps, that includes the processing level.

14. The distributed storage system of claim 13 wherein a timestamp having a processing-level indication equal to or less than the processing level is within the processing scope of the given processing level.

15. The distributed storage system of claim 13 wherein a timestamp having a processing-level indication equal to or greater than the processing level is within the processing scope of the given processing level.

16. A method for controlling a scope of processing levels in which entities associated with timestamps are processed in a hierarchical processing system with a number of processing levels, the method comprising:
    providing a scope indication means for the timestamps associated with the entities; and
    at a particular processing level,
       processing only entities associated with timestamps, the processing-level-indication means for which indicate a scope that includes the particular processing level, and
       following processing of a particular entity, directing the scope indication means for the timestamp associated with the particular entity to subsequently indicate a scope that does not include the particular processing level.

* * * * *